United States Patent
Gao et al.

(10) Patent No.: US 11,595,602 B2
(45) Date of Patent: Feb. 28, 2023

(54) IMAGE SENSOR POST PROCESSING

(71) Applicant: Meta Platforms Technologies, LLC, Menlo Park, CA (US)

(72) Inventors: Wei Gao, Bothell, WA (US); Andrew Samuel Berkovich, Bellevue, WA (US); Song Chen, Redmond, WA (US); Tsung-Hsun Tsai, Redmond, WA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/672,427

(22) Filed: Nov. 1, 2019

(65) Prior Publication Data

US 2020/0145593 A1 May 7, 2020

Related U.S. Application Data

(60) Provisional application No. 62/755,835, filed on Nov. 5, 2018.

(51) Int. Cl.
*H04N 5/378* (2011.01)
*H04N 5/359* (2011.01)

(52) U.S. Cl.
CPC ............ *H04N 5/359* (2013.01); *H04N 5/378* (2013.01)

(58) Field of Classification Search
CPC .................. H04N 5/378; H03M 1/56
(Continued)

(56) References Cited

U.S. PATENT DOCUMENTS 4,596,977 A 6/1986 Bauman et al.
5,053,771 A 10/1991 McDermott
(Continued)

FOREIGN PATENT DOCUMENTS

CN 1490878 A 4/2004
CN 1728397 A 2/2006
(Continued)

OTHER PUBLICATIONS

International Application No. PCT/US2019/059754, International Search Report and Written Opinion dated Mar. 24, 2020, 15 pages.
(Continued)

*Primary Examiner* — Anthony J Daniels
(74) *Attorney, Agent, or Firm* — Kilpatrick Townsend & Stockton LLP

(57) ABSTRACT

Methods and systems for quantizing a physical quantity, such as light, are provided. In one example, an apparatus comprises an analog-to-digital (A/D) converter configured to generate raw digital outputs based on performing at least one of: (1) a first quantization operation to quantize a physical stimulus within a first intensity range based on a first A/D conversion relationship, or (2) a second quantization operation to quantize the physical stimulus within a second intensity range based on a second A/D conversion relationship; and a raw output conversion circuit configured generate a refined digital output based on a raw digital output obtained from the A/D converter and at least one predetermined conversion parameter. The at least one conversion parameter compensates for a discontinuity between the first A/D conversion relationship and the second A/D conversion relationship.

19 Claims, 31 Drawing Sheets

(58) Field of Classification Search
USPC .......................................................... 348/294
See application file for complete search history.

(56) References Cited

U.S. PATENT DOCUMENTS

| | | | |
|---|---|---|---|
| 5,844,512 A | 12/1998 | Gorin et al. |
| 5,963,369 A | 10/1999 | Steinthal et al. |
| 6,384,905 B1 | 5/2002 | Barrows |
| 6,522,395 B1 | 2/2003 | Bamji et al. |
| 6,529,241 B1 | 3/2003 | Clark |
| 6,864,817 B1 | 3/2005 | Salvi et al. |
| 6,963,369 B1 | 11/2005 | Olding |
| 6,972,791 B1 | 12/2005 | Yomeyama |
| 6,992,706 B2 | 1/2006 | Mabuchi et al. |
| 7,326,903 B2 | 2/2008 | Ackland |
| 7,362,365 B1 | 4/2008 | Reyneri et al. |
| 7,659,772 B2 | 2/2010 | Nomura et al. |
| 7,659,925 B2 | 2/2010 | Krymski |
| 7,719,589 B2 | 5/2010 | Turchetta et al. |
| 7,956,914 B2 | 6/2011 | Xu |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,001,251 B2 | 4/2015 | Smith et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,282,264 B2 | 3/2016 | Park et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,832,370 B2 | 11/2017 | Cho et al. |
| 9,909,922 B2 | 3/2018 | Schweickert et al. |
| 9,935,618 B1 | 4/2018 | Fenigstein |
| 9,948,316 B1 | 4/2018 | Yun et al. |
| 9,955,091 B1 | 4/2018 | Dai et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,574,925 B2 | 2/2020 | Otaka |
| 10,594,974 B2 | 3/2020 | Ivarsson et al. |
| 10,598,546 B2 | 3/2020 | Liu |
| 10,608,101 B2 | 3/2020 | Liu |
| 10,686,996 B2 | 6/2020 | Liu |
| 10,726,627 B2 | 7/2020 | Liu |
| 10,750,097 B2 | 8/2020 | Liu |
| 10,764,526 B1 | 9/2020 | Liu et al. |
| 10,804,926 B2 | 10/2020 | Gao et al. |
| 10,812,742 B2 | 10/2020 | Chen et al. |
| 10,825,854 B2 | 11/2020 | Liu |
| 10,834,344 B2 | 11/2020 | Chen et al. |
| 10,897,586 B2 | 1/2021 | Liu et al. |
| 10,903,260 B2 | 2/2021 | Chen et al. |
| 10,917,589 B2 | 2/2021 | Liu |
| 10,923,523 B2 | 2/2021 | Liu et al. |
| 10,931,884 B2 | 2/2021 | Liu et al. |
| 10,951,849 B2 | 3/2021 | Liu |
| 10,969,273 B2 | 4/2021 | Berkovich et al. |
| 11,004,881 B2 | 5/2021 | Liu et al. |
| 11,057,581 B2 | 7/2021 | Liu |
| 11,089,210 B2 | 8/2021 | Berkovich et al. |
| 11,089,241 B2 | 8/2021 | Chen et al. |
| 11,146,753 B2 | 10/2021 | Shimura et al. |
| 2002/0067303 A1 | 6/2002 | Lee et al. |
| 2002/0113886 A1 | 8/2002 | Hynecek |
| 2003/0001080 A1 | 1/2003 | Kummaraguntla et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1 | 6/2004 | Mizuno |
| 2004/0251483 A1 | 12/2004 | Ko et al. |
| 2005/0046715 A1 | 3/2005 | Lim et al. |
| 2005/0057389 A1 | 3/2005 | Krymski |
| 2005/0104983 A1 | 5/2005 | Raynor |
| 2005/0206414 A1 | 9/2005 | Cottin et al. |
| 2005/0237380 A1 | 10/2005 | Kakii et al. |
| 2005/0280727 A1 | 12/2005 | Sato et al. |
| 2006/0023109 A1 | 2/2006 | Mabuchi et al. |
| 2006/0146159 A1 | 7/2006 | Farrier |
| 2006/0158541 A1 | 7/2006 | Ichikawa |
| 2007/0013983 A1 | 1/2007 | Kitamura et al. |
| 2007/0076109 A1 | 4/2007 | Krymski |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0007731 A1 | 1/2008 | Botchway et al. |
| 2008/0042046 A1* | 2/2008 | Mabuchi ............ H01L 27/14634 250/208.1 |
| 2008/0042888 A1 | 2/2008 | Danesh |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226170 A1 | 9/2008 | Sonoda |
| 2008/0226183 A1 | 9/2008 | Lei et al. |
| 2009/0002528 A1 | 1/2009 | Manabe et al. |
| 2009/0033588 A1 | 2/2009 | Kajita et al. |
| 2009/0040364 A1 | 2/2009 | Rubner |
| 2009/0066820 A1 | 3/2009 | Jiang et al. |
| 2009/0091645 A1 | 4/2009 | Trimeche et al. |
| 2009/0128640 A1 | 5/2009 | Yumiki |
| 2009/0224139 A1 | 9/2009 | Buettgen et al. |
| 2009/0244328 A1* | 10/2009 | Yamashita .............. H04N 5/378 348/241 |
| 2009/0244346 A1 | 10/2009 | Funaki |
| 2009/0245637 A1 | 10/2009 | Barman et al. |
| 2009/0261235 A1 | 10/2009 | Lahav et al. |
| 2009/0303371 A1 | 12/2009 | Watanabe et al. |
| 2009/0321615 A1 | 12/2009 | Sugiyama et al. |
| 2010/0013969 A1 | 1/2010 | Ui |
| 2010/0140732 A1 | 6/2010 | Eminoglu et al. |
| 2010/0194956 A1 | 8/2010 | Yuan et al. |
| 2010/0232227 A1 | 9/2010 | Lee |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0155892 A1 | 6/2011 | Neter et al. |
| 2011/0254986 A1 | 10/2011 | Nishimura et al. |
| 2011/0267533 A1 | 11/2011 | Hirose |
| 2011/0298074 A1 | 12/2011 | Funao |
| 2012/0016817 A1 | 1/2012 | Smith et al. |
| 2012/0039548 A1 | 2/2012 | Wang et al. |
| 2012/0068051 A1 | 3/2012 | Ahn et al. |
| 2012/0075511 A1 | 3/2012 | Tay |
| 2012/0092677 A1 | 4/2012 | Suehira et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0127284 A1 | 5/2012 | Bar-Zeev et al. |
| 2012/0133807 A1 | 5/2012 | Wu et al. |
| 2012/0138775 A1 | 6/2012 | Cheon et al. |
| 2012/0153123 A1 | 6/2012 | Mao et al. |
| 2012/0188420 A1 | 7/2012 | Black et al. |

(56) References Cited

U.S. PATENT DOCUMENTS

| | | |
|---|---|---|
| 2012/0200499 A1 | 8/2012 | Osterhout et al. |
| 2012/0212465 A1 | 8/2012 | White et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0273906 A1 | 11/2012 | Mackey et al. |
| 2012/0305751 A1 | 12/2012 | Kusuda |
| 2012/0327279 A1 | 12/2012 | Hashimoto et al. |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |
| 2013/0120615 A1 | 5/2013 | Hirooka et al. |
| 2013/0120625 A1* | 5/2013 | Ishii .................. H04N 5/23212 348/301 |
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0248685 A1* | 9/2013 | Ahn ...................... H04N 5/374 250/208.1 |
| 2013/0293752 A1 | 11/2013 | Peng et al. |
| 2013/0299674 A1 | 11/2013 | Fowler et al. |
| 2013/0300906 A1* | 11/2013 | Yan ........................ H03M 1/56 348/302 |
| 2014/0021574 A1 | 1/2014 | Egawa |
| 2014/0042299 A1 | 2/2014 | Wan et al. |
| 2014/0042582 A1 | 2/2014 | Kondo |
| 2014/0078336 A1 | 3/2014 | Beck et al. |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0313387 A1 | 10/2014 | Vogelsang et al. |
| 2014/0368687 A1 | 12/2014 | Yu et al. |
| 2015/0048427 A1 | 2/2015 | Hu et al. |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0172574 A1 | 6/2015 | Honda et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0035770 A1 | 2/2016 | Ahn et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0093659 A1 | 3/2016 | Nakamura et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0181298 A1 | 6/2016 | Wan et al. |
| 2016/0197117 A1 | 7/2016 | Nakata et al. |
| 2016/0198114 A1 | 7/2016 | Zhang et al. |
| 2016/0204150 A1 | 7/2016 | Oh et al. |
| 2016/0210785 A1 | 7/2016 | Balachandreswaran et al. |
| 2016/0225813 A1 | 8/2016 | Liao et al. |
| 2016/0240570 A1 | 8/2016 | Barna et al. |
| 2016/0249004 A1 | 8/2016 | Saeki et al. |
| 2016/0255293 A1 | 9/2016 | Gesset |
| 2016/0276394 A1 | 9/2016 | Chou et al. |
| 2016/0307945 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | McCarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0154909 A1 | 6/2017 | Ishizu |
| 2017/0170223 A1 | 6/2017 | Hynecek et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0084164 A1 | 3/2018 | Hynecek et al. |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0213205 A1 | 7/2018 | Oh |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0286896 A1 | 10/2018 | Kim et al. |
| 2018/0376046 A1 | 12/2018 | Liu |
| 2018/0376090 A1 | 12/2018 | Liu |
| 2019/0035154 A1 | 1/2019 | Liu |
| 2019/0046044 A1 | 2/2019 | Tzvieli et al. |
| 2019/0052788 A1 | 2/2019 | Liu |

(56) References Cited

U.S. PATENT DOCUMENTS

| | | |
|---|---|---|
| 2019/0056264 A1 | 2/2019 | Liu |
| 2019/0057995 A1 | 2/2019 | Liu |
| 2019/0058058 A1 | 2/2019 | Liu |
| 2019/0098232 A1 | 3/2019 | Mori et al. |
| 2019/0104263 A1 | 4/2019 | Ochiai et al. |
| 2019/0104265 A1 | 4/2019 | Totsuka et al. |
| 2019/0110039 A1 | 4/2019 | Linde et al. |
| 2019/0123088 A1 | 4/2019 | Kwon |
| 2019/0124285 A1* | 4/2019 | Otaka ............... H04N 5/35527 |
| 2019/0141270 A1* | 5/2019 | Otaka ................... H04N 5/361 |
| 2019/0149751 A1 | 5/2019 | Wise |
| 2019/0157330 A1 | 5/2019 | Sato et al. |
| 2019/0172227 A1 | 6/2019 | Kasahara |
| 2019/0172868 A1 | 6/2019 | Chen et al. |
| 2019/0191116 A1 | 6/2019 | Madura |
| 2019/0246036 A1 | 8/2019 | Wu et al. |
| 2019/0253650 A1 | 8/2019 | Kim |
| 2019/0327439 A1 | 10/2019 | Chen et al. |
| 2019/0331914 A1 | 10/2019 | Lee et al. |
| 2019/0335151 A1 | 10/2019 | Rivard et al. |
| 2019/0348460 A1 | 11/2019 | Chen et al. |
| 2019/0355782 A1 | 11/2019 | Do et al. |
| 2019/0363118 A1 | 11/2019 | Berkovich et al. |
| 2019/0371845 A1 | 12/2019 | Chen et al. |
| 2019/0379827 A1 | 12/2019 | Berkovich et al. |
| 2019/0379846 A1 | 12/2019 | Chen et al. |
| 2020/0007800 A1 | 1/2020 | Berkovich et al. |
| 2020/0053299 A1 | 2/2020 | Zhang et al. |
| 2020/0059589 A1 | 2/2020 | Liu et al. |
| 2020/0068189 A1 | 2/2020 | Chen et al. |
| 2020/0186731 A1 | 6/2020 | Chen et al. |
| 2020/0195875 A1 | 6/2020 | Berkovich et al. |
| 2020/0217714 A1 | 7/2020 | Liu |
| 2020/0228745 A1 | 7/2020 | Otaka |
| 2020/0374475 A1 | 11/2020 | Fukuoka et al. |
| 2020/0396399 A1 | 12/2020 | Tsai et al. |
| 2021/0026796 A1 | 1/2021 | Graif et al. |
| 2021/0099659 A1 | 4/2021 | Miyauchi et al. |
| 2021/0185264 A1 | 6/2021 | Wong et al. |
| 2021/0227159 A1 | 7/2021 | Sambonsugi |
| 2021/0368124 A1 | 11/2021 | Berkovich et al. |

FOREIGN PATENT DOCUMENTS

| | | |
|---|---|---|
| CN | 1812506 A | 8/2006 |
| CN | 103207716 A | 7/2013 |
| CN | 103730455 A | 4/2014 |
| CN | 104125418 A | 10/2014 |
| CN | 104204904 A | 12/2014 |
| CN | 104469195 A | 3/2015 |
| CN | 104704812 A | 6/2015 |
| CN | 104733485 A | 6/2015 |
| CN | 104754255 A | 7/2015 |
| CN | 105706439 A | 6/2016 |
| CN | 106255978 A | 12/2016 |
| CN | 106791504 A | 5/2017 |
| CN | 109298528 A | 2/2019 |
| DE | 202016105510 U1 | 10/2016 |
| EP | 0675345 A2 | 10/1995 |
| EP | 1681856 A2 | 7/2006 |
| EP | 1732134 A1 | 12/2006 |
| EP | 1746820 | 1/2007 |
| EP | 1788802 A1 | 5/2007 |
| EP | 2037505 A1 | 3/2009 |
| EP | 2063630 A1 | 5/2009 |
| EP | 2538664 A2 | 12/2012 |
| EP | 2804074 A2 | 11/2014 |
| EP | 2833619 A1 | 2/2015 |
| EP | 3032822 A1 | 6/2016 |
| EP | 3229457 A1 | 10/2017 |
| EP | 3258683 A1 | 12/2017 |
| EP | 3425352 A1 | 1/2019 |
| EP | 3425353 A1 | 1/2019 |
| EP | 3439039 A1 | 2/2019 |
| EP | 3744085 A2 | 12/2020 |
| JP | 2002199292 A | 7/2002 |
| JP | 2003319262 A | 11/2003 |
| JP | 2005328493 A | 11/2005 |
| JP | 2006203736 A | 8/2006 |
| JP | 2007074447 A | 3/2007 |
| JP | 2011216966 A | 10/2011 |
| JP | 2012095349 A | 5/2012 |
| JP | 2013009087 A | 1/2013 |
| JP | 2013172203 A | 9/2013 |
| JP | 2014165733 A | 9/2014 |
| JP | 2016092661 A | 5/2016 |
| KR | 100574959 B1 | 4/2006 |
| KR | 20110050351 A | 5/2011 |
| KR | 20120058337 A | 6/2012 |
| KR | 20150095841 A | 8/2015 |
| KR | 20160008267 A | 1/2016 |
| KR | 20160008287 A | 1/2016 |
| WO | WO-2006124592 A2 | 11/2006 |
| WO | WO-2014055391 A2 | 4/2014 |
| WO | WO-2016095057 A1 | 6/2016 |
| WO | WO-2017003477 A1 | 1/2017 |
| WO | WO-2017013806 A1 | 1/2017 |
| WO | WO-2017047010 A1 | 3/2017 |
| WO | 2017069706 A1 | 4/2017 |
| WO | WO-2017058488 A1 | 4/2017 |
| WO | WO-2017169446 A1 | 10/2017 |
| WO | WO-2017169882 A1 | 10/2017 |
| WO | WO-2019018084 A1 | 1/2019 |
| WO | WO-2019111528 A1 | 6/2019 |
| WO | WO-2019145578 A1 | 8/2019 |
| WO | 2019168929 A1 | 9/2019 |

OTHER PUBLICATIONS

U.S. Appl. No. 15/801,216, "Advisory Action", dated Apr. 7, 2020, 3 pages.
U.S. Appl. No. 15/801,216, "Final Office Action", dated Dec. 26, 2019, 5 pages.
U.S. Appl. No. 15/801,216, "Non-Final Office Action", dated Jun. 27, 2019, 13 pages.
U.S. Appl. No. 15/801,216, "Notice of Allowance", dated Jun. 23, 2020, 5 pages.
U.S. Appl. No. 15/847,517, "Non-Final Office Action", dated Nov. 23, 2018, 21 pages.
U.S. Appl. No. 15/983,391, "Non-Final Office Action", dated Aug. 29, 2019, 12 pages.
U.S. Appl. No. 15/983,391, "Notice of Allowance", dated Apr. 8, 2020, 8 pages.
U.S. Appl. No. 16/210,748, "Final Office Action", dated Jul. 7, 2020, 11 pages.
U.S. Appl. No. 16/210,748, "Non-Final Office Action", dated Jan. 31, 2020, 11 pages.
U.S. Appl. No. 16/384,720, "Non-Final Office Action", dated May 1, 2020, 6 pages.
U.S. Appl. No. 16/384,720, "Notice of Allowance", dated Aug. 26, 2020, 8 pages.
U.S. Appl. No. 16/435,449, "Notice of Allowance", dated Jul. 27, 2020, 8 pages.
U.S. Appl. No. 16/436,049, "Non-Final Office Action", dated Jun. 30, 2020, 11 pages.
U.S. Appl. No. 16/436,049, "Non-Final Office Action", dated Mar. 4, 2020, 9 pages.
EP18179838.0, "Partial European Search Report", dated Dec. 5, 2018, 14 pages.
EP18188684.7, "Extended European Search Report", dated Jan. 16, 2019, 10 pages.
EP18188684.7, "Office Action", dated Nov. 26, 2019, 9 pages.
EP18188962.7, "Extended European Search Report", dated Oct. 23, 2018, 8 pages.
EP18188962.7, "Office Action", dated Aug. 28, 2019, 6 pages.
PCT/US2018/039350, "International Search Report and Written Opinion", dated Nov. 15, 2018, 13 pages.
PCT/US2018/039352, "International Search Report and Written Opinion", dated Oct. 26, 2018, 10 pages.

(56) References Cited

OTHER PUBLICATIONS

PCT/US2018/039431, "International Search Report and Written Opinion", dated Nov. 7, 2018, 14 pages.
PCT/US2018/045666, "International Preliminary Report on Patentability", dated Feb. 27, 2020, 11 pages.
PCT/US2018/045666, "International Search Report and Written Opinion", dated Dec. 3, 2018, 13 pages.
PCT/US2018/045673, "International Search Report and Written Opinion", dated Dec. 4, 2018, 13 pages.
PCT/US2018/064181, "International Search Report and Written Opinion", dated Mar. 29, 2019, 12 pages.
PCT/US2019/031521, "International Search Report and Written Opinion", dated Jul. 11, 2019, 11 pages.
PCT/US2019/036492, "International Search Report and Written Opinion", dated Sep. 25, 2019, 9 pages.
PCT/US2019/036536, "International Search Report and Written Opinion", dated Sep. 26, 2019, 14 pages.
PCT/US2019/047156, "International Search Report and Written Opinion", dated Oct. 23, 2019, 9 pages.
PCT/US2019/049756, "International Search Report and Written Opinion", dated Dec. 16, 2019, 8 pages.
U.S. Appl. No. 16/210,748, "Advisory Action", dated Oct. 8, 2020, 4 pages.
U.S. Appl. No. 16/384,720, "Notice of Allowance", dated Oct. 14, 2020, 8 pages.
U.S. Appl. No. 16/436,049, "Notice of Allowance", dated Oct. 21, 2020, 8 pages.
U.S. Appl. No. 16/544,136, "Notice of Allowance", dated Oct. 15, 2020, 11 pages.
U.S. Appl. No. 16/435,449, "Notice of Allowance", dated Sep. 16, 2020, 7 pages.
U.S. Appl. No. 16/407,072, "Non-Final Office Action", dated Dec. 24, 2020, 15 pages.
U.S. Appl. No. 16/384,720, "Corrected Notice of Allowability", dated Jan. 25, 2021, 4 pages.
U.S. Appl. No. 16/544,136, "Corrected Notice of Allowability", dated Jan. 29, 2021, 2 pages.
EP18886564.6, "Extended European Search Report", dated Jan. 26, 2021, 6 pages.
U.S. Appl. No. 16/210,748, "Non-Final Office Action", dated Feb. 2, 2021, 8 pages.
U.S. Appl. No. 16/436,049, "Notice of Allowance", dated Apr. 1, 2021, 8 pages.
U.S. Appl. No. 16/560,665, "Non-Final Office Action", dated Apr. 29, 2021, 17 pages.
Notice of Allowance for U.S. Appl. No. 16/407,072, dated Sep. 13, 2021, 10 pages.
Supplemental Notice of Allowability for U.S. Appl. No. 16/436,049, dated Jul. 8, 2021, 2 pages.
Notice of Allowance for U.S. Appl. No. 16/210,748, dated Jul. 9, 2021, 6 pages.
U.S. Appl. No. 16/407,072, "Notice of Allowance", dated Jun. 1, 2021, 11 pages.
Advisory Action dated Oct. 23, 2019 for U.S. Appl. No. 15/668,241, filed Aug. 3, 2017, 5 Pages.
Cho K., et al., "A Low Power Dual CDS for a Column-Parallel CMOS Image Sensor," Journal of Semiconductor Technology and Science, Dec. 30, 2012, vol. 12 (4), pp. 388-396.
Corrected Notice of Allowability dated Dec. 1, 2021 for U.S. Appl. No. 16/210,748, filed Dec. 5, 2018, 3 pages.
Corrected Notice of Allowability dated Dec. 7, 2021 for U.S. Appl. No. 16/210,748, filed Dec. 5, 2018, 3 pages.
Corrected Notice of Allowability dated Apr. 28, 2020 for U.S. Appl. No. 15/876,061, filed Jan. 19, 2018, 2 Pages.
Extended European Search Report for European Application No. 18179838.0, dated May 24, 2019, 17 Pages.
Extended European Search Report for European Application No. 18179846.3, dated Dec. 7, 2018, 10 Pages.
Extended European Search Report for European Application No. 18179851.3, dated Dec. 7, 2018, 8 Pages.
Extended European Search Report for European Application No. 18188968.4, dated Oct. 23, 2018, 8 Pages.
Extended European Search Report for European Application No. 18189100.3, dated Oct. 9, 2018, 8 Pages.
Final Office Action dated Nov. 3, 2021 for U.S. Appl. No. 16/560,665, filed Sep. 4, 2019, 19 Pages.
Final Office Action dated Apr. 15, 2020 for U.S. Appl. No. 16/566,583, filed Sep. 10, 2019, 24 Pages.
Final Office Action dated Jun. 17, 2019 for U.S. Appl. No. 15/668,241, filed Aug. 3, 2017, 19 Pages.
Final Office Action dated Feb. 27, 2020 for U.S. Appl. No. 16/177,971, filed Nov. 1, 2018, 9 Pages.
Final Office Action dated Apr. 29, 2020 for U.S. Appl. No. 15/719,345, filed Sep. 28, 2017, 14 Pages.
International Preliminary Report on Patentability for International Application No. PCT/US2018/039350, dated Jan. 9, 2020, 10 Pages.
International Preliminary Report on Patentability for International Application No. PCT/US2019/027727, dated Oct. 29, 2020, 8 Pages.
International Search Report and Written Opinion for International Application No. PCT/US2018/045661, dated Nov. 30, 2018, 11 Pages.
International Search Report and Written Opinion for International Application No. PCT/US2018/046131, dated Dec. 3, 2018, 10 Pages.
International Search Report and Written Opinion for International Application No. PCT/US2019/014044, dated May 8, 2019, 9 Pages.
International Search Report and Written Opinion for International Application No. PCT/US2019/019756, dated Jun. 13, 2019, 11 Pages.
International Search Report and Written Opinion for International Application No. PCT/US2019/025170, dated Jul. 9, 2019, 11 Pages.
International Search Report and Written Opinion for International Application No. PCT/US2019/027727, dated Jun. 27, 2019, 10 Pages.
International Search Report and Written Opinion for International Application No. PCT/US2019/027729, dated Jun. 27, 2019, 9 Pages.
International Search Report and Written Opinion for International Application No. PCT/US2019/035724, dated Sep. 10, 2019, 11 Pages.
International Search Report and Written Opinion for International Application No. PCT/US2019/036484, dated Sep. 19, 2019, 9 Pages.
International Search Report and Written Opinion for International Application No. PCT/US2019/036575, dated Sep. 30, 2019, 15 Pages.
International Search Report and Written Opinion for International Application No. PCT/US2019/039410, dated Sep. 30, 2019, 10 Pages.
International Search Report and Written Opinion for International Application No. PCT/US2019/039758, dated Oct. 11, 2019, 12 Pages.
International Search Report and Written Opinion for International Application No. PCT/US2019/048241, dated Jan. 28, 2020, 16 Pages.
International Search Report and Written Opinion for International Application No. PCT/US2019/065430, dated Mar. 6, 2020, 11 Pages.
Kavusi S., et al., "Quantitative Study of High-Dynamic-Range Image Sensor Architecture," Proceedings of Society of Photo-Optical Instrumentation Engineers, Jun. 7, 2004, vol. 5301, 12 Pages, XP055186908.
Non-Final Office Action dated May 1, 2019 for U.S. Appl. No. 15/927,896, filed Mar. 21, 2018, 10 Pages.
Non-Final Office Action dated Oct. 1, 2019 for U.S. Appl. No. 16/286,355, filed Feb. 26, 2019, 6 Pages.
Non-Final Office Action dated Oct. 1, 2019 for U.S. Appl. No. 16/566,583, filed Sep. 10, 2019, 10 Pages.
Non-Final Office Action dated Jan. 8, 2020 for U.S. Appl. No. 16/285,873, filed Feb. 26, 2019, 14 Pages.

(56) References Cited

OTHER PUBLICATIONS

Non-Final Office Action dated Jul. 10, 2019 for U.S. Appl. No. 15/861,588, filed Jan. 3, 2018, 11 Pages.
Non-Final Office Action dated Sep. 18, 2019 for U.S. Appl. No. 15/876,061, filed Jan. 19, 2018, 23 Pages.
Non-Final Office Action dated Dec. 21, 2018 for U.S. Appl. No. 15/668,241, filed Aug. 3, 2017, 16 Pages.
Non-Final Office Action dated Jul. 22, 2020 for U.S. Appl. No. 16/249,420, filed Jan. 16, 2019, 9 Pages.
Non-Final Office Action dated Jul. 22, 2020 for U.S. Appl. No. 16/369,763, filed Mar. 29, 2019, 15 Pages.
Non-Final Office Action dated Nov. 25, 2019 for U.S. Appl. No. 15/719,345, filed Sep. 28, 2017, 14 Pages.
Non-Final Office Action dated Sep. 25, 2019 for U.S. Appl. No. 16/177,971, filed Nov. 1, 2018, 9 Pages.
Non-Final Office Action dated Jul. 27, 2020 for U.S. Appl. No. 16/566,583, filed Sep. 10, 2019, 11 Pages.
Non-Final Office Action dated Jan. 30, 2020 for U.S. Appl. No. 16/431,693, filed Jun. 4, 2019, 6 Pages.
Notice of Allowability dated May 6, 2020 for U.S. Appl. No. 15/876,061, filed Jan. 19, 2018, 2 Pages.
Notice of Allowance dated Dec. 1, 2021 for U.S. Appl. No. 16/210,748, filed Dec. 5, 2018, 11 pages.
Notice of Allowance dated May 1, 2019 for U.S. Appl. No. 15/847,517, filed Dec. 19, 2017, 11 Pages.
Notice of Allowance dated Sep. 3, 2020 for U.S. Appl. No. 15/719,345, filed Sep. 28, 2017, 12 Pages.
Notice of Allowance dated Feb. 4, 2020 for U.S. Appl. No. 15/876,061, filed Jan. 19, 2018, 13 Pages.
Notice of Allowance dated Jun. 4, 2020 for U.S. Appl. No. 16/286,355, filed Feb. 26, 2019, 7 Pages.
Notice of Allowance dated Mar. 5, 2020 for U.S. Appl. No. 15/668,241, filed Aug. 3, 2017, 8 Pages.
Notice of Allowance dated Dec. 7, 2021 for U.S. Appl. No. 16/210,748, filed Dec. 5, 2018, 11 pages.
Notice of Allowance dated Jul. 9, 2020 for U.S. Appl. No. 16/454,787, filed Jun. 27, 2019, 9 Pages.
Notice of Allowance dated Jun. 11, 2020 for U.S. Appl. No. 16/382,015, filed Apr. 11, 2019, 11 Pages.
Notice of Allowance dated Aug. 12, 2020 for U.S. Appl. No. 15/719,345, filed Sep. 28, 2017, 10 Pages.
Notice of Allowance dated Feb. 12, 2020 for U.S. Appl. No. 16/286,355, filed Feb. 26, 2019, 7 Pages.
Notice of Allowance dated Dec. 16, 2021 for U.S. Appl. No. 16/407,072, filed May 8, 2019, 2 pages.
Notice of Allowance dated Jun. 18, 2020 for U.S. Appl. No. 16/285,873, filed Feb. 26, 2019, 10 Pages.
Notice of Allowance dated Oct. 18, 2019 for U.S. Appl. No. 15/983,379, filed May 18, 2018, 9 Pages.
Notice of Allowance dated Apr. 22, 2020 for U.S. Appl. No. 16/454,787, filed Jun. 27, 2019, 10 Pages.
Notice of Allowance dated Apr. 24, 2020 for U.S. Appl. No. 16/177,971, filed Nov. 1, 2018, 6 Pages.
Notice of Allowance dated Jun. 24, 2020 for U.S. Appl. No. 16/431,693, filed Jun. 4, 2019, 7 Pages.
Notice of Allowance dated Sep. 24, 2020 for U.S. Appl. No. 15/668,241, filed Aug. 3, 2017, 13 Pages.
Notice of Allowance dated Nov. 26, 2019 for U.S. Appl. No. 15/861,588, filed Jan. 3, 2018, 9 Pages.
Notice of Allowance dated Oct. 27, 2021 for U.S. Appl. No. 16/210,748, filed Dec. 5, 2018, 6 Pages.
Notice of Allowance dated Jun. 29, 2020 for U.S. Appl. No. 15/668,241, filed Aug. 3, 2017, 8 Pages.
Office Action dated Aug. 14, 2019 for European Application No. 18188968.4, filed Aug. 14, 2018, 5 Pages.
Snoeij M.F., et al., "A Low-Power Column-Parallel 12-bit ADC for CMOS Imagers," Harvestimaging [online], Proceedings IEEE Workshop on Charge-Coupled Devices and Advanced Image Sensors (CCDS & AIS), Published date: Jun. 1, 2005, pp. 169-172, XP007908033, Retrieved from the Internet: URL: http://www.harvestimaging.com/pubdocs/084_2005_june_workshop.pdf.
Supplemental Notice of Allowability dated Apr. 29, 2020 for U.S. Appl. No. 15/668,241, filed Aug. 3, 2017, 5 Pages.
Tanner S., et al., "Low-Power Digital Image Sensor for Still Picture Image Acquisition," Visual Communications and Image Processing, San Jose, Jan. 22, 2001, vol. 4306, pp. 358-365, XP008014232.
Xu C., et al., "A New Digital-Pixel Architecture for CMOS Image Sensor with Pixel-Level ADC and Pulse Width Modulation using a 0.18 um CMOS Technology," Electron Devices and Solid-State Circuits, IEEE Conference on Kowloon, Hong Kong, Piscataway, NJ, USA, Dec. 16, 2003, pp. 265-268, XP010695857.
Advisory Action dated Oct. 1, 2021 for U.S. Appl. No. 17/083,920, filed Oct. 29, 2020, 4 pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Feb. 3, 2021 for U.S. Appl. No. 16/566,583, filed Sep. 10, 2019, 2 Pages.
Corrected Notice of Allowability dated Apr. 9, 2021 for U.S. Appl. No. 16/255,528, filed Jan. 23, 2019, 5 Pages.
Corrected Notice of Allowability dated Dec. 11, 2020 for U.S. Appl. No. 16/566,583, filed Sep. 10, 2019, 2 Pages.
Corrected Notice of Allowability dated Jul. 26, 2021 for U.S. Appl. No. 16/707,988, filed Dec. 9, 2019, 2 Pages.
Corrected Notice of Allowance dated Mar. 7, 2022 for U.S. Appl. No. 17/150,925, filed Jan. 15, 2021, 2 Pages.
Extended European Search Report for European Application No. 19743908.6, dated Sep. 30, 2020, 9 Pages.
Final Office Action dated Dec. 3, 2021 for U.S. Appl. No. 17/072,840, filed Oct. 16, 2020, 23 pages.
Final Office Action dated Jul. 12, 2021 for U.S. Appl. No. 16/435,451, filed Jun. 7, 2019, 13 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Preliminary Report on Patentability for International Application No. PCT/US2020/044807, dated Feb. 17, 2022, 10 pages.
International Search Report and Written Opinion for International Application No. PCT/US2019/014904, dated Aug. 5, 2019, 7 Pages.
International Search Report and Written Opinion for International Application No. PCT/US2019/019765, dated Jun. 14, 2019, 9 Pages.
International Search Report and Written Opinion for International Application No. PCT/US2019/034007, dated Oct. 28, 2019, 18 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.

(56) References Cited

OTHER PUBLICATIONS

International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
International Search Report and Written Opinion for International Application No. PCT/US2021/054327, dated Feb. 14, 2022, 8 pages.
International Search Report and Written Opinion for International Application No. PCT/US2021/057966, dated Feb. 22, 2022, 15 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Feb. 1, 2021 for U.S. Appl. No. 16/435,451, filed Jun. 7, 2019, 14 Pages.
Non-Final Office Action dated Jan. 1, 2021 for U.S. Appl. No. 16/715,792, filed Dec. 16, 2019, 15 Pages.
Non-Final Office Action dated Jul. 2, 2021 for U.S. Appl. No. 16/820,594, filed Mar. 16, 2020, 8 Pages.
Non-Final Office Action dated Mar. 2, 2022 for U.S. Appl. No. 17/127,670, filed Dec. 18, 2020, 18 pages.
Non-Final Office Action dated Sep. 2, 2021 for U.S. Appl. No. 16/910,844, filed Jun. 24, 2020, 7 Pages.
Non-Final Office Action dated Dec. 4, 2020 for U.S. Appl. No. 16/436,137, filed Jun. 10, 2019, 12 Pages.
Non-Final Office Action dated May 7, 2021 for U.S. Appl. No. 16/421,441, filed May 23, 2019, 17 Pages.
Non-Final Office Action dated Jun. 8, 2021 for U.S. Appl. No. 17/072,840, filed Oct. 16, 2020, 7 Pages.
Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Mar. 15, 2021 for U.S. Appl. No. 16/896,130, filed Jun. 8, 2020, 16 Pages.
Non-Final Office Action dated Apr. 21, 2021 for U.S. Appl. No. 16/453,538, filed Jun. 26, 2019, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated Sep. 22, 2020 for U.S. Appl. No. 16/707,988, filed Dec. 9, 2019, 15 Pages.
Non-Final Office Action dated Jul. 25, 2019 for U.S. Appl. No. 15/909,162, filed Mar. 1, 2018, 20 Pages.
Non-Final Office Action dated Apr. 27, 2021 for U.S. Appl. No. 16/829,249, filed Mar. 25, 2020, 9 Pages.
Notice of Allowance dated Apr. 1, 2021 for U.S. Appl. No. 16/255,528, filed Jan. 23, 2019, 7 Pages.
Notice of Allowance dated Mar. 2, 2022 for U.S. Appl. No. 16/453,538, filed Jun. 26, 2019, 8 Pages.
Notice of Allowance dated Nov. 2, 2021 for U.S. Appl. No. 16/453,538, filed Jun. 26, 2019, 8 Pages.
Notice of Allowance dated Nov. 3, 2020 for U.S. Appl. No. 16/566,583, filed Sep. 10, 2019, 11 Pages.
Notice of Allowance dated May 5, 2021 for U.S. Appl. No. 16/707,988, filed Dec. 9, 2019, 14 Pages.
Notice of Allowance dated Jan. 7, 2022 for U.S. Appl. No. 16/899,908, filed Jun. 12, 2020, 10 pages.
Notice of Allowance dated Mar. 7, 2022 for U.S. Appl. No. 16/421,441, filed May 23, 2019, 18 pages.
Notice of Allowance dated Dec. 8, 2021 for U.S. Appl. No. 16/829,249, filed Mar. 25, 2020, 6 pages.
Notice of Allowance dated Jul. 8, 2021 for U.S. Appl. No. 17/150,925, filed Jan. 15, 2021, 10 Pages.
Notice of Allowance dated Sep. 9, 2020 for U.S. Appl. No. 16/454,787, filed Jun. 27, 2019, 9 Pages.
Notice of Allowance dated Mar. 11, 2022 for U.S. Appl. No. 16/716,050, filed Dec. 16, 2019, 13 pages.
Notice of Allowance dated Jul. 13, 2021 for U.S. Appl. No. 16/896,130, filed Jun. 8, 2020, 8 Pages.
Notice of Allowance dated Feb. 14, 2022 for U.S. Appl. No. 16/715,792, filed Dec. 16, 2019, 9 pages.
Notice of Allowance dated Apr. 16, 2021 for U.S. Appl. No. 16/715,792, filed Dec. 16, 2019, 10 Pages.
Notice of Allowance dated Feb. 16, 2022 for U.S. Appl. No. 17/150,925, filed Jan. 15, 2021, 9 pages.
Notice of Allowance dated Nov. 17, 2021 for U.S. Appl. No. 16/899,908, filed Jun. 12, 2020, 7 Pages.
Notice of Allowance dated Sep. 17, 2021 for U.S. Appl. No. 16/899,908, filed Jun. 12, 2020, 11 Pages.
Notice of Allowance dated Mar. 18, 2020 for U.S. Appl. No. 15/909,162, filed Mar. 1, 2018, 9 Pages.
Notice of Allowance dated Nov. 18, 2020 for U.S. Appl. No. 16/249,420, filed Jan. 16, 2019, 8 Pages.
Notice of Allowance dated Apr. 19, 2022 for U.S. Appl. No. 16/550,851, filed Aug. 26, 2019, 08 pages.
Notice of Allowance dated Dec. 21, 2021 for U.S. Appl. No. 16/550,851, filed Aug. 26, 2019, 10 pages.
Notice of Allowance dated Dec. 22, 2021 for U.S. Appl. No. 16/910,844, filed Jun. 24, 2020, 7 pages.
Notice of Allowance dated Feb. 22, 2022 for U.S. Appl. No. 17/083,920, filed Oct. 29, 2020, 10 pages.
Notice of Allowance dated Jan. 22, 2021 for U.S. Appl. No. 16/369,763, filed Mar. 29, 2019, 8 Pages.
Notice of Allowance dated Nov. 22, 2021 for U.S. Appl. No. 16/820,594, filed Mar. 16, 2020, 18 pages.
Notice of Allowance dated Nov. 22, 2021 for U.S. Appl. No. 16/820,594, filed Mar. 16, 2020, 8 pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Oct. 25, 2021 for U.S. Appl. No. 16/435,451, filed Jun. 7, 2019, 8 Pages.
Notice of Allowance dated Oct. 26, 2021 for U.S. Appl. No. 16/896,130, filed Jun. 8, 2020, 8 Pages.
Notice of Allowance dated Aug. 30, 2021 for U.S. Appl. No. 16/829,249, filed Mar. 25, 2020, 8 pages.
Notice of Reason for Rejection dated Nov. 16, 2021 for Japanese Application No. 2019-571699, filed Jun. 25, 2018, 13 pages.
Notification of the First Office Action dated Oct. 28, 2021 for Chinese Application No. 2019800218483, filed Jan. 24, 2019, 17 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Jul. 7, 2021 for European Application No. 19737299.8, filed Jun. 11, 2019, 5 Pages.
Office Action dated Mar. 9, 2021 for Chinese Application No. 201810821296, filed Jul. 24, 2018, 10 Pages.
Office Action dated Dec. 14, 2021 for Japanese Application No. 2019571598, filed Jun. 26, 2018, 12 pages.
Office Action dated Jun. 28, 2020 for Chinese Application No. 201810821296, filed Jul. 24, 2018, 2 Pages.
Office Action dated Sep. 30, 2021 for Taiwan Application No. 107124385, 17 Pages.
Partial International Search Report and Provisional Opinion for International Application No. PCT/US2021/041775, dated Oct. 8, 2021, 12 pages.

(56) References Cited

OTHER PUBLICATIONS

Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power Column-Parallel 12-bit ADC for CMOS Imagers," XP007908033, Jun. 1, 2005, pp. 169-172.
Office Action dated May 10, 2022 for Taiwan Application No. 108122610, 19 pages.
Non-Final Office Action dated Aug. 1, 2022 for U.S. Appl. No. 16/550,851, filed Aug. 26, 2019, 7 pages.
Office Action dated Jul. 6, 2022 for Chinese Application No. 201980024435.0, filed Apr. 1, 2019, 16 pages.
Non-Final Office Action dated Sep. 14, 2022 for U.S. Appl. No. 17/364,763, filed Jun. 30, 2021, 13 pages.
Notice of Allowance dated Aug. 16, 2022 for U.S. Appl. No. 16/453,538, filed Jun. 26, 2019, 2 pages.
Notice of Allowance dated Aug. 31, 2022 for U.S. Appl. No. 16/453,538, filed Jun. 26, 2019, 2 pages.
International Search Report and Written Opinion for International Application No. PCT/US2022/044519, dated Dec. 8, 2022, 12 pages.
Non-Final Office Action dated Oct. 13, 2022 for U.S. Appl. No. 17/538,092, filed Nov. 30, 2021, 10 pages.
Office Action dated Oct. 20, 2022 for European Application No. 19740456.9, filed Jun. 27, 2019, 6 pages.
Office Action dated Oct. 26, 2022 for Taiwan Application No. 108122610, 9 pages.

\* cited by examiner

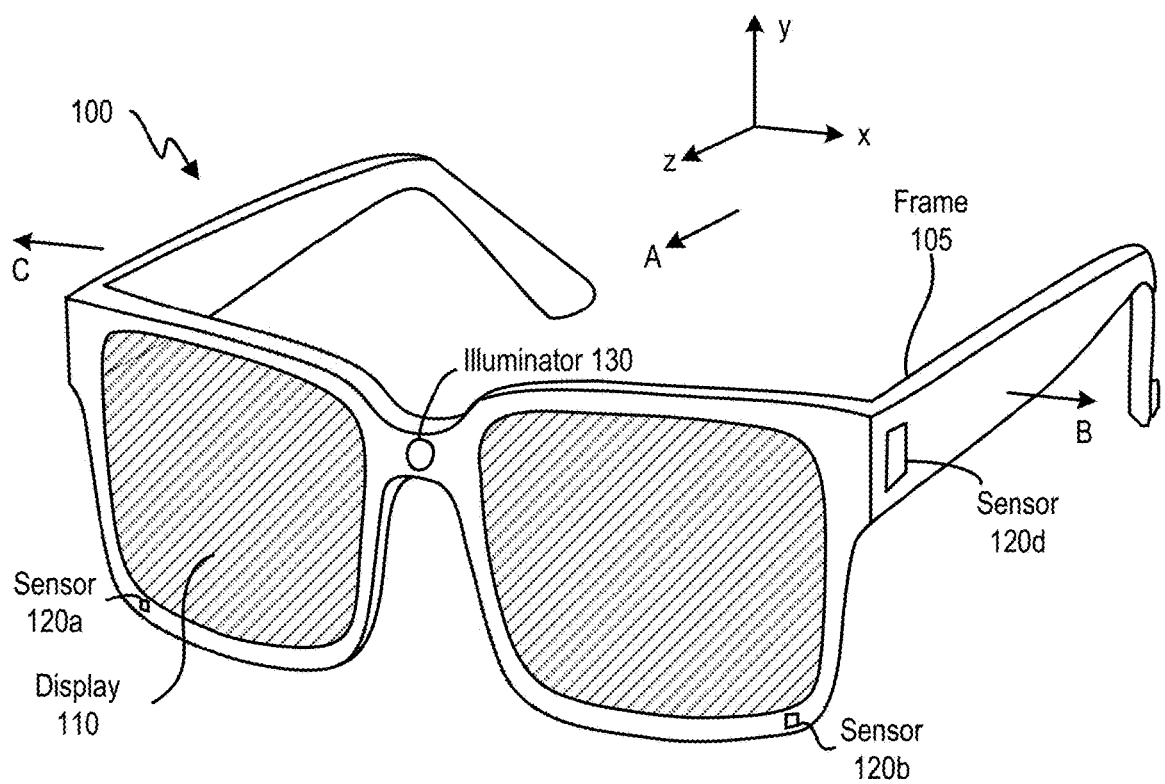
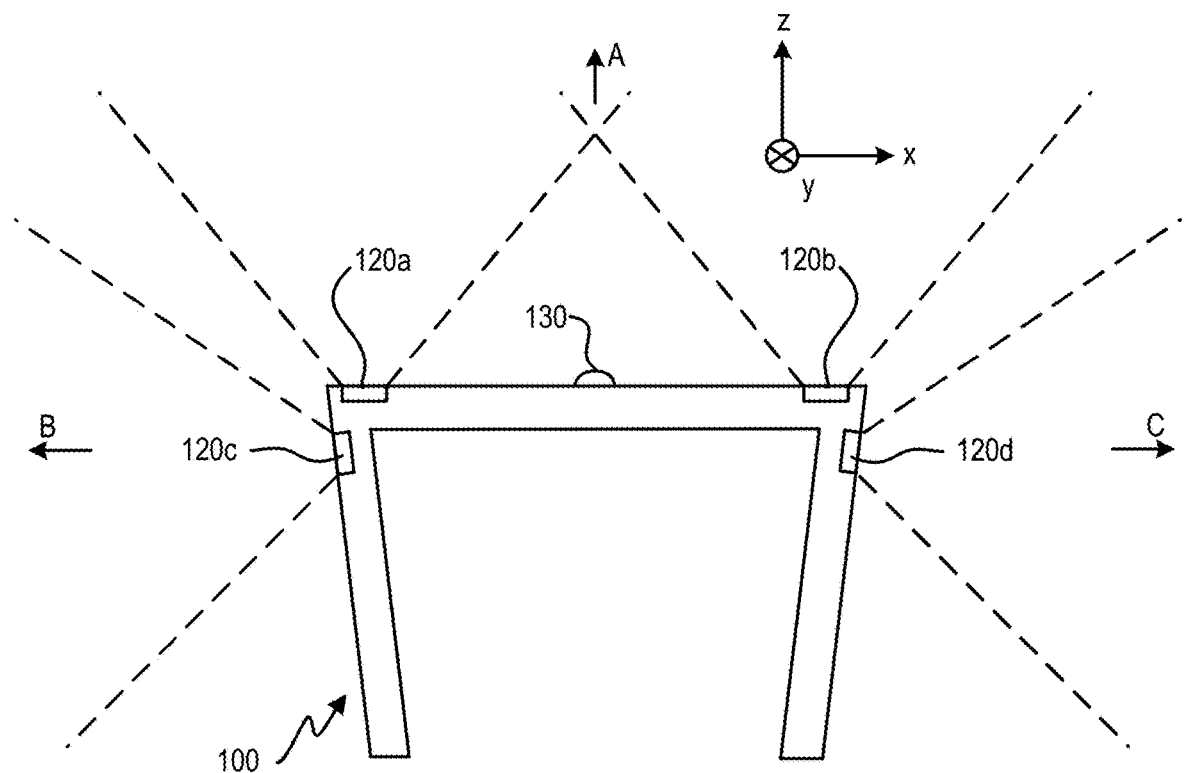
FIG. 1A

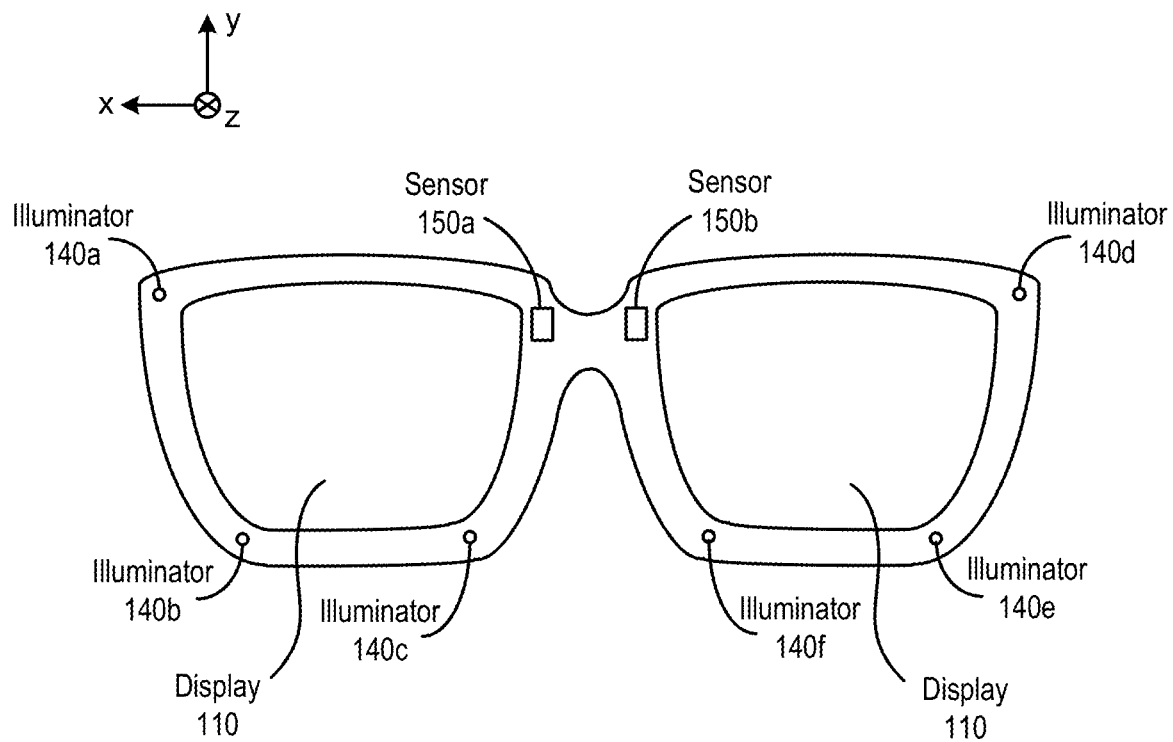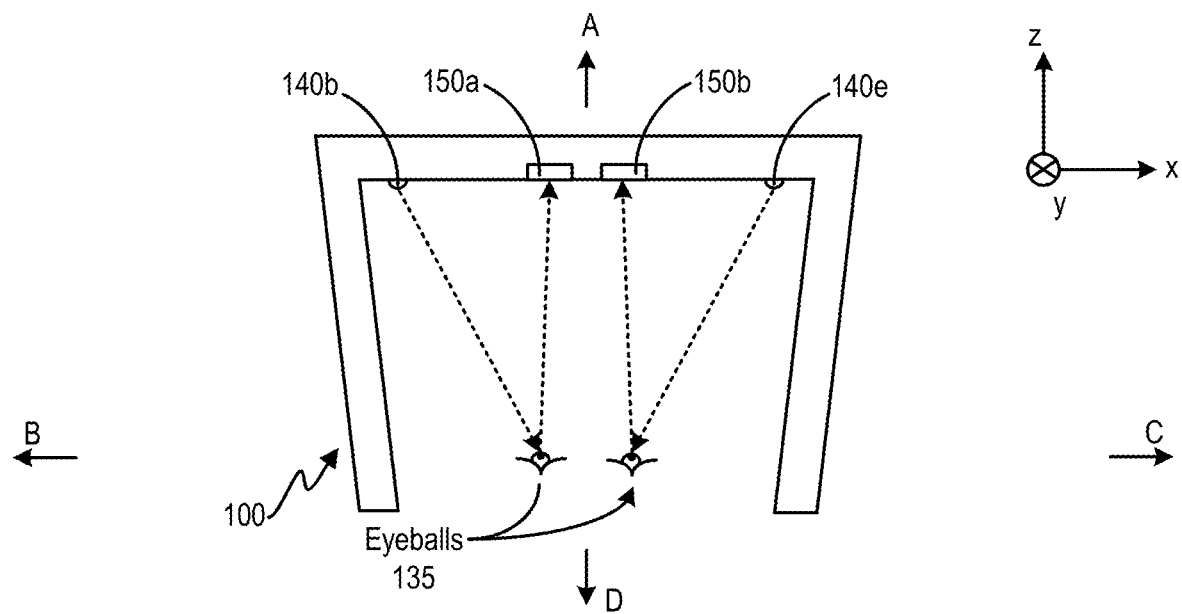
FIG. 1B

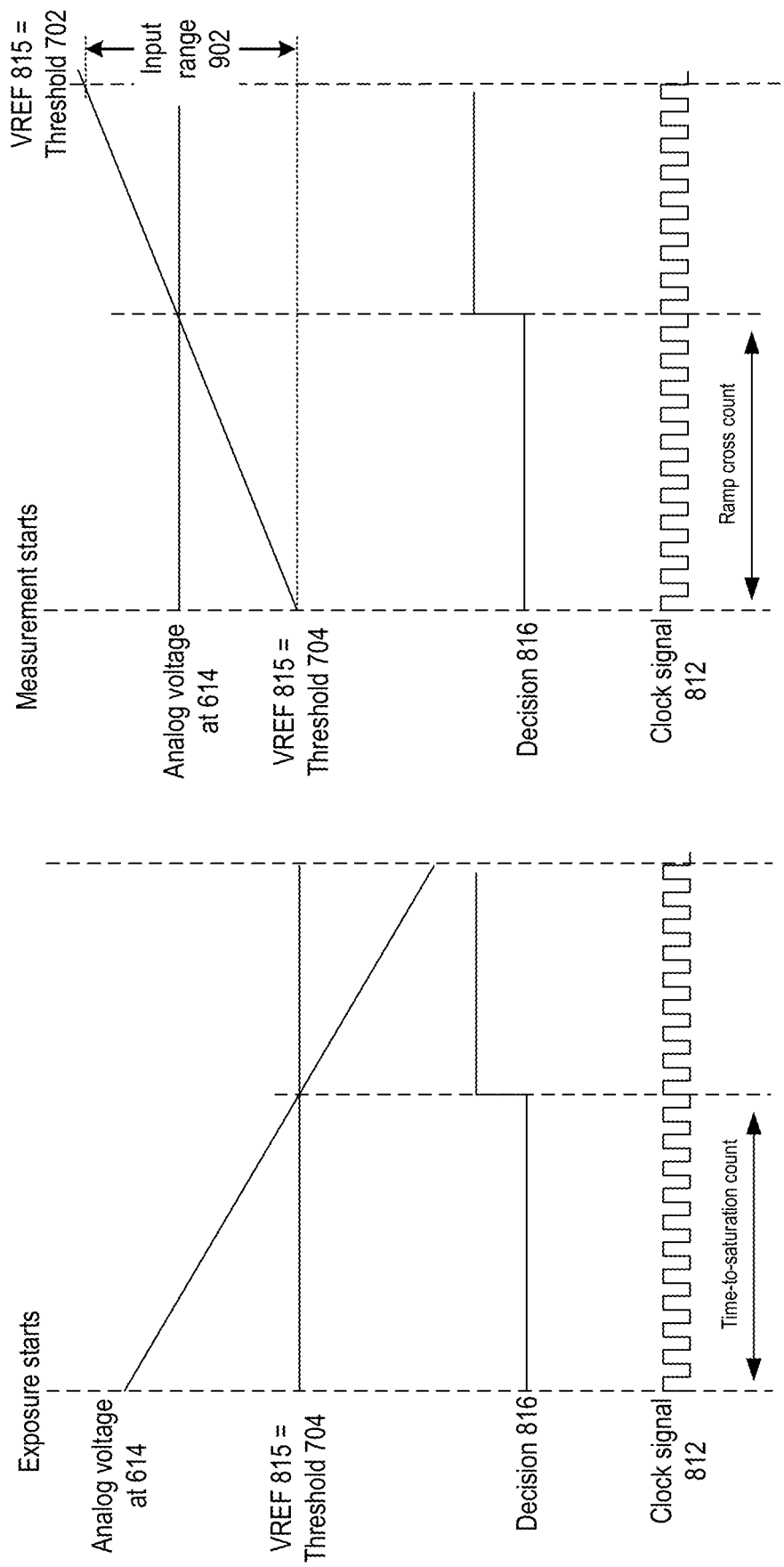

1800 →

```
┌─────────────────────────────────────────────────────────────────────────┐
│ Generating, by an analog-to-digital (A/D) converter, raw digital outputs based on performing │
│ at least one of (1) a first quantization operation to quantize a physical stimulus within a first │
│ intensity range based on a first A/D conversion relationship and (2) a second quantization  │─1802
│ operation to quantize the physical stimulus within a second intensity range based on a  │
│ second A/D conversion relationship                                                       │
└─────────────────────────────────────────────────────────────────────────┘
                                        │
                                        ▼
┌─────────────────────────────────────────────────────────────────────────┐
│ Generating, by a raw output conversion circuit, a refined digital output based on a raw digital │
│ output obtained from the A/D converter and at least one predetermined conversion        │─1804
│ parameter, wherein the at least one conversion parameter compensates for a discontinuity │
│ between the first A/D conversion relationship and the second A/D conversion relationship │
└─────────────────────────────────────────────────────────────────────────┘
```

IMAGE SENSOR POST PROCESSING

RELATED APPLICATION

This patent application claims priority to U.S. Provisional Patent Application Ser. No. 62/755,835, filed Nov. 5, 2018, entitled "System and Method for Image Correction, Linearization, and Calibration of Pixel Sensors," which is assigned to the assignee hereof and is incorporated herein by reference in its entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charge (e.g., electrons or holes). The image sensor further includes a floating node configured as a capacitor to collect the charge generated by the photodiode during an integration period. The collected charge can develop a voltage at the capacitor. The voltage can be buffered and fed to an analog-to-digital converter (ADC, or A/D converter), which can quantize the voltage into a digital value representing the intensity of the incident light. The image sensor can generate multiple digital values for different light intensities. The digital values can be provided to support various applications, such as image feature extraction, depth sensing, location determination, etc.

SUMMARY

The present disclosure relates to image sensors. More specifically, and without limitation, this disclosure relates to a pixel cell. This disclosure also relates to post-processing of sensor data generated by the pixel cell. This disclosure also relates to calibration techniques to obtain parameters for the post-processing of the sensor data.

The present disclosure provides an apparatus for measuring a physical quantity. In one example, an apparatus comprises an analog-to-digital (A/D) converter configured to generate raw digital outputs based on performing at least one of: (1) a first quantization operation to quantize a physical stimulus within a first intensity range based on a first A/D conversion relationship, or (2) a second quantization operation to quantize the physical stimulus within a second intensity range based on a second A/D conversion relationship. The apparatus further comprises a raw output conversion circuit configured generate a refined digital output based on a raw digital output obtained from the A/D converter and at least one predetermined conversion parameter. The at least one conversion parameter compensates for a discontinuity between the first A/D conversion relationship and the second A/D conversion relationship.

In one aspect, the physical stimulus comprises light. The apparatus further includes: a photodiode configured to: generate charge in response to incident light within an integration period, and accumulate at least a part of the charge as residual charge until the photodiode saturates. The apparatus further includes a capacitor configured to accumulate the remaining charge as overflow charge until the capacitor saturates. The A/D converter is configured to: perform the first quantization operation to quantize the residual charge accumulated at the photodiode to generate a first raw digital output; and perform the second quantization operation to quantize at least one of the residual charge or the overflow charge accumulated at the capacitor to generate a second raw digital output. The raw output conversion circuit is configured to: generate a first refined digital output from the first raw digital output based on one or more first conversion parameters associated with the first intensity range; and generate a second refined digital output from the second raw digital output based on one or more second conversion parameters associated with the second intensity range.

In one aspect, the one or more first conversion parameters comprise a first offset compensation parameter. The first offset compensation parameter includes a component representing a quantity of dark charge accumulated at the photodiode within the integration period. The first offset compensation parameter is determined based on a calibration process which measures the quantity of the dark charge present at a raw digital output of the A/D converter when the photodiode is exposed to an intensity of light lower than or equal to a minimum intensity of incident light to be measured by the apparatus.

In one aspect, the one or more second conversion parameters comprise a second offset compensation parameter. The second offset compensation parameter includes a component related to the first offset compensation parameter and is determined based on the calibration process in which the apparatus generates the first raw digital output from the first quantization operation and the second raw digital output from the second quantization operation to represent a first intensity of incident light. The second offset compensation parameter is based on a difference between the first raw digital output and the second raw digital output.

In one aspect, the capacitor has a configurable capacitance. The first quantization operation comprises configuring the capacitor to have a first capacitance and transferring the residual charge to the capacitor having the first capacitance to develop a first voltage, and quantizing the first voltage. The second quantization operation comprises configuring the capacitor to have a second capacitance and transferring at least one of the residual charge or the overflow charge to the capacitor having the second capacitance to develop a second voltage, and quantizing the second voltage. The one or more second conversion parameters comprise a ratio between the first capacitance and the second capacitance. The ratio is determined based on the first raw digital output, the second raw digital output, a third raw digital output from the first quantization operation to represent a second intensity of incident light, and a fourth raw digital output from the second quantization operation to represent the second intensity of incident light.

In one aspect, the second offset compensation parameter comprises a component related to the ratio.

In one aspect, the A/D converter is configured to perform a third quantization operation to measure a saturation time for a quantity of the overflow charge accumulated at the capacitor to reach a threshold, and to generate a third raw digital output based on the saturation time. The raw output conversion circuit is configured to generate a third refined digital output from the third raw digital output based on one or more third conversion parameters associated with a third intensity range.

In one aspect, the one or more third conversion parameters comprise a third offset compensation parameter. The third offset compensation parameter is determined based on the calibration process in which the apparatus generates a fourth raw digital output from the second quantization operation and the third raw digital output from the third quantization operation to represent a third intensity of incident light. The third offset compensation parameter is based on a difference between the third raw digital output and the fourth raw digital output.

In one aspect, the one or more third conversion parameters comprise a scaling factor that converts the saturation time to an extrapolated quantity of the overflow charge and is determined based on the third raw digital output, the fourth raw digital output, a fifth raw digital output from the second quantization operation to represent a fourth intensity of incident light, and a sixth raw digital output from the third quantization operation to present the fourth intensity of incident light.

In one aspect, the scaling factor includes a component related to the ratio.

In one aspect, the A/D converter and the raw output conversion circuit are on different integrated circuit chips.

The present disclosure also provides a method to generate the conversion parameters. In one example, a method comprises: performing, by an analog-to-digital (A/D) converter, a first quantization operation to quantize a physical stimulus having a first intensity based on a first A/D conversion relationship to generate a first raw digital output; performing, by the A/D converter, a second quantization operation to quantize the physical stimulus having the first intensity based on a second A/D conversion relationship to generate a second raw digital output; and generating, based on at least one of the first raw digital output or the second raw digital output, at least one conversion parameter to combine with the at least one of the first raw digital output or the second raw digital output to compensate for a discontinuity between the first A/D conversion relationship and the second A/D conversion relationship.

In one aspect, the physical stimulus comprises light. The first quantization operation is performed to measure a quantity of residual charge accumulated by a photodiode in response to the light within an integration period. The second quantization operation is performed to measure a quantity of at least one of overflow charge or the residual charge transferred from the photodiode to a capacitor.

In one aspect, the at least one conversion parameter comprises a first offset compensation parameter. The first intensity is a minimum intensity of the light to be quantized by the first quantization operation. The first offset compensation parameter is generated based on the first raw digital output and not based on the second raw digital output.

In one aspect, the first intensity is a first intensity of the light. The at least one conversion parameter comprises a second offset compensation parameter. The second offset compensation parameter is generated based on a difference between the first raw digital output and the second raw digital output.

In one aspect, the capacitor has a configurable capacitance. The first quantization operation comprises configuring the capacitor to have a first capacitance and transferring the residual charge to the capacitor having the first capacitance to develop a first voltage, and quantizing the first voltage. The second quantization operation comprises configuring the capacitor to have a second capacitance and transferring at least one of the residual charge or the overflow charge to the capacitor having the second capacitance to develop a second voltage, and quantizing the second voltage. The at least one conversion parameter comprises a ratio between the first capacitance and the second capacitance. The method further comprises: performing, by the A/D converter, the first quantization operation to quantize light of a second intensity to generate a third raw digital output; performing, by the A/D converter, the second quantization operation to quantize light of the second intensity to generate a fourth raw digital output; and generating the ratio based on the first raw digital output, the second raw digital output, the third raw digital output, and the fourth raw digital output.

In some aspects, the at least one conversion parameter comprises a third offset compensation parameter. The method further comprises: performing, by the A/D converter, a third quantization operation to quantize light of third intensity to generate a third raw digital output, the third quantization operation comprising measuring a saturation time for the quantity of the overflow charge accumulated at the capacitor to reach a threshold, and generating a third raw digital output based on the saturation time; performing, by the A/D converter, the second quantization operation to quantize light of the third intensity to generate a fourth raw digital output; and determining the third offset compensation parameter based on a difference between the third raw digital output and the fourth raw digital output.

In some aspects, the at least one conversion parameter comprises a scaling factor that converts the saturation time to an extrapolated quantity of the overflow charge. The method further comprises: performing, by the A/D converter, the third quantization operation to quantize light of fourth intensity to generate a fifth raw digital output; performing, by the A/D converter, the second quantization operation to quantize light of the fourth intensity to generate a sixth raw digital output; and determining the scaling factor based on the third raw digital output, the fourth raw digital output, the fifth raw digital output, and the sixth raw digital output.

The present disclosure further provides a method for measuring a physical quantity. In one example, the method comprises: generating, by an analog-to-digital (A/D) converter, raw digital outputs based on performing at least one of: (1) a first quantization operation to quantize a physical stimulus within a first intensity range based on a first A/D conversion relationship, or (2) a second quantization operation to quantize the physical stimulus within a second intensity range based on a second A/D conversion relationship; and generating, by a raw output conversion circuit, a refined digital output based on a raw digital output obtained from the A/D converter and at least one predetermined conversion parameter. The at least one conversion parameter compensates for a discontinuity between the first A/D conversion relationship and the second A/D conversion relationship.

In one aspect, the physical stimulus comprises light. The first quantization operation is performed to measure a quantity of residual charge accumulated by a photodiode in response to the light within an integration period. The second quantization operation is performed to measure a quantity of at least one of overflow charge or the residual charge transferred from the photodiode to a capacitor.

BRIEF DESCRIPTION OF THE DRAWINGS

Illustrative embodiments are described with reference to the following figures.

FIG. 1A and FIG. 1B are diagrams of an embodiment of a near-eye display.

FIG. 9A and FIG. 9B illustrate example methods for determining a light intensity.

FIG. 18 illustrates a flowchart of an example process for measuring light intensity.

Figure 2:
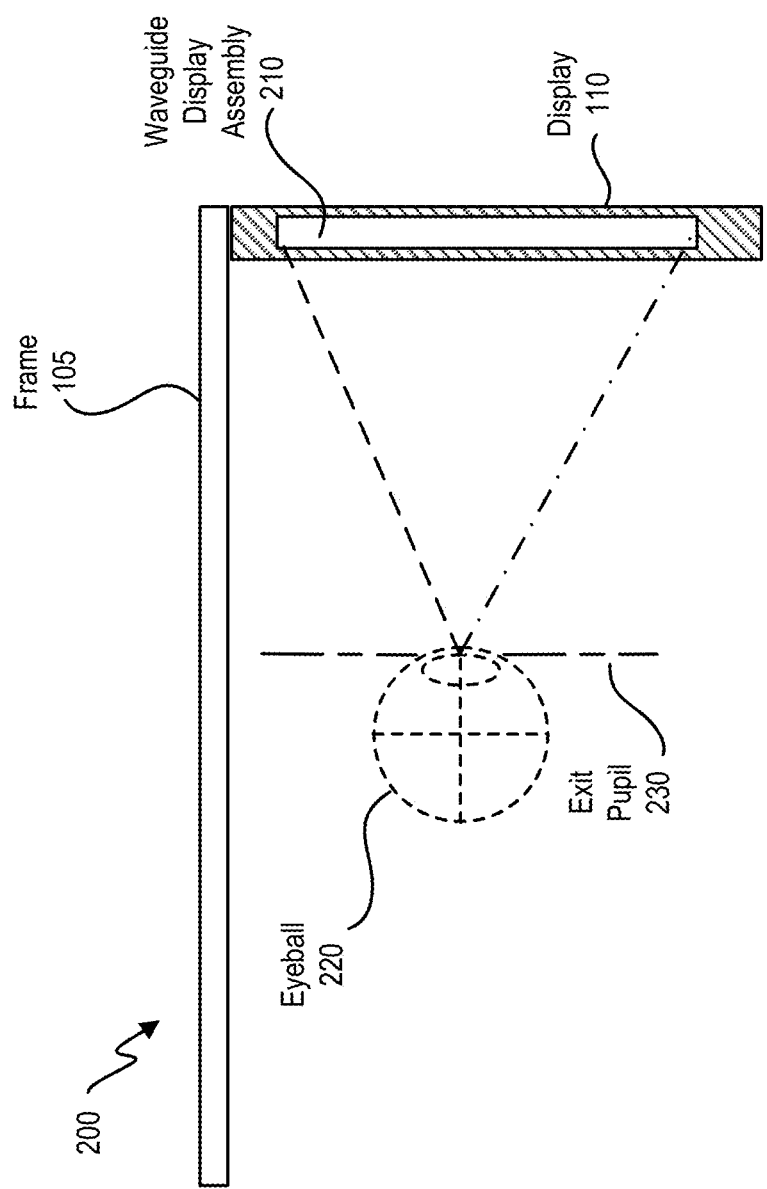
FIG. 2 is an embodiment of a cross section of the near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes a photodiode to sense incident light by converting photons into charge (e.g., electrons or holes). The image sensor further includes a floating node configured as a capacitor to collect the charge generated by the photodiode during an integration period. The collected charge can develop a voltage at the capacitor. The voltage can be buffered and fed to an analog-to-digital converter (ADC), which can convert the voltage into a digital value representing the intensity of the incident light.

The digital value generated by the ADC, which reflects a quantity of charge stored at the floating node within a certain period, may correlate to the intensity of the incident light. However, the degree of correlation can be affected by different factors. First, the quantity of charge stored in the floating node can be directly related to the intensity of the incident light until the floating node reaches a saturation limit. Beyond the saturation limit, the floating node may be unable to accept additional charge generated by the photodiode, and the additional charge may be leaked and not stored. As a result, the quantity of the charge stored at the floating node may be lower than the quantity of charge actually generated by the photodiode. The saturation limit may determine an upper limit of the measurable light intensity of the image sensor.

Various factors can also set a lower limit of the measurable light intensity of the image sensor. For example, the charge collected at the floating node may include noise charge not related to the intensity of incident light, as well as dark charge contributed by dark current. Dark current can include leakage currents generated at the p-n junction of the photodiode and at the p-n junctions of other semiconductor devices connected to the capacitor, due to crystallographic defects. The dark currents can flow into the capacitor and add charges which are not correlated to the intensity of the incident light. The dark current generated at the photodiode is typically less than the dark current generated at other semiconductor devices. Another source of noise charge can be capacitive coupling with other circuitries. For example, when the ADC circuitries perform read operations to determine the quantity of charge stored in the floating node, the ADC circuitries can introduce noise charge into the floating node through capacitive coupling.

Besides noise charge, the ADC can also introduce measurement errors in determining the quantity of charge. The measurement errors can degrade the degree of correlation between the digital output and the intensity of the incident light. One source of measurement error is quantization error. In a quantization process, a discrete set of quantity levels can be used to represent a continuous set of quantities of charge, with each quantity level representing a pre-determined quantity of charge. The ADC can compare an input quantity of charge against the quantity levels, determine the quantity level that is closest to the input quantity, and output the determined quantity level (e.g., in the form of digital codes representing the quantity level). Quantization error can occur when there is a mismatch between a quantity of charge represented by the quantity level and the input quantity of charge mapped to the quantity level. The quantization error can be reduced with smaller quantization step sizes (e.g., by reducing the difference in charge quantities between two adjacent quantity levels). Other sources of measurement error may also include, for example, device noises (e.g., of the ADC circuitries) and comparator offsets that add to uncertainties in the measurement of the quantity of charge. The noise charge, dark charge, as well as the ADC measurement errors, can define a lower limit of the measurable light intensity of the image sensor, whereas the saturation limit may determine an upper limit of the measurable light intensity of the image sensor. A ratio between the upper limit and the lower limit defines a dynamic range, which may set a range of operational light intensities for the image sensor.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system operating a simultaneous localization and mapping (SLAM) algorithm to track, for example, a location of the user, an orientation of the user, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to a system to track the movement of the eyeballs of the user to determine a gaze point of the user. Based on this physical image data, the VR/AR/MR system may generate and update virtual image data for displaying to the user via the near-eye display, to provide an interactive experience to the user. For example, the VR/AR/MR system may update the virtual image data based the user's gazing direction (which may signal the user's interest in the object), a location of the user, etc.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficiently high speed to allow tracking of the user's location, orientation, gaze point, etc. Image sensors with relatively limited dynamic ranges and which generate images at relatively low speed may not be suitable for such a wearable VR/AR/MR system.

This disclosure relates to a pixel cell that can provide extended dynamic range. The pixel cell may include a photodiode, a charge sensing unit, a transistor configured as a transfer switch between the photodiode and the charge sensing unit, and a processing circuit. The photodiode can generate charge responsive to incident light within an integration period and store at least some of the charge as residual charge until the full well capacity of the photodiode is reached, whereas additional charge generated by the photodiode can be transferred to the charge sensing unit as overflow charge. The charge sensing unit can be configured to sense a quantity of the charge (overflow charge, residual charge, etc.) generated by the photodiode. The charge sensing unit may include a charge storage device and a voltage buffer. The charge storage device may include a floating drain of the transistor, a metal capacitor, a Metal-Oxide-Semiconductor (MOS) capacitor, or any combination thereof, and can accumulate the charge to develop a voltage. The voltage can be buffered by the voltage buffer. The buffered voltage can be processed by the processing circuit.

Specifically, the processing circuit can measure the intensity of the incident light received by the photodiode within the integration period by performing multiple modes of measurement. In a first mode of measurement, a quantity of overflow charge accumulated at the charge storage device (if any) can be measured. In the first mode of measurement, the transfer switch can be controlled to set a full well capacity of the photodiode and to allow the photodiode to accumulate residual charge within the integration period until the full well capacity is reached. Additional charge generated by the photodiode thereafter can be accumulated at the charge storage device to develop a first voltage. The processing circuit can perform a quantization process by comparing the first voltage against a first ramping threshold voltage to generate a first decision. When the first decision indicates that the first voltage crosses the first ramping threshold voltage, a first count value can be captured from a counter and stored in a memory. The first count value can represent a measurement of the time it takes for the first ramping threshold voltage to cross the first voltage, which can also represent a result of quantizing the overflow charge stored in the charge storage unit. The quantity of the overflow charge can be proportional to the intensity of the incident light. For the rest of the disclosure, the first mode of measurement may be referred to as "FD ADC" operation.

The transfer switch can also transfer the residual charge from the photodiode to the charge storage device to develop a second voltage for a second mode of measurement. In the second mode of measurement, the processing circuit can perform another quantization process by comparing the second voltage against a second ramping threshold voltage to generate a second decision. When the second decision indicates that the first crosses the second ramping reference voltage, a second count value can be captured from the counter and stored in the memory. The second count value can represent a measurement of the time it takes for the second ramping threshold voltage to cross the second voltage, which also represents a result of quantizing the residual charge stored in the charge storage unit. The quantity of the residual charge can be proportional to the intensity of the incident light. In some examples, to increase the charge-to-voltage gain which can reduce the quantization error, the capacitance of the charge storage unit can be reduced when storing the residual charge. For the rest of the disclosure, the second mode of measurement may be referred to as "PD ADC" operation.

In some embodiments, the processing circuit can also perform a third mode of measurement. In the third mode of measurement, the processing circuit can compare the first voltage with a static threshold voltage representing a saturation limit of the charge storage unit to generate a third decision. When the third decision indicates that the charge storage unit reaches or exceeds the saturation limit, a third count value can be captured from the counter and stored in the memory. The third count value can represent a measurement of the time it takes for the charge storage unit to become saturated, and the duration of time can be inversely proportional to the intensity of the incident light. For the rest of the disclosure, the third mode of measurement may be referred as time-to-saturation (TTS) measurement operation. In some examples, the third mode of measurement can be performed before the first mode of measurement.

The different modes of measurements can be targeted for different light intensity ranges, and the processing circuit can output one of the first, second, or third count values from the memory to represent the intensity of the incident light based on which light intensity range the incident light belongs to. The first mode of measurement can be targeted at a medium light intensity range for which the photodiode is expected to reach full capacity and saturates. The second mode of measurement can be targeted at a low light intensity range for which the photodiode is not expected to saturate. The third mode of measurement can be targeted at a high light intensity range for which the charge storage unit saturates. Based on an intensity range of the incident light, the processing circuit can select one of the first, second, or third count values from the memory to represent the intensity of the incident light.

The multi-mode measurement operation described above can extend the dynamic range of the light intensity measurement by a pixel cell. Specifically, the TTS measurement operation allows measurement of high light intensity beyond the intensity level that saturates the charge storage unit saturates, which can extend the upper limit of the dynamic range. Moreover, the PD ADC operation measures residual charge stored in the photodiode for low light intensity. As the photodiode typically receives very little dark current, the magnitude of dark charge caused by dark current can remain small with respect to the real signal caused by the incident light, which can reduce the detectable incident light intensity and push down the lower limit of the dynamic range.

Although the multi-mode measurement operations can extend the dynamic range of a pixel cell, the raw outputs (e.g., count values) of the image sensor from each mode of measurement operations can have a different relationship with respect to the light intensity represented by the count value. For example, the count value from the TTS mode represents a time-to-saturation, which is typically inversely proportional to or is at least non-linear with respect to incident light intensity, whereas the count values from the FD ADC and PD ADC operations measure a quantity of charge and are generally linear with respect to the incident light intensity. Moreover, the count values from the FD ADC and the PD ADC operations can have different linear relationships with respect to the incident light intensity. This can be due to, for example, the FD ADC operation measuring the overflow charge and not the entirety of the charge generated by the photodiode (which includes the residual charge) within the integration period, whereas the PD ADC operation measures the residual charge which can be the entirety of the charge generated by the photodiode within the integration period if the photodiode does not saturate. Moreover, as described above, the capacitance of the charge storage unit for the PD ADC operation can be reduced with respect to the FD ADC operation to increase the charge-to-voltage conversion rate and to reduce quantization error. As both the FD ADC and PD ADC operations measure the charge based on quantizing the voltage at the charge storage unit, the different capacitances of the charge storage unit can result in different linear relationships between the charge (which reflects the light intensity) and the count value for FD ADC and PD ADC operations.

The different relationships between count value and the light intensity among the different modes of operations can pose a problem for an application that uses the count values to determine the incident light intensities. The application typically only receives the count values and no other indications of which modes of operations (or which light intensity range) the count values belong to, and may rely on the count values having a uniform relationship with respect to the light intensity across the entire dynamic range. Moreover, some applications that rely on image feature extraction, such as SLAM, may rely on the count values having a uniform relationship with respect to light intensity to determine differences between count values of neighboring pixels, and to extract image features based on the differences. Such applications may not be able to work properly with the count values output from the aforementioned multi-mode measurement operations without additional post-processing.

This disclosure proposes techniques that can address at least some of the issues above. In some examples, an apparatus comprises an analog-to-digital (A/D) converter configured to generate raw digital outputs based on performing at least (1) a first quantization operation to quantize a physical stimulus within a first intensity range based on a first A/D conversion relationship and (2) a second quantization operation to quantize the physical stimulus within a second intensity range based on a second A/D conversion relationship; and a raw output conversion circuit configured to generate a refined digital output based on a raw digital output obtained from the A/D converter and at least one predetermined conversion parameter. The at least one conversion parameter compensates for a discontinuity between the first A/D conversion relationship and the second A/D conversion relationship.

In some examples, The physical stimulus comprises light. The apparatus further includes a photodiode, a capacitor, and the ADC. The photodiode is configured to generate charge in response to incident light within an integration period, and accumulate at least a part of the charge as residual charge until the photodiode saturates. The capacitor is configured to accumulate the remaining charge as overflow charge until the capacitor saturates. The ADC can perform multiple quantization operations on the residual charge and/or overflow charge stored in the charge storage device to measure an intensity of the incident light received by the photodiode within the integration period. Specifically, the ADC can perform a first quantization operation associated with a first intensity range (e.g., PD ADC) to measure a quantity of the residual charge transferred to the charge storage device, to generate a first raw output representing a first intensity of incident light within the first intensity range. The ADC can also perform a second quantization operation associated with a second intensity range (e.g., FD ADC) to measure a quantity of the overflow charge accumulated in the charge storage device (if any) and/or the residual charge transferred to the charge storage device, to generate a second raw output representing a second intensity of incident light within the second intensity range. The ADC can also perform a third quantization operation associated with a third intensity range (e.g., TTS) to measure a saturation time for the quantity of the overflow charge to reach a saturation limit, if it happens, to generate a third raw output representing a third intensity of incident light within the third intensity range. The raw outputs can be count values generated by a counter and stored into a memory when, for example, a voltage representing a quantity of residual charge/overflow charge intersects with a ramping voltage (e.g., in the PD ADC and FD ADC measurements), or when the voltage reaches a fixed voltage (e.g., in the TTS measurement).

The raw output conversion circuit can convert the raw outputs from the first quantization operation, the second quantization operation, and the third quantization operations to refined outputs such that the refined outputs are related to incident intensities across the first intensity range, the second intensity range, and the third intensity range based on a substantially uniform linear relationship. The raw output conversion circuit can combine the raw outputs with conversion parameters to generate the refined outputs. The conversion parameters comprise a first subset of conversion parameters associated with the first intensity range, a second subset of conversion parameters associated with the second intensity range, and a third subset of conversion parameters associated with the third intensity range. When performing a post-processing operation on a raw output, the raw output conversion circuit can determine which intensity range the raw output represents (e.g., based on which range the raw output is in), select the conversion parameters and conversion operation based on the intensity range, and apply the selected conversion parameters on the raw output based on the selected conversion operation to generate a refined output.

The conversion parameters and conversion operations can reflect a specific analog-to-digital (A/D) conversion relationship between a raw output and the intensity the raw output represents. The specific relationship can be set by a specific quantization operation for a specific intensity range. For example, in both the FD ADC and PD ADC operations, the raw output can be linearly related to the light intensity, but the linear relationships may be different between the FD ADC and the PD ADC operations. Specifically, as described above, the capacity of the charge storage device may be reduced in the PD ADC measurement with respect to the FD ADC and the TTS measurements, to increase the charge-to-voltage conversion gain in the PD ADC mode. To account for the different conversion gains, the second conversion parameters (for FD ADC) and third conversion parameters (for TTS) can include a scaling factor to scale down the raw outputs from the FD ADC and TTS measurements with respect to the raw output from the PD ADC measurement. Moreover, in the TTS operation the raw output represents a saturation time which is inversely proportional to the incident light intensity. Therefore, while the conversion operations for the raw outputs from FD ADC and TTS measurements can involve scaling the raw outputs, the conversion operation for a raw output from the TTS measurement can involve scaling a reciprocal of the raw output with a conversion factor to convert the time to a quantity of charge.

In addition, there can be a discontinuity between the A/D conversion relationships of different quantization operations which, if not accounted for in the conversion operation, can introduce discontinuities in the refined outputs at the boundary between adjacent light intensity ranges. As a result of such discontinuities, the refined outputs may no longer have a uniform and linear relationship with respect to the light intensity. The discontinuity can be due to, for example, fixed pattern noise (FPN) introduced by various system offsets within the pixel cell, such as comparator offset, offset in a voltage buffer that buffers the voltage from the charge storage device, etc. The discontinuity can also be due to random noise signal, such as dark charge, reset noise charge, etc., introduced to the charge storage device and/or to the photodiode during or after the integration period. The fixed pattern noise and random noise signals can introduce an offset component in the raw output. As the noise introduced to the raw outputs in different quantization operations may vary, the offset components in the raw outputs for different light intensity ranges may vary as well, which can lead to discontinuities in the A/D conversion relationships at the boundaries between adjacent light intensity ranges. To compensate for the offset components, the conversion parameters for each intensity range can include an offset compensation parameter specific for that intensity range. The raw output conversion circuit can combine a raw output with the offset compensation parameter to eliminate or at least reduce the offset component, to eliminate or at least reduce the discontinuities.

This disclosure also propose techniques of determining the conversion parameters for different intensity ranges. In some examples, a calibration process can be performed using the image sensor to determine the conversion parameters based on raw outputs generated for pre-determined light intensities for different light intensities. As part of the calibration process, the image sensor can be controlled to perform a specific quantization operation (e.g., TTS, FD ADC, PD ADC, etc.) to measure a known light intensity to generate a raw output. Based on the selected quantization operation and the corresponding A/D conversion relationship, the raw output, and the known light intensity, conversion parameters for the light intensity range of the selected quantization operation can be determined. For example, as part of the calibration process, the image sensor can be operated to sense light of a minimum intensity to be detected by the image sensor, and to perform a PD ADC measurement to generate a raw output. The raw output can represent an offset in the PD ADC output due to, for example, dark charge, comparator offset, etc. An offset compensation parameter for PD ADC can be then be derived from the raw output. In some examples, a calibration process can be performed for each pixel cell of an image sensor to compute the conversion parameters while accounting for device mismatches among the pixel cells. Moreover, a calibration process can be performed for each image sensor to account for different devices and operating conditions of different image sensor.

In some examples, the image sensor can be controlled to perform two different quantization operations (e.g., TTS and FD ADC, FD ADC and PD ADC) to measure the same known light intensity to generate two raw outputs, and an offset compensation parameter can be determined based on the two raw outputs to determine a discontinuity in the A/D conversion relationships of the two quantization operations. For example, the two raw outputs can be converted to refined outputs based on their respective A/D conversion relationships, and a difference between the refined outputs can represent the discontinuity. An offset compensation parameter can then be derived from the difference. In some examples, multiple known light intensities can be measured by the same quantization operation to determine, for example, the conversion gain of the charge storage device, a conversion factor to convert time to a quantity of charge for the TTS measurement, etc.

The aforementioned techniques for converting raw outputs to refined outputs, as well as calibrating the conversion parameters, can be used in quantizing other types of physical stimulus, such as audio signal, pressure, etc., where sensor outputs are quantized using multiple quantization schemes associated with different measurement ranges and are not limited to image sensor. For example, the aforementioned techniques can be applied to audio signal processing, pressure sensing, etc.

With the disclosed techniques, raw outputs generated from different quantization operations can be converted to refined outputs that are related to light intensities based on a substantially linear and uniform relationship (e.g., to within one or a few least significant bits (LSBs) of the ADC)

across multiple intensity ranges, which allows the refined outputs to be used in applications (e.g., SLAM) which rely on the refined outputs having a linear and uniform relationship with the light intensities represented by the refined outputs. The linearity and uniformity of the relationship can be further improved by reducing (or even eliminating) discontinuities in the A/D conversion relationships introduced by the image sensor between different intensity ranges. Moreover, the calibration processes described above allow accurate determination of conversion parameters for different intensity ranges to eliminate/reduce the effect of the discontinuities. Moreover, as only a few raw outputs are needed to compute the conversion parameters, the calibration processes can be performed efficiently and can be performed for different pixel cells of an image sensor, and for different image sensors, such that conversion parameters can account for the device variations (e.g., full well capacity variations of the photodiode, capacitance variations of the capacitor, etc.) and operation variations (e.g., temperature, integration time periods, etc.) between different pixel cells and different image sensors can be obtained. All these can further improve the linearity of the refined outputs with respect to light intensities, and the operations of the applications that rely on these refined outputs.

Examples of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, isensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display near-eye display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to near-eye display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
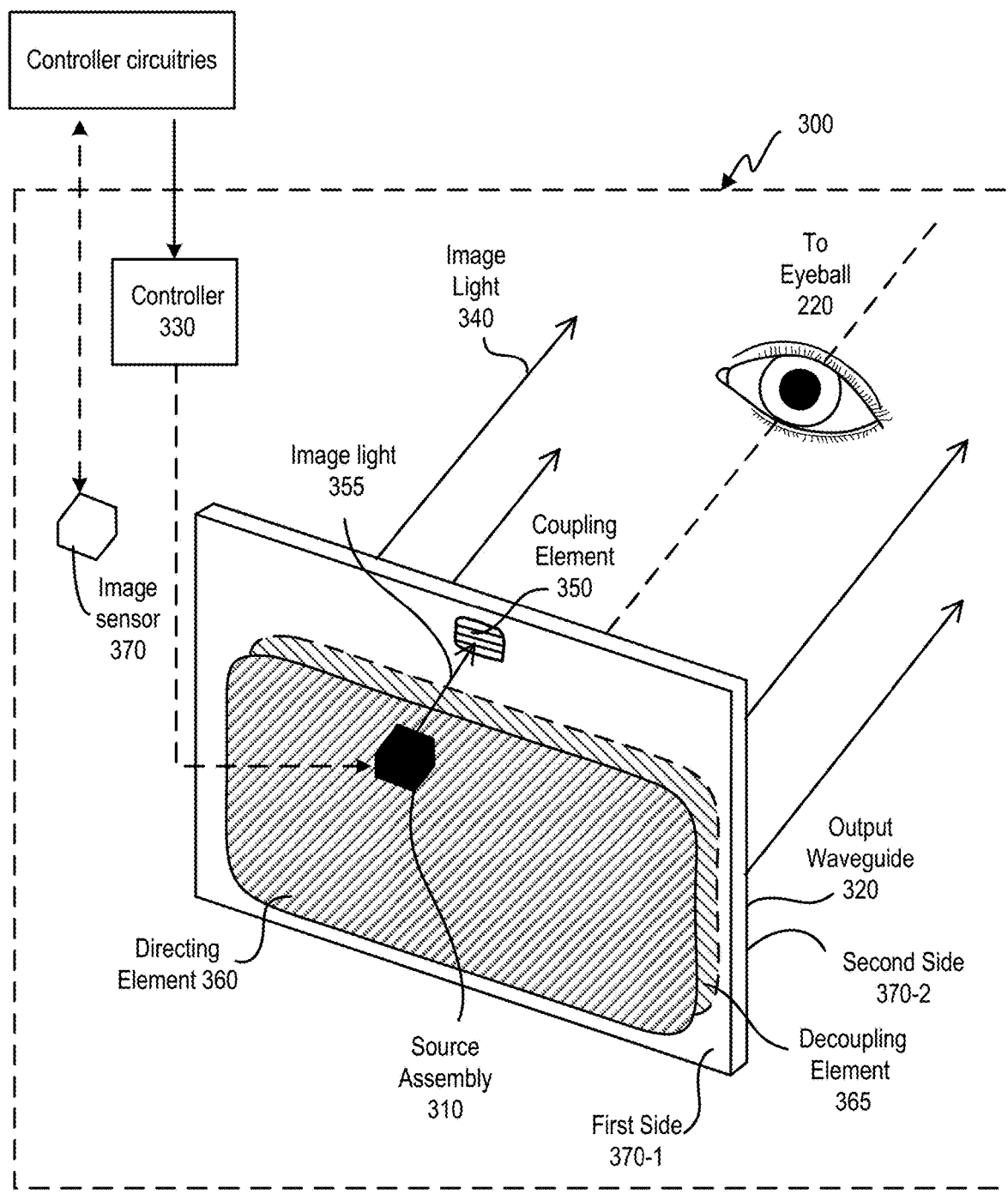
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
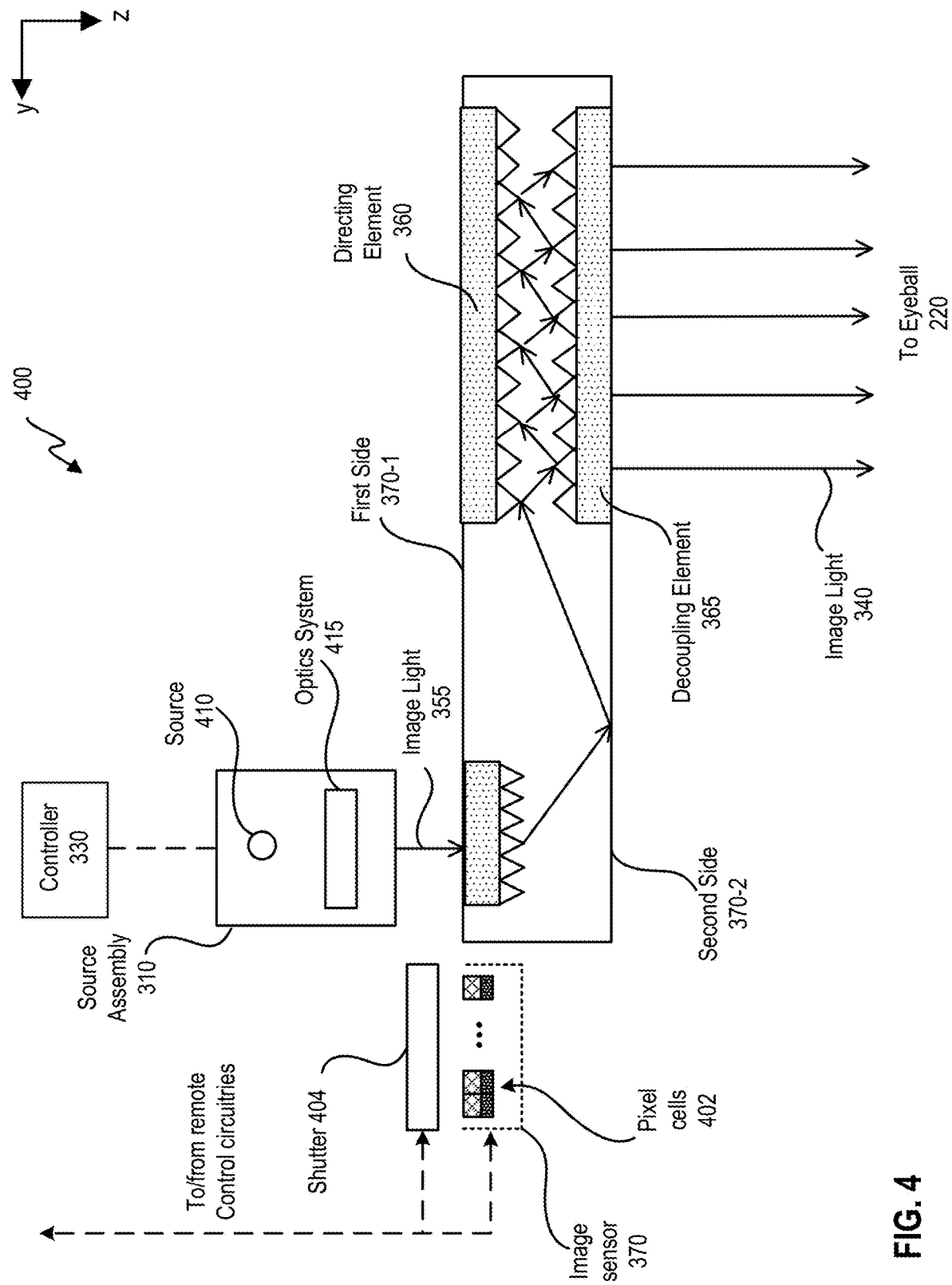
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an integration period. During the integration period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
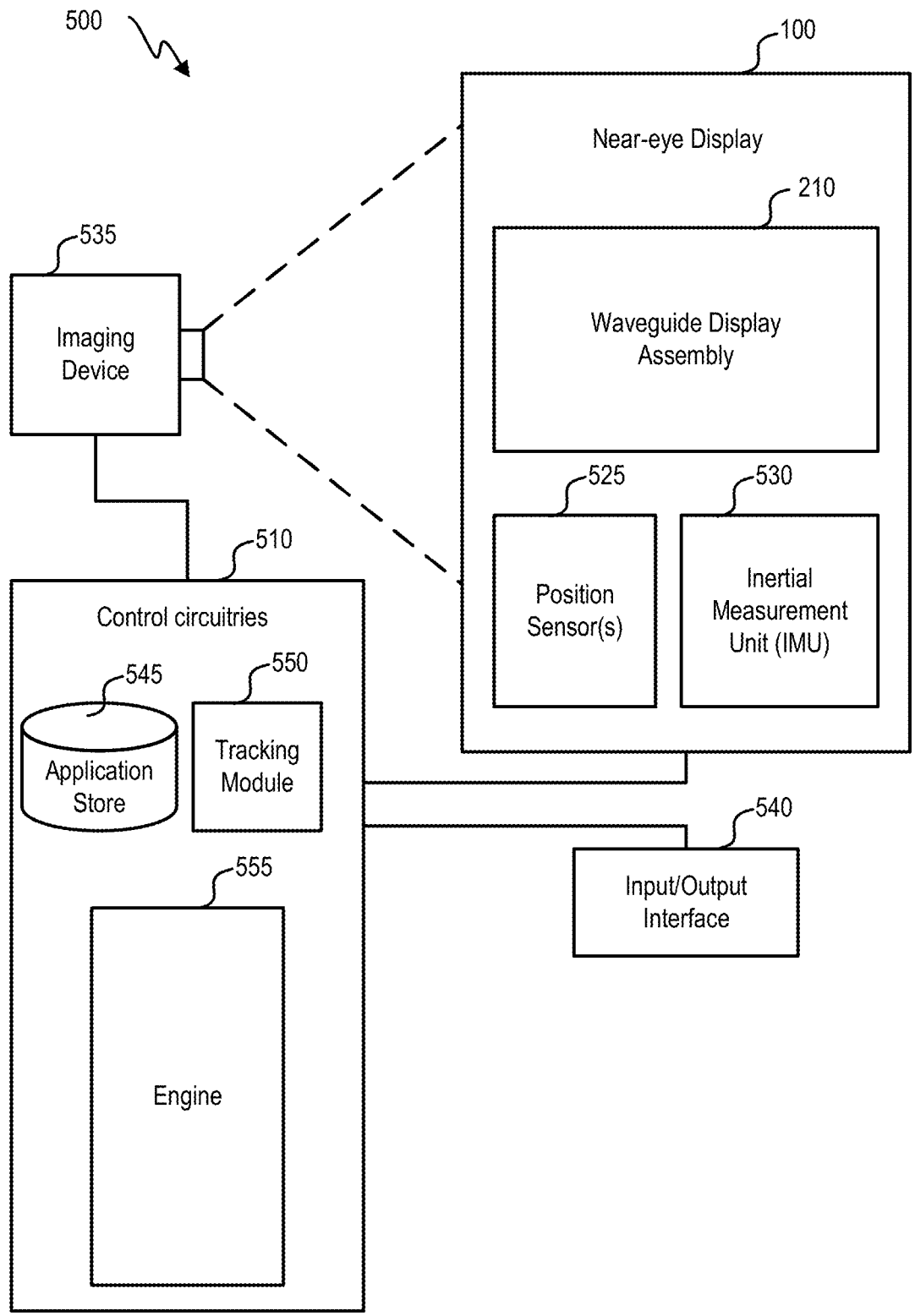
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
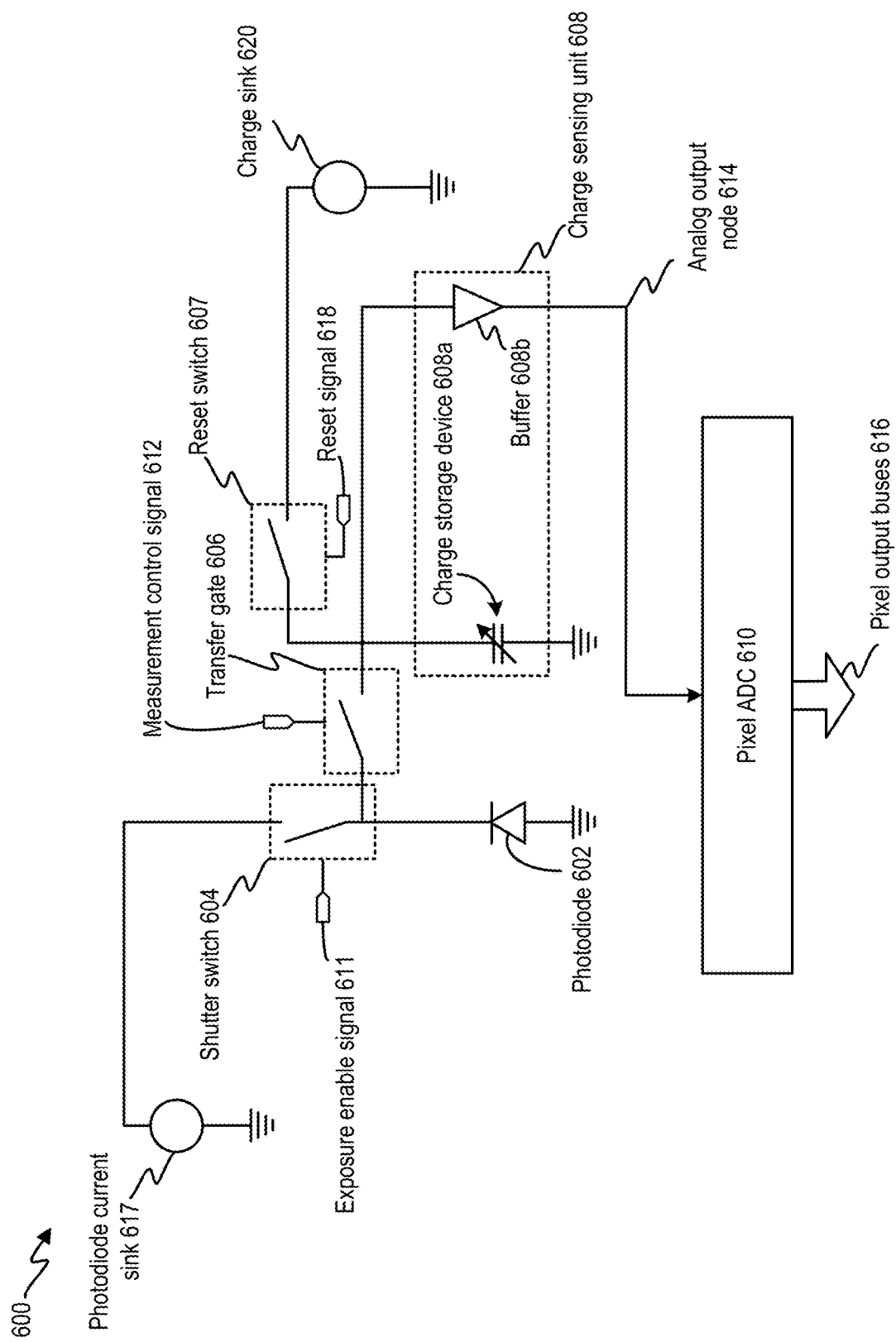
FIG. 6 illustrates block diagrams of embodiments of a pixel cell.

FIG. 6 illustrates an example of a pixel cell 600. Pixel cell 600 may be part of a pixel array and can generate digital intensity data corresponding to a pixel of an image. For example, pixel cell 600 may be part of pixel cells 402 of FIG. 4. As shown in FIG. 6, pixel cell 600 may include a photodiode 602 as well as processing circuits including a shutter switch 604, a transfer gate 606, a reset switch 607, a charge sensing unit 608 comprising a charge storage device 608a and a buffer 608b, and a pixel ADC 610.

In some embodiments, photodiode 602 may include, for example, a P-N diode, a P-I-N diode, a pinned diode, etc. Photodiode 602 can generate charge upon receiving light, and the quantity of charge generated can be proportional to the intensity of the light. Photodiode 602 can also store some of the generated charge until the photodiode saturates, which occurs when the well capacity of the photodiode is reached. Moreover, each of shutter switch 604, transfer gate 606, and reset switch 607 can include a transistor. The transistor may include, for example, a metal-oxide-semiconductor field-effect transistor (MOSFET), a bipolar junction transistor (BJT), etc. Shutter switch 604 can act as an electronic shutter gate (in lieu of, or in combination with, mechanical shutter 404 of FIG. 4) to control an integration period of pixel cell 600. During the integration period, shutter switch 604 can be disabled (turned off) by exposure enable signal 611, which allows photodiode 602 to store the generated charge and, when photodiode 602 saturates, allows the overflow charge to flow to charge sensing unit 608. At the end of the integration period, shutter switch 604 can be enabled to steer the charge generated by photodiode 602 into photodiode current sink 617. Moreover, reset switch 607 can also be disabled (turned off) by reset signal 618, which allows charge storage device 608a to accumulate the charge. Charge storage device 608a can be a device capacitor at a floating terminal of transfer gate 606, a metal capacitor, a MOS capacitor, or any combination thereof. Charge storage device 608a can be used to accumulate the charge to generate a voltage, which can be buffered by buffer 608b. The buffered voltage can be output at analog output node 614 and can be measured by pixel ADC 610 to provide a digital output representing the incident light intensity. After a mode of measurement completes, reset switch 607 can be enabled to empty the charge stored at charge storage device 608a to charge sink 620, to make charge storage device 608a available for the next measurement.

Figure 7:
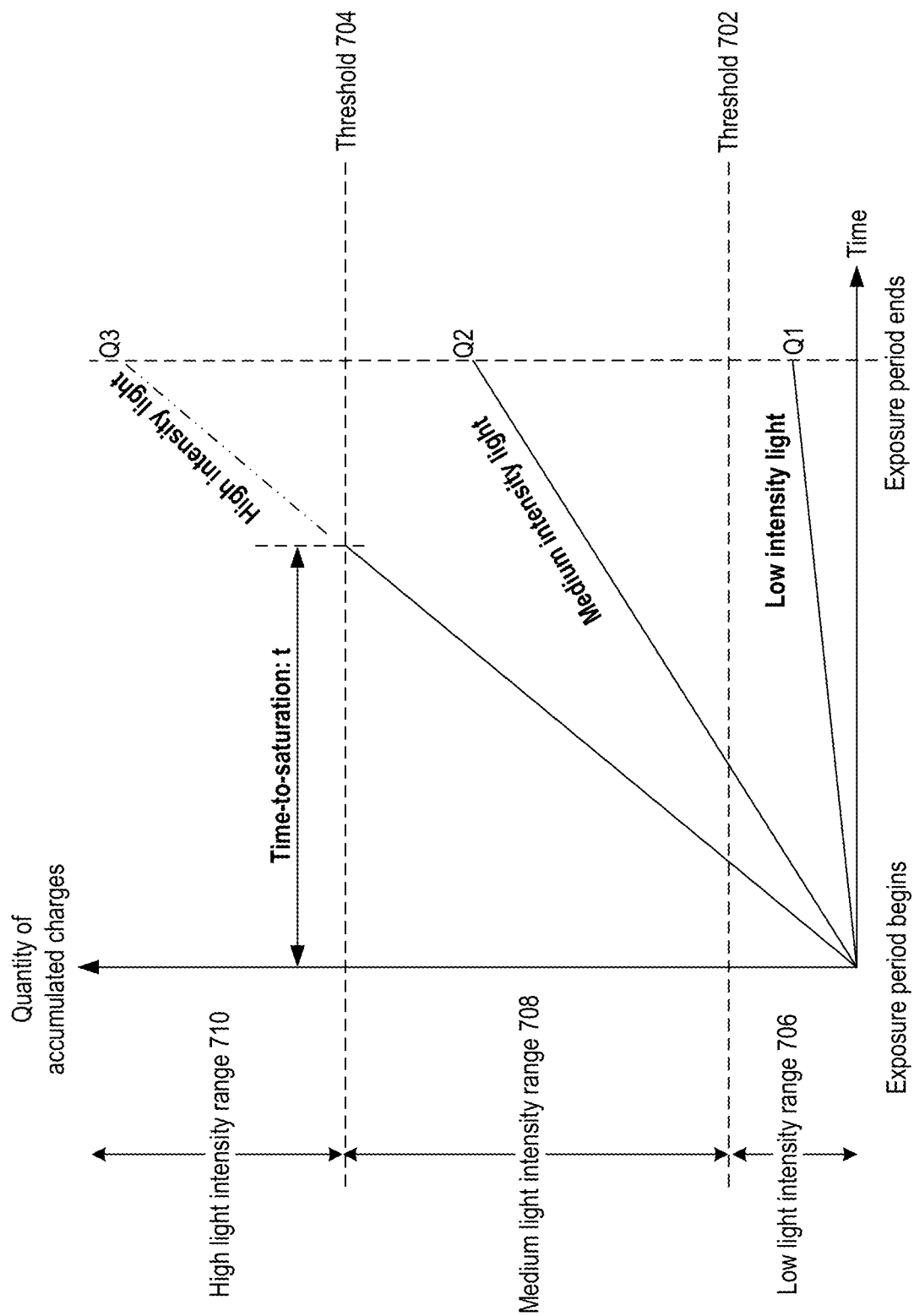
FIG. 7 illustrates operations for determining light intensities of different ranges by embodiments of FIG. 6.

Reference is now made to FIG. 7, which illustrates a quantity of charge accumulated with respect to time for different light intensity ranges. The total quantity of charge accumulated at a particular time point can reflect the intensity of light incident upon photodiode 602 during an integration period. The quantity can be measured when the integration period ends. A threshold 702 and a threshold 704 can be defined for a threshold's quantity of charge defining a low light intensity range 706, a medium light intensity range 708, and a high light intensity range 710 for the intensity of the incident light. For example, if the total accumulated charge is below threshold 702 (e.g., Q1), the incident light intensity is within low light intensity range 706. If the total accumulated charge is between threshold 704 and threshold 702 (e.g., Q2), the incident light intensity is within medium light intensity range 708. If the total accumulated charge is above threshold 704, the incident light intensity is within high light intensity range 710. The quantity of the accumulated charge, for low and medium light intensity ranges, can correlate with the intensity of the incident light, if the photodiode does not saturate within the entire low light intensity range 706 and the measurement capacitor does not saturate within the entire medium light intensity range 708.

The definitions of low light intensity range 706 and medium light intensity range 708, as well as thresholds 702 and 704, can be based on the storage capacities of photodiode 602 and charge storage device 608a. For example, low light intensity range 706 can be defined such that the total quantity of charge stored in photodiode 602, at the end of the integration period, is below or equal to the storage capacity of the photodiode, and threshold 702 can be based on the storage capacity of photodiode 602. As to be described below, threshold 702 can be set based on a scaled storage capacity of photodiode 602 to account for potential capacity variation of the photodiode. Such arrangements can ensure that, when the quantity of charge stored in photodiode 602 is measured for intensity determination, the photodiode does not saturate, and the measured quantity relates to the incident light intensity. Moreover, medium light intensity range 708 can be defined such that the total quantity of charge stored in charge storage device 608a, at the end of the integration period, is below or equal to the storage capacity of the measurement capacitor, and threshold 704 can be based on the storage capacity of charge storage device 608a. Typically threshold 704 is also set to be based on a scaled storage capacity of charge storage device 608a to ensure that when the quantity of charge stored in charge storage device 608a is measured for intensity determination, the measurement capacitor does not saturate, and the measured quantity also relates to the incident light intensity. As to be described below, thresholds 702 and 704 can be used to detect whether photodiode 602 and charge storage device 608a saturate, which can determine the intensity range of the incident light and the measurement result to be output.

In addition, in a case where the incident light intensity is within high light intensity range 710, the total overflow charge accumulated at charge storage device 608a may exceed threshold 704 before the integration period ends. As additional charge is accumulated, charge storage device 608a may reach full capacity before the end of the integration period, and charge leakage may occur. To avoid measurement error caused due to charge storage device 608a reaching full capacity, a time-to-saturation measurement can be performed to measure the time duration it takes for the total overflow charge accumulated at charge storage device 608a to reach threshold 704. A rate of charge accumulation at charge storage device 608a can be determined based on a ratio between threshold 704 and the time-to-saturation, and a hypothetical quantity of charge (Q3) that could have been accumulated at charge storage device 608a at the end of the integration period (if the capacitor had limitless capacity), can be determined by extrapolation according to the rate of charge accumulation. The hypothetical quantity of charge (Q3) can provide a reasonably accurate representation of the incident light intensity within high light intensity range 710.

Referring back to FIG. 6, transfer gate 606 can be controlled by a measurement control signal 612 to control the charge accumulations at photodiode 602 and at charge storage device 608a for different light intensity ranges as described above. To measure high light intensity range 710 and medium light intensity range 708, transfer gate 606 can be controlled to operate in a partially turned-on state. For example, the gate voltage of transfer gate 606 can be set based on a voltage developed at photodiode 602 corresponding to the full well capacity of the photodiode. With such arrangements, overflow charge (e.g., charge generated by the photodiode after the full well capacity is reached) can transfer through transfer gate 606 to reach charge storage device 608a, to measure time-to-saturation (for high light intensity range 710) and the quantity of charge stored in charge storage device 608a (for medium light intensity range 708). Moreover, to measure low light intensity range 706, transfer gate 606 can be controlled in a fully turned-on state to transfer the residual charge stored in photodiode 602 to charge storage device 608a, to measure the quantity of the residual charge stored in photodiode 602.

The charge accumulated at charge storage device 608a can be sensed by buffer 608b to generate a replica of the analog voltage (but with larger driving strength) at analog output node 614. The analog voltage at analog output node 614 can be converted into a set of digital data (e.g., comprising logical ones and zeros) by pixel ADC 610. The analog voltage developed at charge storage device 608a can be sampled and digital output can be generated before the end of the integration period (e.g., for medium light intensity range 708 and high light intensity range 710), or after the integration period (for low light intensity range 706). The digital data can be transmitted by a set of pixel output buses 616 to, for example, control circuitries 510 of FIG. 5, to represent the light intensity during the integration period.

In some examples, the capacitance of charge storage device 608a can be configurable to improve the accuracy of light intensity determination for a low light intensity range. For example, the capacitance of charge storage device 608a can be reduced when charge storage device 608a is used to measure the residual charge stored at residual charge capacitor 603. The reduction in the capacitance of charge storage device 608a can increase the charge-to-voltage conversion ratio at charge storage device 608a, such that a higher voltage can be developed for a certain quantity of stored charge. The higher charge-to-voltage conversion ratio can reduce the effect of measurement errors (e.g., quantization error, comparator offset, etc.) introduced by pixel ADC 610 on the accuracy of low light intensity determination. The measurement error can set a limit on a minimum voltage difference that can be detected and/or differentiated by pixel ADC 610. By increasing the charge-to-voltage conversion ratio, the quantity of charge corresponding to the minimum voltage difference can be reduced, which in turn reduces the lower limit of a measurable light intensity by pixel cell 600 and extends the dynamic range. On the other hand, for medium light intensity, the capacitance of charge storage device 608a can be increased to ensure that the charge storage device 608a has sufficient capacity to store a quantity of charge up to, for example, the quantity defined by threshold 704.

Figure 8:
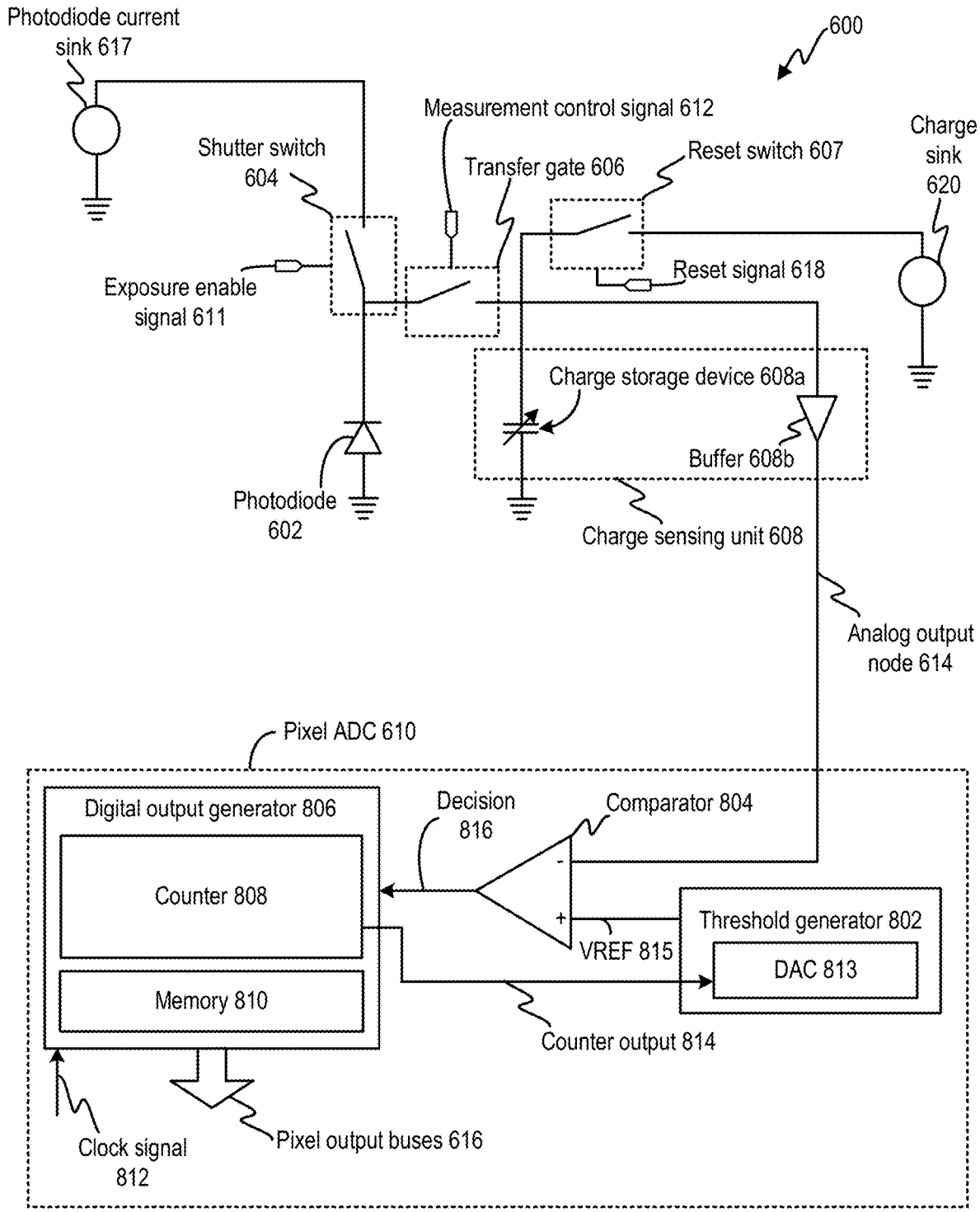
FIG. 8 illustrates examples of internal components of the pixel cell of FIG. 6.

FIG. 8 illustrates an example of the internal components of pixel ADC 610. As shown in FIG. 8, pixel ADC 610 includes a threshold generator 802, a comparator 804, and a digital output generator 806. Digital output generator 806 may further include a counter 808 and a memory 810. Counter 808 can generate a set of count values based on a free-running clock signal 812, whereas memory 810 can store at least some of the count values (e.g., the latest count value) generated by counter 808. In some embodiments, memory 810 may be part of counter 808. Memory 810 can be, for example, a latch circuit to store the counter value based on local pixel value as described below. Threshold generator 802 includes a digital-to-analog converter (DAC) 813 which can accept a set of digital values and output a reference voltage (VREF) 815 representing the set of digital values. As to be discussed in more detail below, threshold generator 802 may accept static digital values to generate a fixed threshold, or accept output 814 of counter 808 to generate a ramping threshold.

Although FIG. 8 illustrates that DAC 813 (and threshold generator 802) is part of pixel ADC 610, it is understood that DAC 813 (and threshold generator 802) can be coupled with multiple digital output generators 806 from different pixel cells. Moreover, at least part of digital output generator 806, such as counter 808, can be shared among a plurality of multiple pixel cells to generate the digital values.

Comparator 804 can compare the analog voltage developed at analog output node 614 against the threshold provided by threshold generator 802, and generate a decision 816 based on the comparison result. For example, comparator 804 can generate a logical one for decision 816 if the analog voltage at analog output node 614 equals or exceeds the threshold generated by threshold generator 802. Comparator 804 can also generate a logical zero for decision 816 if the analog voltage falls below the threshold. Decision 816 can control the counting operations of counter 808 and/or the count values stored in memory 810, to perform the aforementioned time-of-saturation measurement of a ramping analog voltage at analog output node 614 as well as quantization processing of the analog voltage at analog output node 614 for incident light intensity determination.

FIG. 9A illustrates an example of time-to-saturation measurement by pixel ADC 610. To perform the time-to-saturation measurement, threshold generator 802 can control DAC 813 to generate a fixed VREF 815. Fixed VREF 815 can be set at a voltage corresponding a charge quantity threshold for saturation of charge storage device 608a (e.g., threshold 704 of FIG. 7). Counter 808 can start counting right after the integration period starts (e.g., right after shutter switch 604 is disabled). As the analog voltage at analog output node 614 ramps down (or up depending on the implementation), clock signal 812 keeps toggling to update the count value at counter 808. The analog voltage may reach the fixed threshold at a certain time point, which causes decision 816 by comparator 804 to flip. The flipping of decision 816 may stop the counting of counter 808, and the count value at counter 808 may represent the time-to-saturation. The resolution of the time-to-saturation measurement can be defined based on, for example, the frequency at which counter 808 updates the count value. As to be discussed in more details below, a rate of charge accumulation at charge storage device 608a can also be determined based on the duration, and the incident light intensity can be determined based on the rate of charge accumulation.

FIG. 9B illustrates an example of quantizing an analog voltage by pixel ADC 610. After measurement starts, DAC 813 may be programmed by counter output 808 to generate a ramping VREF 815, which can either ramp up (in the example of FIG. 9B) or ramp down depending on implementation. The voltage range of ramping VREF 815 can be between threshold 704 (charge quantity threshold for saturation of charge storage device 608a) and threshold 702 (charge quantity threshold for saturation of photodiode 602), which can define the medium light intensity range. In the example of FIG. 9B, the quantization process can be performed with uniform quantization steps, with VREF 815 increasing (or decreasing) by the same amount for each clock cycle of clock signal 812. The amount of increase (or decrease) of VREF 815 corresponds to a quantization step. When VREF 815 reaches within one quantization step of the analog voltage at analog output node 614, decision 816 by comparator 804 flips from negative to positive. The flipping of decision 816 may stop the counting of counter 808, and the count value can correspond to a total number of quantization steps accumulated to match, within one quantization step, the analog voltage. The count value corresponds to a measurement of time it takes for VREF 815 to reach the analog voltage and can be a digital representation of the quantity of charge stored at charge storage device 608a, as well as the digital representation of the incident light intensity. As discussed above, the quantization of the analog voltage can occur during the integration period (e.g., for medium light intensity range 708) and after the integration period (e.g., for low light intensity range 706).

As discussed above, ADC 610 can introduce quantization errors when there is a mismatch between a quantity of charge represented by the quantity level output by ADC 610 (e.g., represented by the total number of quantization steps) and the actual input quantity of charge that is mapped to the quantity level by ADC 610. The quantization error can be reduced by using a smaller quantization step size. In the example of FIG. 9B, the quantization step size can be reduced by the amount of increase (or decrease) in VREF 815 per clock cycle based on, for example, reducing input range 902 of the quantization operation (between thresholds 702 and 704), reducing the corresponding range of time to be measured by counter 808, increasing the clock frequency of clock signal 812, or any combination therefore.

Although quantization error can be reduced by using smaller quantization step sizes, area and performance speed may limit how far the quantization step can be reduced. For example, in a case where the clock frequency of clock signal 812 is increased while input range 902 remains the same, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 616, which may not be feasible if pixel cell 600 is used on a head-mounted device or other wearable devices with very limited spaces. Moreover, with a larger number of quantization step size, ADC 610 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

Figures 10A, 10B:
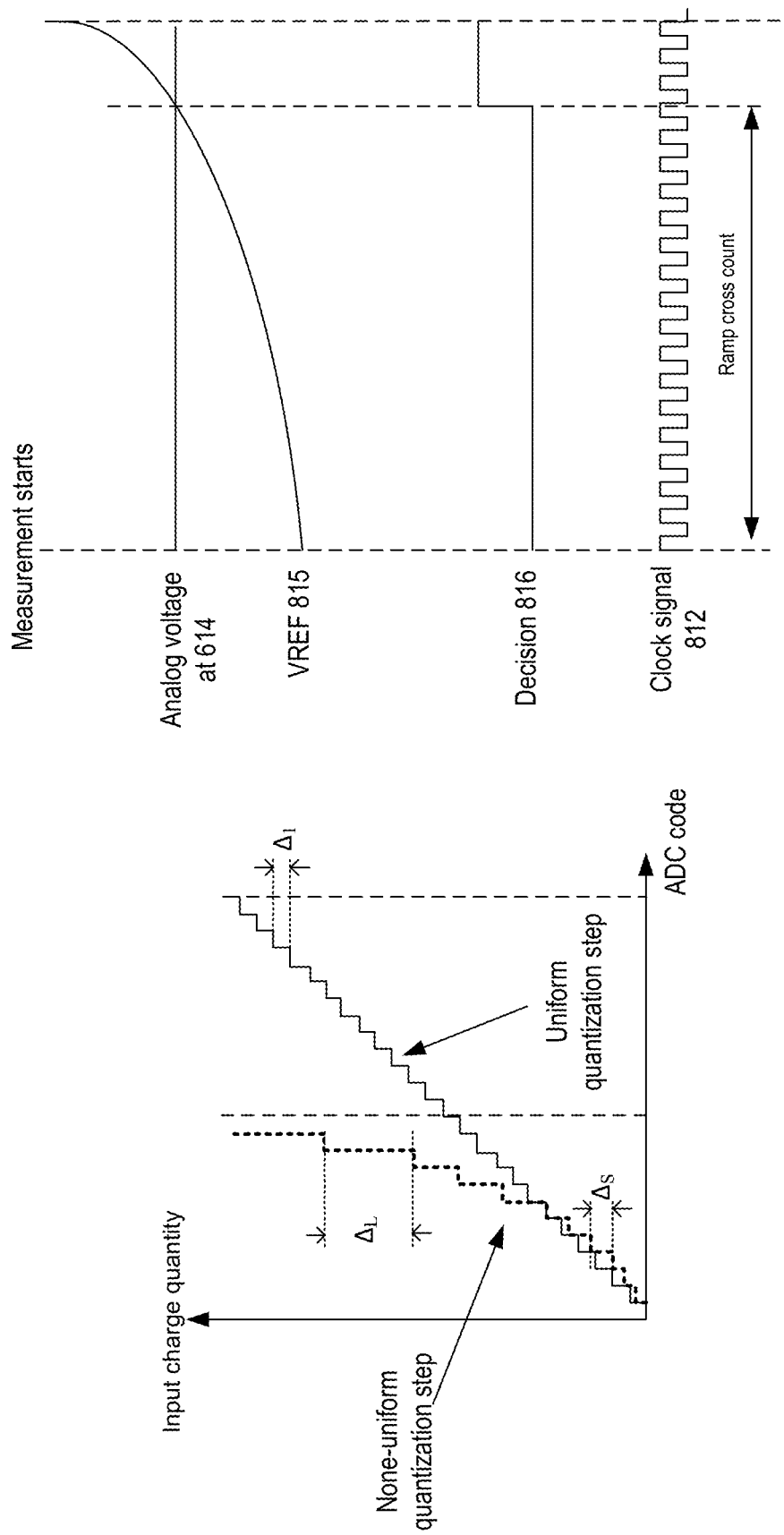
FIG. 10A and FIG. 10B illustrate techniques for performing quantization.

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by Ai) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 610 can be reduced. Therefore, the reduced quantization errors can push down the lower limit of the measurable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 610 using a non-uniform quantization process. Compared with FIG. 9B (which employs a uniform quantization process), VREF 815 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 815 increases at a slower rate. For higher counter count values (which correspond to a higher input quantity range), the quantization steps are made larger, hence VREF 815 increases at a higher rate. The uneven quantization steps in VREF 815 can be introduced using different schemes. For example, as discussed above, DAC 813 is configured to output voltages for different counter count values (from counter 808). DAC 813 can be configured such that the difference in the output voltage between two neighboring counter count values (which defines the quantization step size) is different for different counter count values. As another example, counter 808 can also be configured to generate jumps in the count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11A:
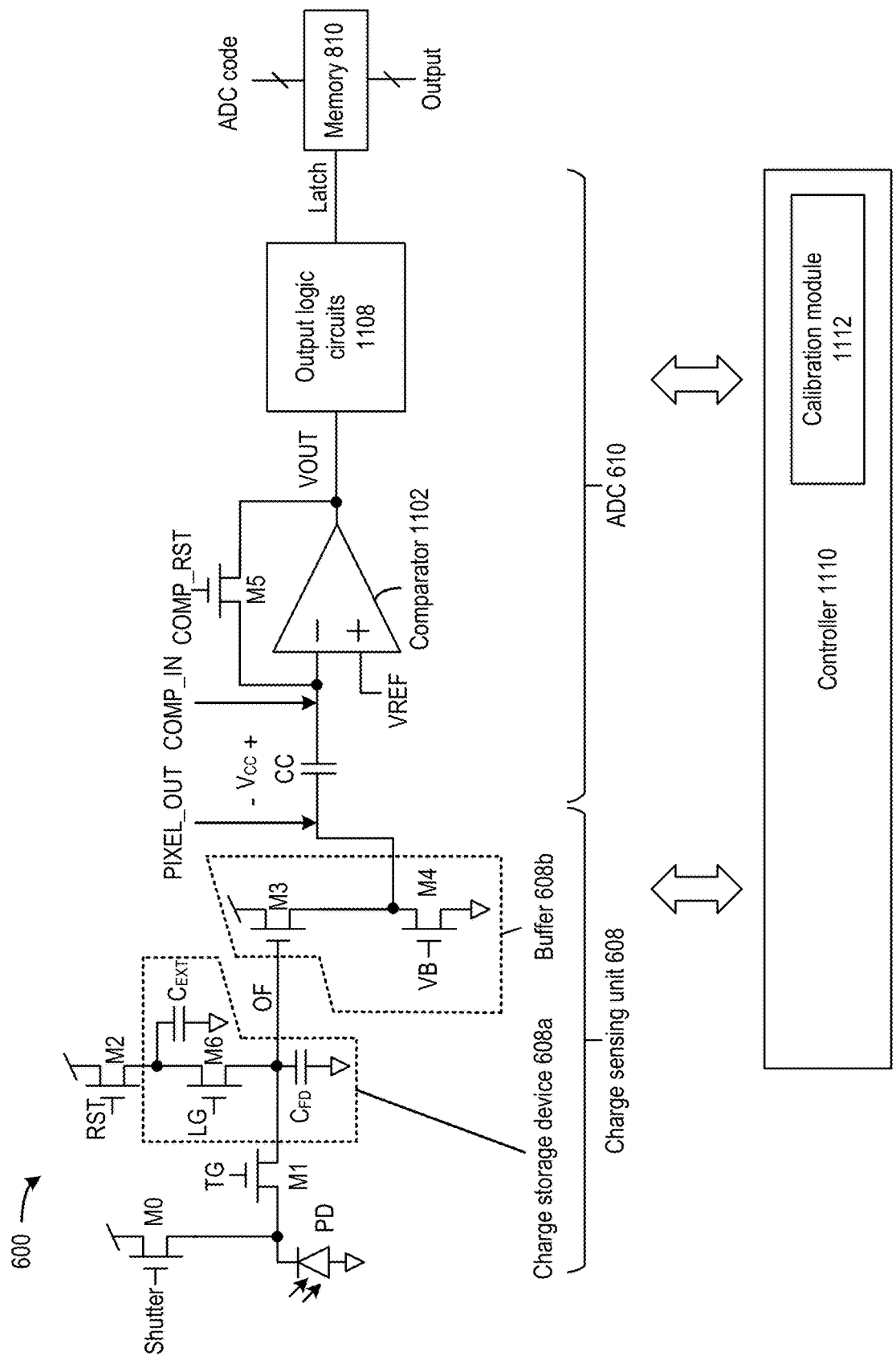
FIG. 11A, FIG. 11B, and FIG. 11C illustrate block diagrams of an embodiment of a pixel cell.
Figure 11B:
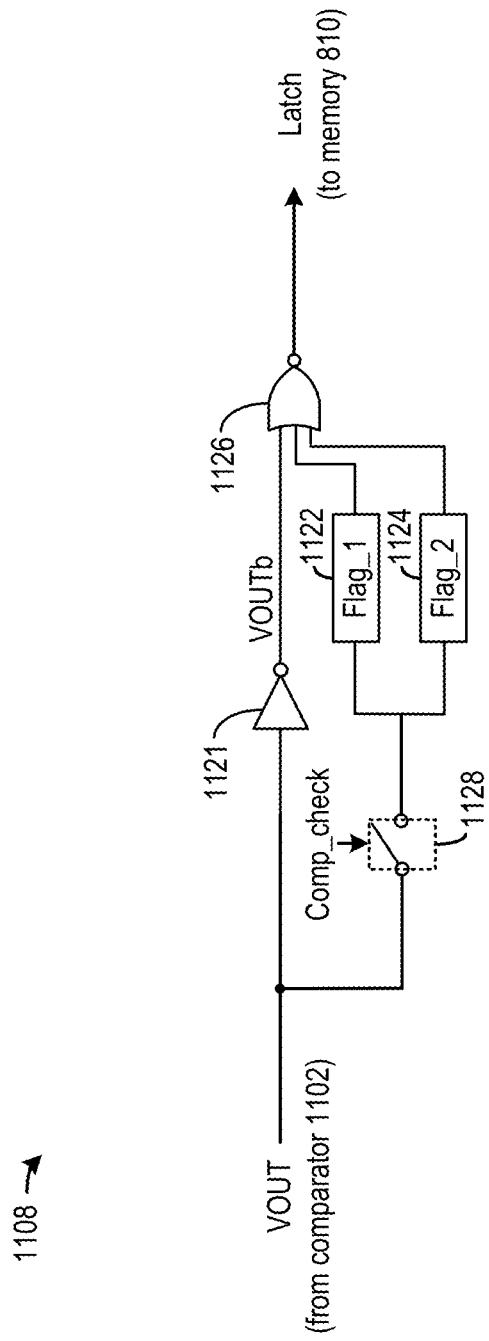
Figure 11C:
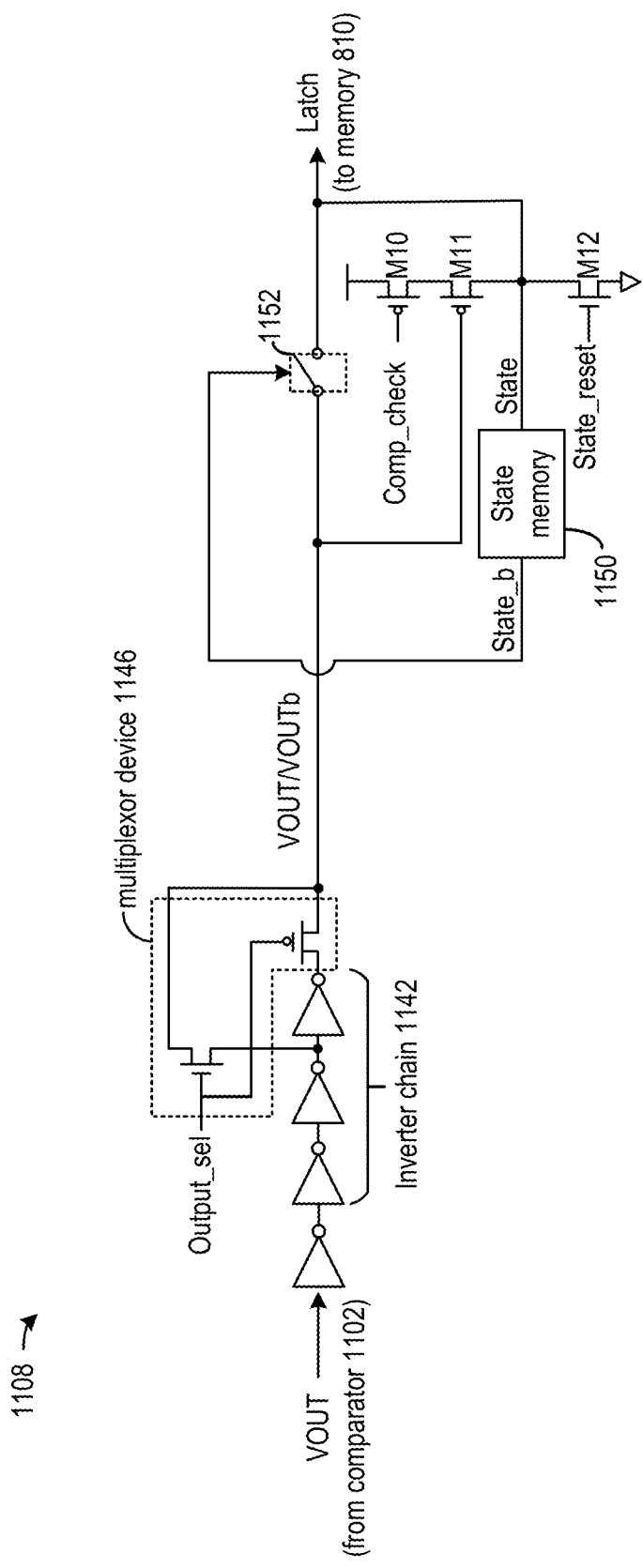

Reference is now made to FIGS. 11A-11C, which illustrate additional components of pixel cell 600 including an example of charge sensing unit 608 and ADC 610. As shown in FIG. 11A, pixel cell 600 can include a photodiode PD, a shutter switch M0, a transfer switch M1, and charge sensing unit 608 comprising charge storage device 608a and buffer 608b. Pixel cell 600 may also include ADC 610 comprising a CC capacitor, a comparator 1102, and output logic circuits 1108. In some examples, ADC 610 can be external to pixel cell 600. The output of comparator 1102 is coupled, via output logic circuits 1108, with memory 810 which can be internal to or external to pixel cell 600. Pixel cell 600 further includes a controller 1110 to control the switches, charge sensing unit 608, and ADC 610. Controller 1110 can control charge sensing unit 608 and ADC 610 to perform multiple quantization operations associated with different light intensity ranges to generate a digital representation of the intensity of the incident light. Output logic circuits 1108 can determine which quantization operation output is to be stored in memory 810 and/or to be output as a pixel value. Each switch can be a transistor such as, for example, a metal-oxide-semiconductor field-effect transistor (MOSFET), a bipolar junction transistor (BJT), etc.

Specifically, shutter switch M0 can be disabled by a shutter signal provided by controller 1110 to start an integration period, in which the photodiode PD can generate and accumulate charge in response to incident light. Transfer switch M1 can be controlled by a TG signal provided by controller 1110 to transfer some of the charge to charge storage device 608a. The TG signal can change between different quantization operations. For example, in TTS and FD ADC, transfer switch M1 can be biased at a partially-on state to set a quantum well capacity of photodiode PD, which also sets a quantity of residual charge stored at the photodiode PD. After the photodiode PD is saturated by the residual charge, overflow charge can flow through transfer switch M1 to charge storage device 608a. In PD ADC, transfer switch M1 can be fully turned on to transfer the residual charge from the photodiode PD to charge storage device 608a for measurement.

In addition, charge storage device 608a has a configurable capacity and can convert the charge transferred from switch M1 to a voltage at the OF node. Charge storage device 608a includes a $C_{FD}$ capacitor (e.g., a floating drain) and a $C_{EXT}$ capacitor (e.g., an MOS capacitor) connected by a M6 switch. M6 switch can be enabled by a LG signal to expand the capacity of charge storage device 608a by connecting $C_{FD}$ and $C_{EXT}$ capacitors in parallel, or to reduce the capacity by disconnecting the capacitors from each other. The capacity of charge storage device 608a can be reduced for measurement of residual charge to increase the charge-to-voltage gain and to reduce the quantization error. Moreover, the capacity of charge storage device 608a can also be increased for measurement of overflow charge to reduce the likelihood of saturation and to improve non-linearity. As to be described below, the capacity of charge storage device 608a can be adjusted for measurement of different light intensity ranges. Charge storage device 608a is also coupled with a reset switch M2 which can be controlled by a reset signal RST, provided by controller 1110, to reset $C_{FD}$ and $C_{EXT}$ capacitors between different quantization operations. Buffer 608b can include a switch M3 configured as a source follower to buffer the voltage at the OF node to improve its driving strength. The buffered voltage can be at the input node PIXEL_OUT of ADC 610. The M4 transistor provides a current source for buffer 608b and can be biased by a VB signal.

During FD ADC and TTS, transfer switch M1 can be biased by TG signal in a partially turned-on state. For example, the gate voltage of transfer switch M1 (TG) can be set based on a target voltage developed at photodiode PD corresponding to the full well capacity of the photodiode. With such arrangements, only overflow charge (e.g., charge generated by the photodiode after the photodiode saturates) will transfer through transfer switch M1 to reach charge storage device 608a, to measure time-to-saturation (for high light intensity range 710) and/or the quantity of charge stored in charge storage device 608a (for medium light intensity range 708). For FD ADC and TTS, the capacitance of charge storage device 608a (by connecting $C_{EXT}$ and $C_{FD}$) can also be maximized to increase threshold 704.

Moreover, to measure low light intensity range 706, transfer switch M1 can be controlled in a fully turned-on state to transfer the residual charge stored in photodiode PD to charge storage device 608a. The transfer can occur after the quantization operation of the overflow charge stored at charge storage device 608a completes and after charge storage device 608a is reset. Moreover, the capacitance of charge storage device 608a can be reduced. As described above, the reduction in the capacitance of charge storage device 608a can increase the charge-to-voltage conversion ratio at charge storage device 608a, such that a higher voltage can be developed for a certain quantity of stored charge. The higher charge-to-voltage conversion ratio can reduce the effect of measurement errors (e.g., quantization error, comparator offset, etc.) introduced by subsequent quantization operation on the accuracy of low light intensity determination. The measurement error can set a limit on a minimum voltage difference that can be detected and/or differentiated by the quantization operation. By increasing the charge-to-voltage conversion ratio, the quantity of charge corresponding to the minimum voltage difference can be reduced, which in turn reduces the lower limit of a measurable light intensity by pixel cell 600 and extends the dynamic range.

The charge (residual charge and/or overflow charge) accumulated at charge storage device 608a can develop an analog voltage at the OF node, which can be buffered by switchable buffer 904 at PIXEL_OUT and quantized by ADC 610. As shown in FIG. 11A, ADC 610 includes a comparator 1102 which can be reset by a switch M5, and output logic circuits 1108. ADC 610 is also coupled with memory 810, which can be coupled with a counter that can generate a set of count values based on a free-running clock signal, whereas memory 810 can be controlled, by comparator 1102 via output logic circuits 1108, to store a count value (e.g., the latest count value) generated by counter 808. Memory 810 can be, for example, a latch circuit to store the count value based on local pixel value.

Comparator 1102 can compare an analog voltage COMP_IN, which is derived from PIXEL_OUT by the CC capacitor, against a threshold VREF, and generate a decision VOUT based on the comparison result. The CC capacitor can be used in a noise/offset compensation scheme to store the reset noise and comparator offset information in a VCC voltage, which can be added to the PIXEL_OUT voltage to generate the COMP_IN voltage, to cancel the reset noise component in the PIXEL_OUT voltage. The offset component remains in the COMP_IN voltage and can be cancelled out by the offset of comparator 1102 when comparator 1102 compares the COMP_IN voltage against threshold VREF to generate the decision VOUT. Comparator 1102 can generate a logical one for VOUT if the COMP_IN voltage equals or exceeds VREF. Comparator 1102 can also generate a logical zero for VOUT if the COMP_IN voltage falls below VREF. VOUT can control a latch signal which controls memory 810 to store a count value.

Controller 1110 can control ADC 610 to perform a TTS operation, a FD ADC operation, and a PD ADC operation. The TTS quantization operation can be based on the scheme described in FIG. 9A, whereas the PD ADC and FD ADC quantization operations can be based on the scheme described in FIG. 9B. Output logic circuits 1108 can determine which of the quantization operations (one of TTS, FD ADC, or PD ADC) to store a count value in memory 810 and/or to be output as a pixel value. In a case where the measurement mode outputs are performed sequentially, output logic circuits 1108 can also prevent a later measurement mode from overwriting the count value stored by an earlier measurement mode. In addition, controller 1110 further includes a calibration module 1112 which can update the control signals for TTS, FD ADC, and PD ADC operations to perform calibration operations, as to be described below.

FIG. 11B and FIG. 11C illustrate examples of internal components of output logic circuits 1108. As shown in FIG. 11B, output logic circuits 1108 can control the forwarding of output of comparator 1102 ("VOUT") as latch signal to memory 810 to store the count value from one of the measurement modes. Output logic circuits 1108 may include an inverter 1121, a register 1122, a register 1124, a NOR gate 1126, and a switch 1128. Inverter 1121 can generate an inverted version of VOUT ("VOUTb"). Register 1122 can store a FLAG_1 signal which indicates that a count value representing a time-to-saturation measurement is generated in the TTS mode. Register 1122 can store a FLAG_1 signal, based on output of comparator 1102 VOUT, to indicate that a count value is generated in an earlier measurement mode (e.g., TTS). Moreover, register 1124 can store a FLAG_2 signal based on which indicates a count value is generated in another earlier measurement mode (e.g., FD ADC, PD ADC, etc.). Switch 1128 can be controlled by a comp_check signal from controller 1110 to forward the VOUT signal to registers 1122 and 1124 to set the FLAG_1 and FLAG_2 flag. NOR gate 1126 can generate the latch signal based on a combination of VOUTb of the current measurement mode, as well as FLAG_1 and FLAG_2 signals, to either store the output of the current measurement mode or to preserve the output stored in memory 810 from earlier measurement modes. For example, if all of VOUTb, FLAG_1, and FLAG_2 are low, NOR gate 1126 can generate a logical one as the latch signal. On the other hand, if one or all of FLAG_1 and FLAG_2 is high, NOR gate 1126 can remain in logical zero, thereby locking memory 810 to prevent the count value stored in memory 810 (from a prior measurement mode) from being overwritten by the count value generated in the current measurement mode.

FIG. 11C illustrates another example of internal components of output logic circuits 1108. In FIG. 11C, output_sel is turned off by default. After the comparator is reset, the output of comparator is a logical one, and transistor M11 is turned off. Moreover, when state reset is asserted, the state node is at logical zero and state memory 1150 is reset. Comp_check is also at logical one by default, and transistor M10 is also turned off. After either of TTS, FD ADC, and PD ADC operation, comp_check can be set to logical zero turn on M10. If comparator output goes low after any ADC mode (VOUT for TTS and FD ADC, VOUTb for PD ADC), M11 can be turned on. With both transistors M10 and M11 turned on, state node can become a logical one, and an asserted state can be stored in state memory 1150. With state asserted, state b can have a logical zero to disable switch 1152, which prevents VOUT/VOUTb from propagating to memory 810 as a latch signal to store a count value. Memory 810 can become locked as a result.

Figure 12A:
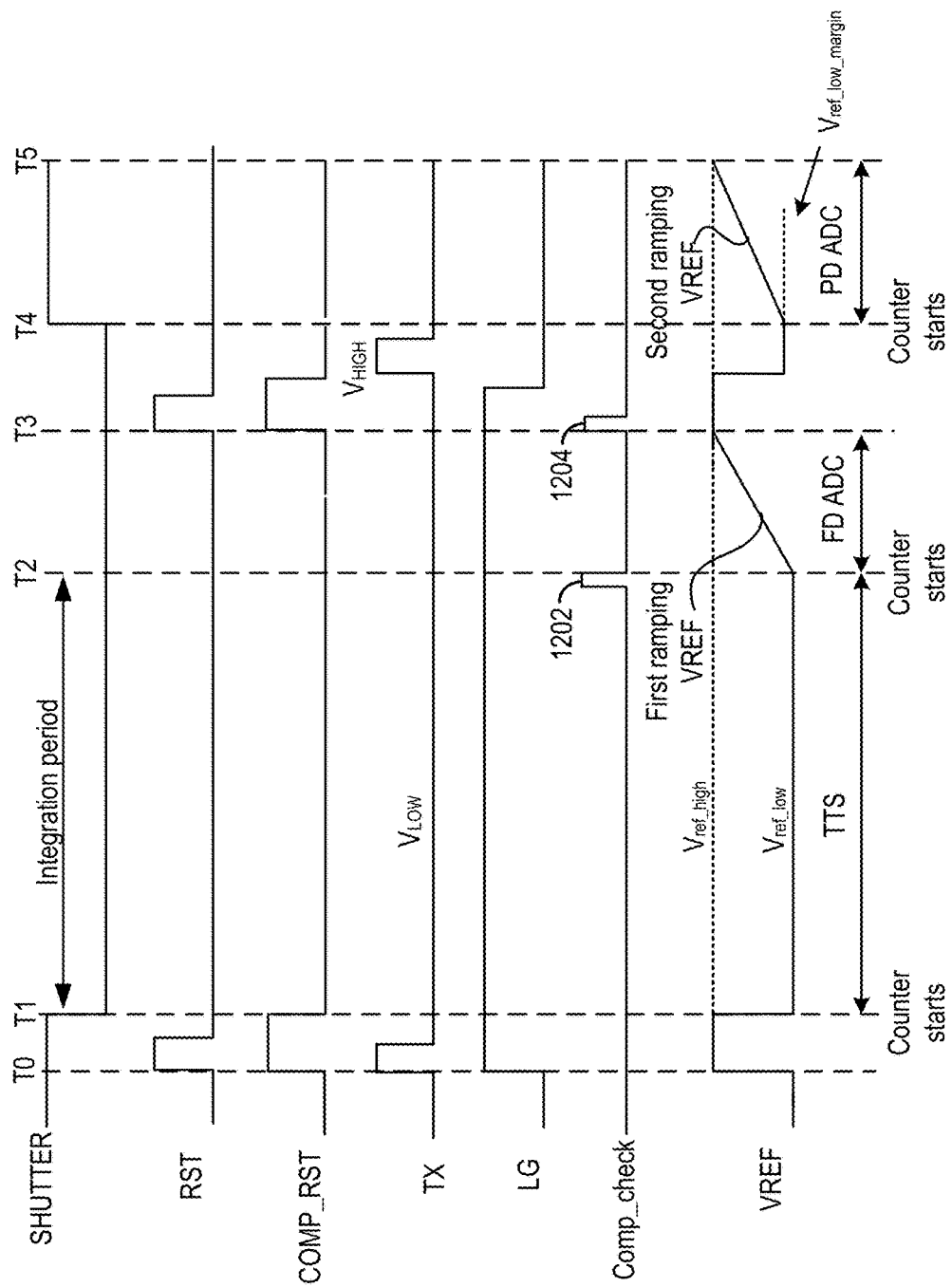
FIG. 12A and FIG. 12B illustrate example sequence of control signals to perform light intensity measurement.
Figure 12B:
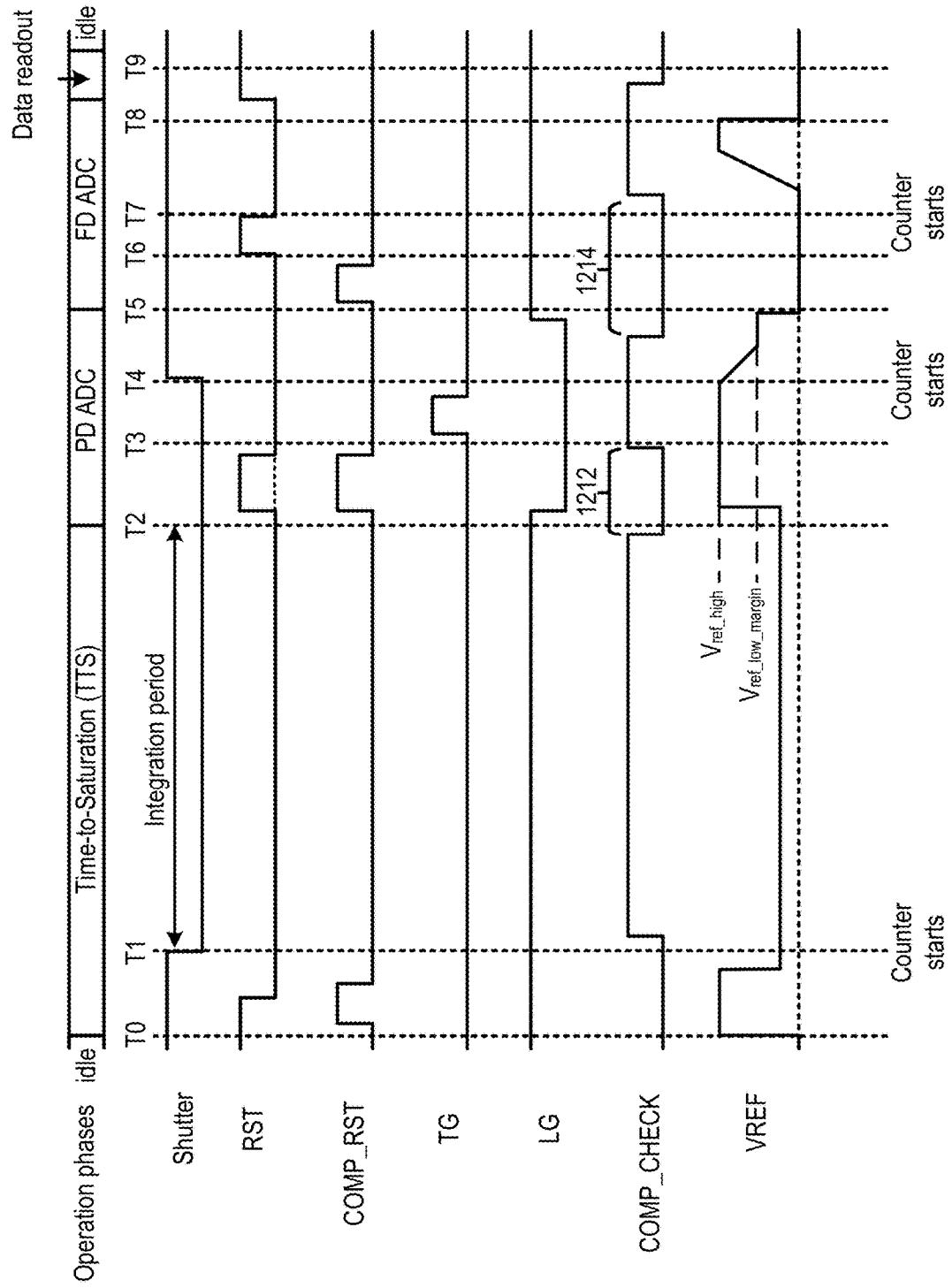

Reference is now made to FIG. 12A and FIG. 12B, which illustrates example sequences of control signals of pixel cell 600 of FIG. 11A. The example sequence of control signals can be generated by controller 1110 and can include shutter, RST, COMP_RST, TG, LG, and VREF with respect to time, to perform TTS, FD ADC, and PD ADC operations. Referring to FIG. 12A, the period between times T0 and T1 can correspond to a first reset phase, in which charge storage device 608a and comparator 1102 can be put in a reset state by controller 1110 by asserting the RST and COMP_RST signals, while the shutter signal can be asserted to prevent charge generated by photodiode PD from reaching charge storage device 608a. Both RST and LG signals are asserted to reset $C_{FD}$ and $C_{EXT}$ capacitors to set PIXEL_OUT at the reset level. With COMP_RST signal asserted and the positive terminal of comparator 1102 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC cap to store a $V_{CC}$ voltage including the components of the comparator offset, the reset noise, and PIXEL_OUT voltage at the reset level, as follows:

$$V_{cc}(T1)=(V_{ref\_high}+V_{comp\_offset})-(V_{pixel\_out\_rst}+V\sigma_{KTC}) \quad \text{(Equation 1)}$$

At time T1, the RST signal, the shutter signal, and the COMP_RST signal are released, which starts an integration period in which photodiode PD can accumulate and transfer charge. The integration period can end at time T2. Between times T1 and T3, TG signal can set transfer switch M1 in a partially turned-on state to allow PD to accumulate residual charge before photodiode PD saturates. If the light intensity in the medium or high intensity ranges of FIG. 7, photodiode PD can saturate and transfer overflow charge via transfer switch M1. LG signal can remain asserted to operate in low gain mode, in which both $C_{FD}$ capacitor and $C_{EXT}$ capacitor are connected in parallel to form charge storage device 608a to store the overflow charge. The overflow charge develops a new PIXEL_OUT voltage, $V_{pixel\_out\_sig1}$. The CC capacitor can AC couple the new PIXEL_OUT voltage $V_{pixel\_out\_sig1}$ into COMP_IN voltage by adding the $V_{CC}$ voltage, which includes the reset noise and comparator offset component. The new PIXEL_OUT voltage also includes reset noise, which can be cancelled by the reset noise component of the $V_{CC}$ voltage. The COMP_IN voltage at time Tx between times T1 and T3 can be as follows:

$$V_{comp\_in}(Tx)=V_{pixel\_out\_sig1}-V_{pixel\_out\_rst}+V_{ref\_high}+V_{comp\_offset} \quad \text{(Equation 2)}$$

In Equation 2, the difference between $V_{pixel\_out\_sig1}-V_{pixel\_out\_rst}$ represents the quantity of overflow charge stored in charge storage device 608a. The comparator offset in the COMP_IN voltage can also cancel out the comparator offset introduced by comparator 1102 when performing the comparison.

Between times T1 and T3, two phases of measurement of the COMP_IN voltage can be performed, including a time-to-saturation (TTS) measurement phase for high light intensity range 1010 and an FD ADC phase for measurement of overflow charge for medium light intensity 1008. Between times T1 and T2 (Integration period) the TTS measurement can be performed by comparing COMP_IN voltage with a static $V_{ref\_low}$ representing threshold 704 by comparator 1102. When PIXEL_OUT voltage goes below the static VREF, the output of comparator 1102 (VOUT) can output a logical one, and a count value from counter 808 at the time when VOUT trips can be stored into memory 810.

At or before time T2, controller 1110 can transmit a first comp_check pulse 1202 (an active high pulse for output logic circuits 1108 of FIG. 11B, an active low pulse for output logic circuits 1108 of FIG. 11C) to output logic circuits 1108 to determine the state of VOUT at the end of TTS. If the tripping of VOUT (e.g., being in a zero logical state) in the TTS operation is detected, an indication of the tripping of VOUT is stored in output logic circuits 1108 (e.g., FLAG_1 signal in FIG. 11B, setting state of state memory to a logical one in FIG. 11C), to lock memory 810. On the other hand, if comparator 1102 never flips during the time period between T0 and T1, which indicates that the incident light intensity is below the high light intensity range, memory 810 can store count values from subsequent PD ADC or FD ADC operations.

Between times T2 and T3, the FD ADC operation can be performed by comparing COMP_IN voltage with a first ramping VREF voltage that ramps from $V_{ref\_low}$ to $V_{ref\_high}$. If COMP_IN voltage goes below VREF, comparator 1102 can output a logical one and cause memory 810 to store a count value if FLAG_1 stored in register 1122 or the state stored in state memory 1150 is low. At or before time T3, controller 1110 can transmit a second comp_check pulse 1204 to output logic circuits 1108 to determine the state of VOUT at the end of FD ADC. If the tripping of VOUT (e.g., being in a zero logical state) in the FD ADC operation is detected, an indication of the tripping of VOUT is stored in output logic circuits 1108 (e.g., FLAG_2 signal in FIG. 11B, setting state of state memory to a logical one in FIG. 11C), to lock memory 810. On the other hand, if comparator 1102 never flips during the time period between T2 and T3, which indicates that the incident light intensity is below the high light intensity range, memory 810 can store count values from subsequent PD ADC operation.

In FIG. 12A, although integration period ends at time T2, between times T2 and T3 the photodiode PD remains capable of accumulating residual charge (if not saturated) or transferring overflow charge to charge storage device 608a. As a result, additional charge can accumulate at charge storage device 608a or at the photodiode PD between times T2 and T3 after the TTS operation. The additional charge can introduce motion blurring and distortions when imaging a bright, fast moving object similar to a rolling shutter operation, which can reduce the shutter efficiency of the image sensor.

Between times T3 and T5, the PD ADC operation can be performed. Between times T3 and T4 can be the second reset phase, in which both RST and COMP_RST signals are asserted to reset charge storage device 608a (comprising the parallel combination of $C_{FD}$ capacitor and $C_{EXT}$ capacitor) and comparator 1102 to prepare for the subsequent PD ADC operation. The $V_{CC}$ voltage can be set according to Equation 1.

After RST and COMP_RST are released, LG is turned off to disconnect $C_{EXT}$ from $C_{FD}$ to increase the charge-to-voltage conversion rate for the PD ADC operation. TG is set at a level to fully turn on the M1 transfer switch to transfer the residual charge stored in the photodiode PD to $C_{FD}$. The residual charge develops a new PIXEL_OUT voltage, $V_{pixel\_out\_sig2}$. The CC capacitor can AC couple the new PIXEL_OUT voltage $V_{pixel\_out\_sig2}$ into COMP_IN voltage by adding the $V_{CC}$ voltage. Between times T3 and T4, the photodiode PD remains capable of generating additional charge in addition to the charge generated between times T1 to T3, and transferring the additional charge to charge storage device 608a. The $V_{pixel\_out\_sig2}$ also represents the additional charge transferred between times T3 and T4. At time T4, the COMP_IN voltage can be as follows:

$$V_{comp\_in}(T4) = V_{pixel\_out\_sig2} - V_{pixel\_out\_rst} + V_{ref\_high} + V_{comp\_offset} \quad \text{(Equation 3)}$$

In Equation 3, the difference between $V_{pixel\_out\_sig2} - V_{pixel\_out\_rst}$ represents the quantity of charge transferred by the photodiode to charge storage device 608a between times T3 and T4. The comparator offset in the COMP_IN voltage can also cancel out the comparator offset introduced by comparator 1102 when performing the comparison.

At time T4, the shutter signal is asserted to prevent the photodiode PD from accumulating and transferring additional charge. Between times T4 and T5, controller 1110 can perform the PD ADC operation by comparing the COMP_IN voltage with a second VREF ramp that starts from $V_{ref\_low\_margin}$ to $V_{ref\_high}$. In PD ADC phase, $V_{ref\_high}$ can represent the minimum detectable quantity of residual charge stored in photodiode PD, whereas $V_{ref\_low}$ margin can represent the saturation threshold of photodiode PD with margin to account for dark current, as described above. If neither FLAG_1 nor FLAG_2 is asserted prior to PD ADC, or the state stored in state memory 1150 remains low, the count value obtained when comparator 1102 trips during PD ADC can be stored into memory 810, and the count value from PD ADC can be provided to represent the intensity of light.

Reference is now made to FIG. 12B, which illustrates another example sequence of the control signals of pixel cell 600 generated by controller 1110. In FIG. 12B, PD ADC operation can be performed between the TTS and FD ADC operations, which can reduce the accumulation of additional charge in charge storage device 608a or in the photodiode PD after the TTS operation and improve shutter efficiency. As shown in FIG. 12B, between times T0 and T1 is a first reset phase as in FIG. 12A, in which both charge storage device 608 and comparator 1102 can be put in a reset state by controller 1110 by asserting the RST and COMP_RST signals. Moreover, LG signal is asserted, which allows $C_{FD}$ and $C_{EXT}$ capacitors to be reset by the RST signal and the PIXEL_OUT signal is set at the reset level. With COMP_RST signal asserted and the positive terminal of comparator 1102 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC cap to store a $V_{CC}$ voltage including the components of the comparator offset, the reset noise, and PIXEL_OUT voltage at the reset level, as described in Equation 1 above:

$$V_{cc}(T1) = (V_{ref\_high} + V_{comp\_offset}) - (V_{pixel\_out\_rst} + V\sigma_{KTC}) \quad \text{(Equation 1)}$$

Moreover, shutter signal can be asserted to prevent charge generated by photodiode PD from reaching charge storage device 608a.

At time T1, the shutter, COMP_RST, and the RST signals are released, which starts the integration period in which photodiode PD can accumulate and transfer charge. TG signal can set transfer switch M1 in a partially turned-on state to allow PD to transfer overflow charge to charge storage device 608. LG signal can remain asserted to operate in low gain mode, in which both $C_{FD}$ capacitor and $C_{EXT}$ capacitor are connected in parallel to form charge storage device 608 to store the overflow charge. The overflow charge develops a new PIXEL_OUT voltage, $V_{pixel\_out\_sig1}$. The CC capacitor can AC couple the PIXEL_OUT voltage to become the COMP_IN voltage. The COMP_IN voltage between times T1 and T2 can be set based on Equation 1 above.

Between times T1 and T2, a time-to-saturation (TTS) measurement can be performed by comparator 1102 comparing COMP_IN voltage with a static $V_{ref\_low}$ to generate VOUT. Between times T2 and T3, controller 1110 can transmit a first comp_check pulse 1212 to output logic circuits 1108 to determine the state of VOUT at the end of TTS and, if VOUT becomes a logical one during TTS, set FLAG_1 in register 1122 (in FIG. 11B) or a state in state memory 1150 (in FIG. 11C) to indicate that VOUT trips to lock memory 810 as described above. In FIG. 12B, first comp_check pulse 1212 can be a pulse having a logical zero to turn on M11 of FIG. 11C, as explained above.

Following the TTS measurement, between times T2 and T5, the PD ADC operation can be performed to measure the residual charge stored in the photodiode PD. The LG signal is de-asserted to disconnect $C_{EXT}$ from $C_{FD}$ to increase charge-to-voltage conversion ratio, as described above. The overflow charge (if any) is divided between $C_{FD}$ and $C_{EXT}$ based on a ratio of capacitances between $C_{FD}$ and $C_{EXT}$ such that $C_{FD}$ stores a first portion of the overflow charge and $C_{EXT}$ stores a second portion of the overflow charge. $V_{pixel\_out\_sig1}$ can correspond to the first portion of the overflow charge stored in $C_{FD}$.

To prepare for the PD ADC operation, between times T2 and T3, COMP_RST signal is asserted again to reset comparator 1102. The resetting of comparator 1102 can set a new $V_{CC}$ voltage across the CC capacitor based on a difference between $V_{pixel\_out\_sig1}$ and the output of comparator 1102 in the reset state, as follows:

$$V_{cc}(T2) = (V_{ref\_high} + V_{comp\_offset}) - (V_{pixel\_out\_sig1}(T3) + V\sigma_{KTC}) \quad \text{(Equation 4)}$$

Optionally, the RST signal can be asserted between times T2 and T3 to reset $C_{FD}$ and to remove the first portion of the overflow charge, prior to the transfer of the residual charge. This allows the subsequent PD ADC operation to quantize only the residual charge rather than a mixture of the residual charge and the first portion of the overflow charge. Such arrangements can improve the accuracy of measurement of low light intensity as there is no need to remove the overflow charge component (based on the result of the subsequent FD ADC operation) from the PD ADC operation output which could otherwise introduce additional errors. On the other hand, not asserting the RST signal between times T2 and T3 can be advantageous, as such arrangements can introduce redundancy in the PD ADC and FD ADC operations and increase the signal-to-noise ratio, as both operations measure a mixture of residual and overflow charge.

Between times T3 and T4, COMP_RST signal is released so that comparator 1102 exits the reset state. Moreover, the TG signal can set transfer switch M1 in a fully turned-on state to transfer the residual charge to $C_{FD}$. The residual charge can be transferred to $C_{FD}$, which changes the PIXEL_OUT voltage to $V_{pixel\_out\_sig2}$. The new PIXEL_OUT voltage can be AC coupled into a new COMP_IN voltage at time T4, as follows:

$$V_{comp\_in}(T4) = V_{pixel\_out\_sig2} - V_{pixel\_out\_sig1} + V_{ref\_high} + V_{comp\_offset} \quad \text{(Equation 5)}$$

In Equation 5, the difference between $V_{pixel\_out\_sig2} - V_{pixel\_out\_sig1}$ represents the quantity of residual charge transferred by the photodiode to charge storage device 608 between times T3 and T4.

After TG is fully turned-on between times T3 and T4, the TG is de-asserted to disconnect the photodiode PD from $C_{FD}$ and $C_{EXT}$. As a result, no additional charge is transferred to $C_{FD}$ and $C_{EXT}$ after time T4 until the start of next integration period. Compared with the arrangements of FIG. 12A where additional charge can be accumulated in the photodiode PD during the FD ADC operation which typically takes a long time, in FIG. 12B the additional charge is accumulated only during the reset period T2-T3 and the transfer period T3-T4, both of which are typically much shorter than a FD ADC operation. Moreover, after T4, no additional overflow charge is accumulated at charge storage device 608a. As a result, both FD ADC and PD ADC can process charge accumulated in almost the same integration period as the TTS operation, which can improve the shutter efficiency of the image sensor.

Between times T4 and T5, controller 1110 can perform the PD ADC operation by comparing the COMP_IN voltage with a VREF ramp that starts from $V_{ref\_high}$ to $V_{ref\_low\_margin}$. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above. If the photodiode PD does not saturate, COMP_IN can go above the VREF ramp. An inverted VOUT (VOUTb) can become a logical one and cause a count value to be stored in memory 810 if FLAG_1 in register 1122 (FIG. 11B) or the state of state memory 1150 remains low. The inversion of VOUT can be accomplished by inverter chain 1142 and multiplexor device 1146 of FIG. 11C based on, for example, asserting output_sel signal during the PD ADC operation.

Between times T5 and T7, controller 1110 can transmit a second comp_check pulse 1214 to output logic circuits 1108 to determine the state of VOUT at the end of PD ADC. If VOUTb having a logical one in the PD ADC operation is detected, an indication of the tripping of VOUT is stored in output logic circuits 1108 (e.g., FLAG_2 signal in FIG. 11B, setting state of state memory to a logical one in FIG. 11C), to lock memory 810. On the other hand, if comparator 1102 never trips during the time period between T4 and T5, which indicates that the incident light intensity is above the medium light intensity range such that COMP_IN stays below VREF between times T4 and T5, memory 810 is not locked and can store count values from the subsequent FD ADC operation. In FIG. 12B, second comp_check pulse 1214 can be a pulse having a logical zero to turn on M11 of FIG. 11C, as explained above.

Between times T5 and T8, a FD ADC operation can be made to measure the overflow charge transferred by the photodiode PD within the integration period. As photodiode PD remains disconnected from $C_{FD}$ and $C_{EXT}$, no additional charge is transferred to $C_{FD}$ and $C_{EXT}$, and the total charge stored in $C_{FD}$ and $C_{EXT}$ is mostly generated in the exposure period $T_{exposure}$, together with additional charge generated by the photodiode between times T3 and T4.

At time T5, the LG signal is asserted to connect $C_{FD}$ with $C_{EXT}$, which allows the second portion of the overflow charge stored in $C_{EXT}$ to combine with the residual charge stored in $C_{FD}$ (and the first portion of the overflow charge if RST is not asserted between times T2 and T3), and a new PIXEL_OUT voltage $V_{pixel\_out\_sig3}$ can develop at the parallel combination of $C_{FD}$ and $C_{EXT}$ and is to be quantized.

Between times T5 and T7, a noise sampling operation can be performed to mitigate the effect of reset noise and comparator offset on the FD ADC operation. Between times T5 and T6, comparator 1102 can be reset as part of the first sampling operation. The positive terminal of comparator 1102 is connected to the lower end of VREF, $V_{ref\_low}$. The $V_{CC}$ voltage can include components of reset noise and comparator offset as described above. The $V_{CC}$ voltage can be as follows:

$$V_{cc}(T5) = (V_{ref\_low} + V_{comp\_offset}) - (V_{pixel\_out\_sig3} + V\sigma_{KTC1})$$ (Equation 6)

Between times T6 and T7, both $C_{FD}$ and $C_{EXT}$ can be reset, while comparator 1102 exits the reset state, as part of a second sampling operation. As a result of resetting, PIXEL_OUT can be reset to a reset voltage $V_{pixel\_out\_rst}$. Moreover, second reset noise charge is also introduced into charge storage device 608, which can be represented by $V\sigma_{KTC2}$. The second reset noise charge typically tracks the first reset noise charge. At time T6, as the result of the second sampling operation, $V_{pixel\_out}$ can be as follows:

$$V_{pixel\_out}(T6) = V_{pixel\_out\_rst} + V\sigma_{KTC2}$$ (Equation 7)

At time T7, COMP_RST is released, and comparator 1102 exits the reset state. Via AC-coupling, the COMP_IN voltage can track $V_{pixel\_out}(T6)$ in addition to $V_{cc}(T5)$ as follows:

$$V_{comp\_in}(T7) = (V_{ref\_low} + V_{comp\_offset}) + (V_{pixel\_out\_rst} - V_{pixel\_out\_sig3}) + (V\sigma_{KTC2} - V\sigma_{KTC1})$$ (Equation 8)

Following the second sampling operation, the COMP_IN voltage can be quantized by comparing against a VREF ramp between times T7 and T8. When VREF goes above COMP_IN, VOUT can become a logical one. If neither FLAG_1 or FLAG_2 is asserted (FIG. 11B), or the state remains at the logical zero state (FIG. 11C), a count value from counter 808 when VOUT trips can be stored into memory 810 to represent the intensity of light received in the integration period. After time T8, the digital value stored in memory 810 can be read out to represent the intensity of light received by the photodiode PD within the integration, at time T9. In a case where one image frame is generated in a single frame period, the frame period can span from time T0 to T8.

As shown in Equations 5 and 8, the polarity of comparison in PD ADC operation, where $V_{comp\_in}$ represents $V_{pixel\_out\_sig2} - V_{pixel\_out\_sig1}$, is opposite to the polarity of comparison in FD ADC or TTS operation, where $V_{comp\_in}$ represents $V_{pixel\_out\_rst} - V_{pixel\_out\_sig3}$. The inversion of VOUT provided by inverter chain 942 and multiplexor device 946 can also accommodate the opposite polarity of comparison between PD ADC and FD ADC/TTS operations.

Figure 13A:
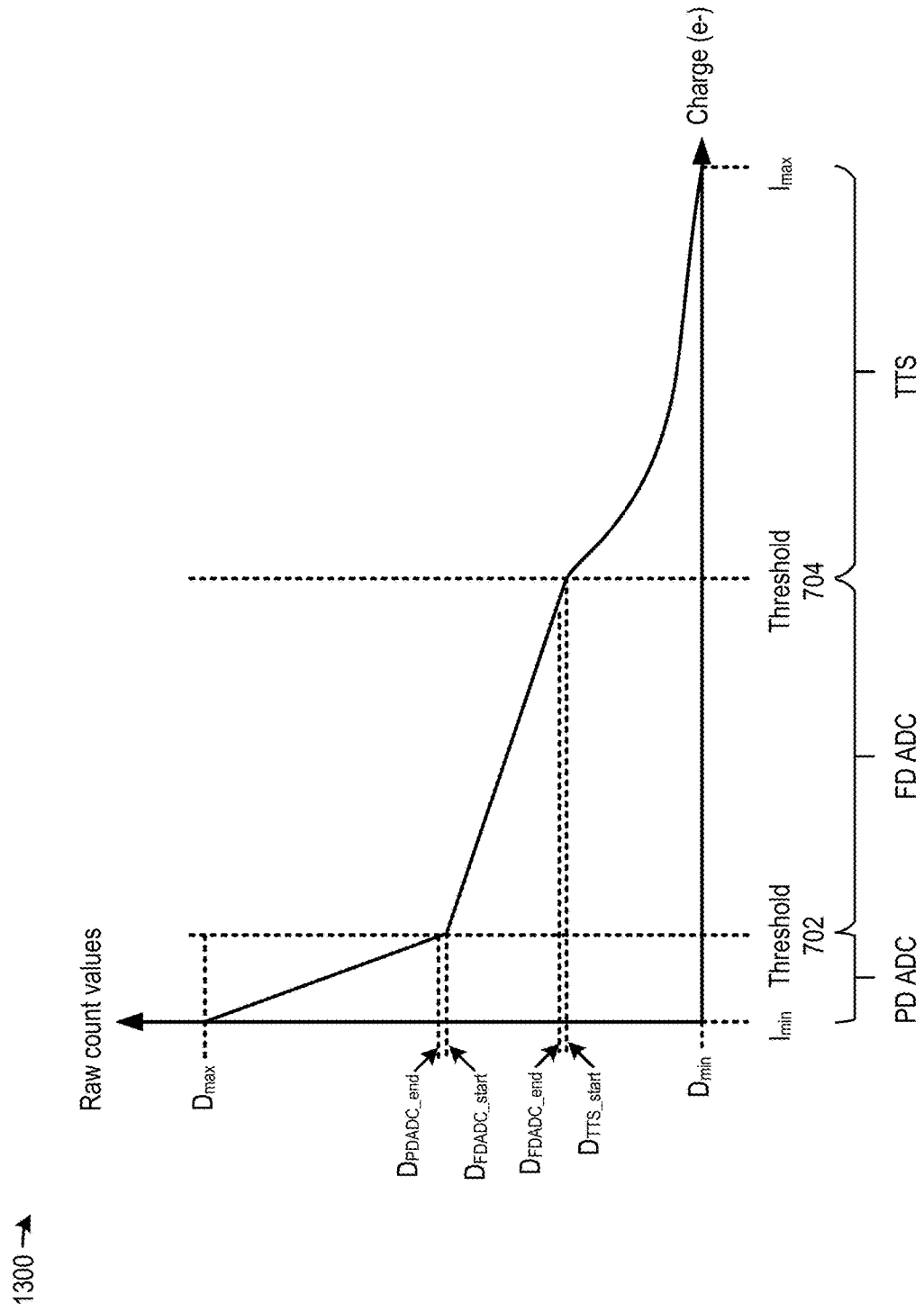
FIG. 13A and FIG. 13B illustrates an example of relationships between outputs of an image sensor and incident light intensity.

FIG. 13A includes a graph 1300 which illustrates an example of analog-to-digital (A/D) conversion relationships between raw count values output from the TTS, FD ADC and PD ADC operations by pixel cell 600600 and incident light intensity, based on the control signal sequences in FIG. 12A or FIG. 12B. In FIG. 13A, the x-axis represents a range of incident light intensities including the intensity ranges for the TTS, FD ADC and PD ADC operations. As in FIG. 7, the light intensity is represented by a quantity of charge generated by the photodiode PD within an integration period and can be in the unit of e-. The y-axis of graph 1300 represents raw count values output by the TTS, FD ADC and PD ADC operations for the range of incident light intensities of the x-axis. In the example of FIG. 13A, a maximum count value ("$D_{max}$") can correspond to the minimum measurable light intensity ("$I_{min}$"), whereas a minimum count value ("$D_{min}$") can correspond to the maximum measurable light intensity ("$I_{max}$"), and a ratio between $I_{max}$ and $I_{min}$ can correspond to the dynamic range of pixel cell 600. Each of TTS, FD ADC, and PD ADC operation outputs a range of count values, each range corresponding to a range of light intensity to be measured by the respective operation. For example, the TTS operation can output a count value within the range $D_{TTS\_start}$ to $D_{min}$, which corresponds to, respectively, threshold 704 of FIG. 7 and $I_{max}$. the FD ADC operation can output a count value within the range $D_{FDADC\_start}$ to $D_{FDADC\_end}$ (which can be $D_{TTS\_start}+1$ in FIG. 13A), whereas the PD ADC operation can output a count value within the range $D_{max}$ to $D_{PDADC\_end}$ (which can be $D_{FDADC\_start}+1$ in FIG. 13A).

As shown in FIG. 13A, the count values can have different relationships with respect to the incident light intensities for different intensity ranges. For example, in both FD ADC and PD ADC, the count values are linearly related to the incident light intensity, but in PD ADC the count values change with respect to the incident light intensity at a higher rate than in FD ADC. This can be due to the charge storage capacity of charge storage device 608a being reduced in PD ADC to increase the charge-to-voltage conversion gain. As a result, a given range of PD ADC count values can cover a smaller intensity range than the same range of FD ADC count values, and the quantization resolution for PD ADC can be improved. Moreover, in the TTS operation the count values are not linearly related to the incident light intensity. This is due to the fact that the count value in TTS measures a time of saturation which is inversely proportional to the incident light intensity, whereas in PD ADC and FD ADC the count values measure a quantity of charge (residual charge, overflow charge, etc.) which can be proportional to the incident light intensity.

The varying relationships between count values and light intensities can pose problems for an application that uses the count values to determine the incident light intensities. The application typically only receives the count values and has no other information of the operation of the image sensor, such as which mode(s) of operation generate the count values, the quantization resolutions, etc. The application may operate on the count values based on an expectation that the count values have an uniform relationship with respect to the light intensity across the entire dynamic range. Moreover, some applications that rely on image feature extraction, such as SLAM, may require the count values to have an uniform and linear A/D conversion relationship with respect to light intensity, such as one as shown in graph 1350 of FIG. 13B, to determine differences between count values of neighboring pixels, and to extract image features based on the differences. As shown in graph 1350 of FIG. 13B, the relationship between a count value (labelled "refined count value") and the light intensity represented by the count value is the same across different intensity ranges of FIG. 13A. Such applications may not be able to work properly with the count values output from pixel cell 600 from the TTS, FD ADC, and PD ADC operations as shown in FIG. 13A. To enable such applications to operate based on the count values output from pixel cell 600, a conversion operation may be needed to convert the raw count values to refined count values that have a more linear and uniform relationship with respect to the incident light intensity across different intensity ranges compared with FIG. 13A, although the achievable linearity and uniformity may be limited by other various components of pixel cell 600, such as the quantization resolution of pixel ADC 610.

Figure 13B:
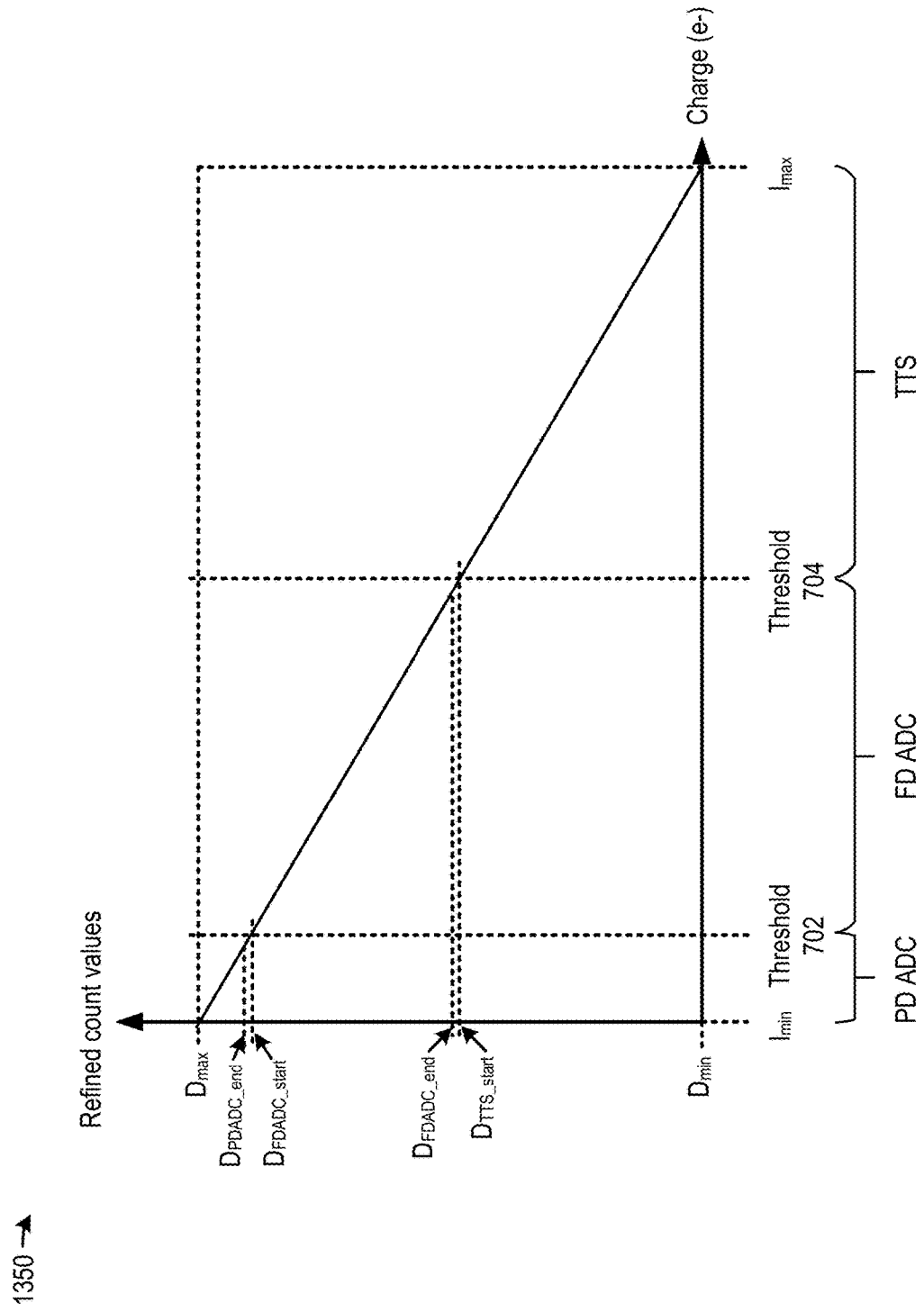
Figure 14A:
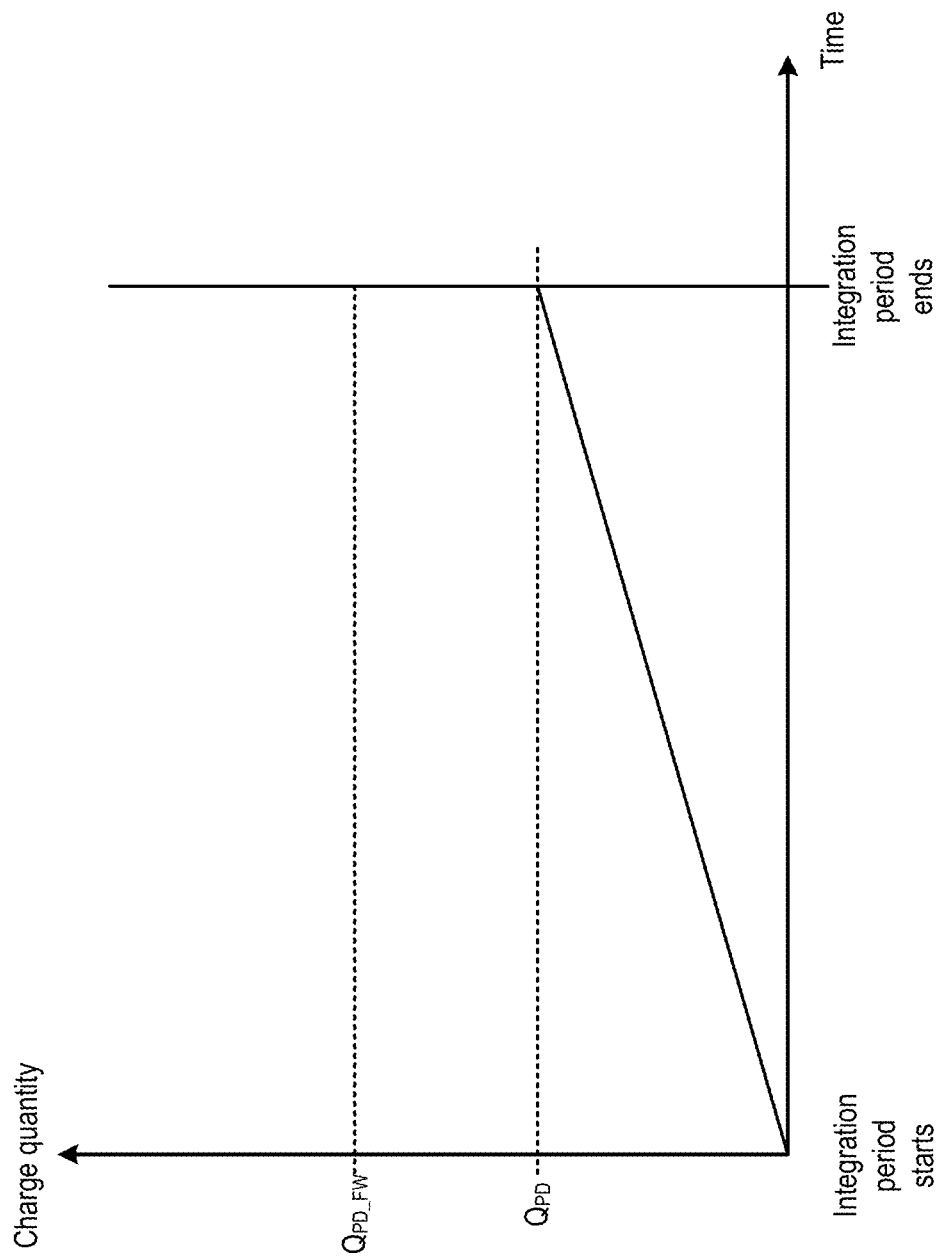
FIG. 14A, FIG. 14B, and FIG. 14C illustrate examples of relationships between a quantity of charge accumulated and time for various measurement modes.
Figure 14B:
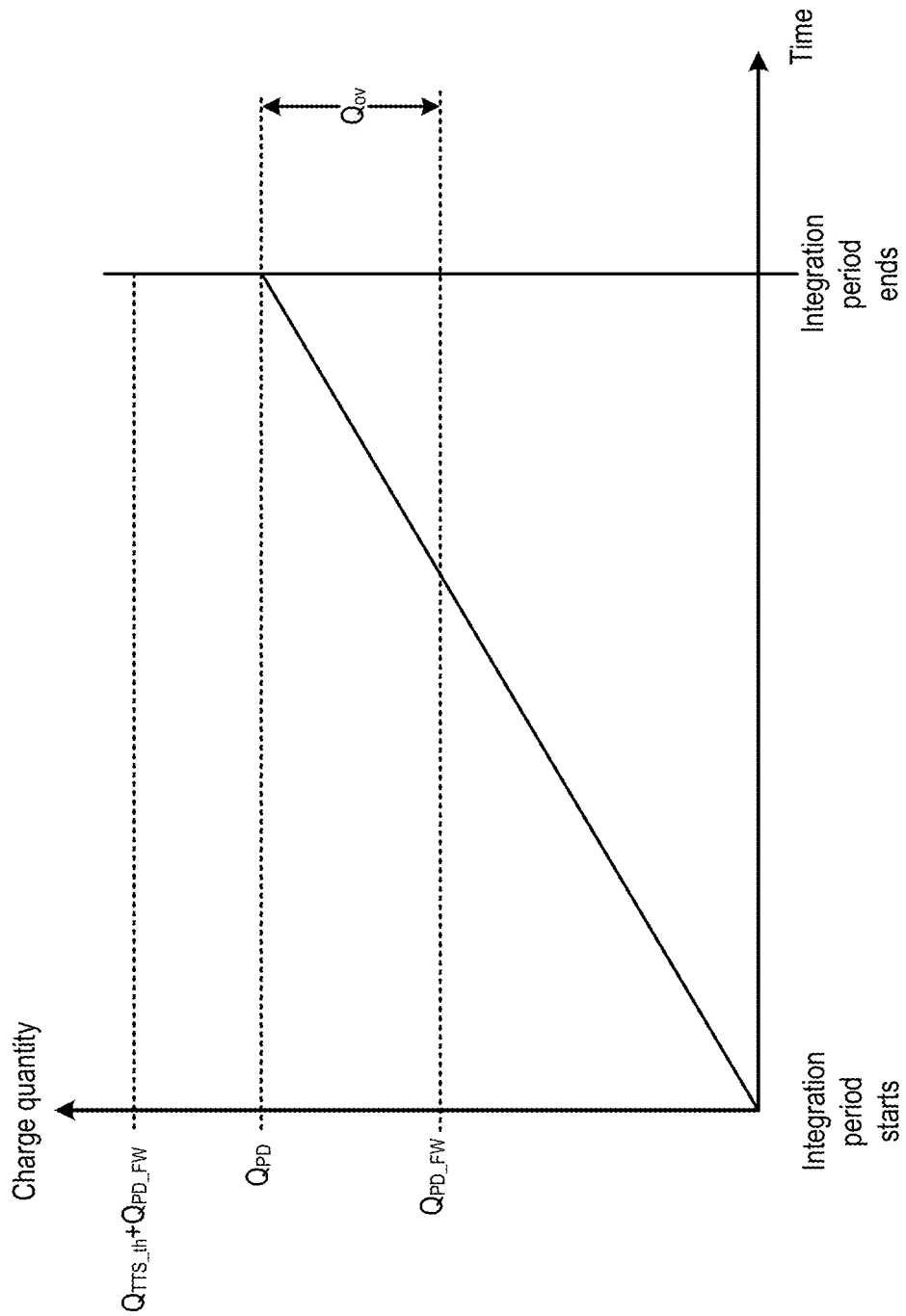
Figure 14C:
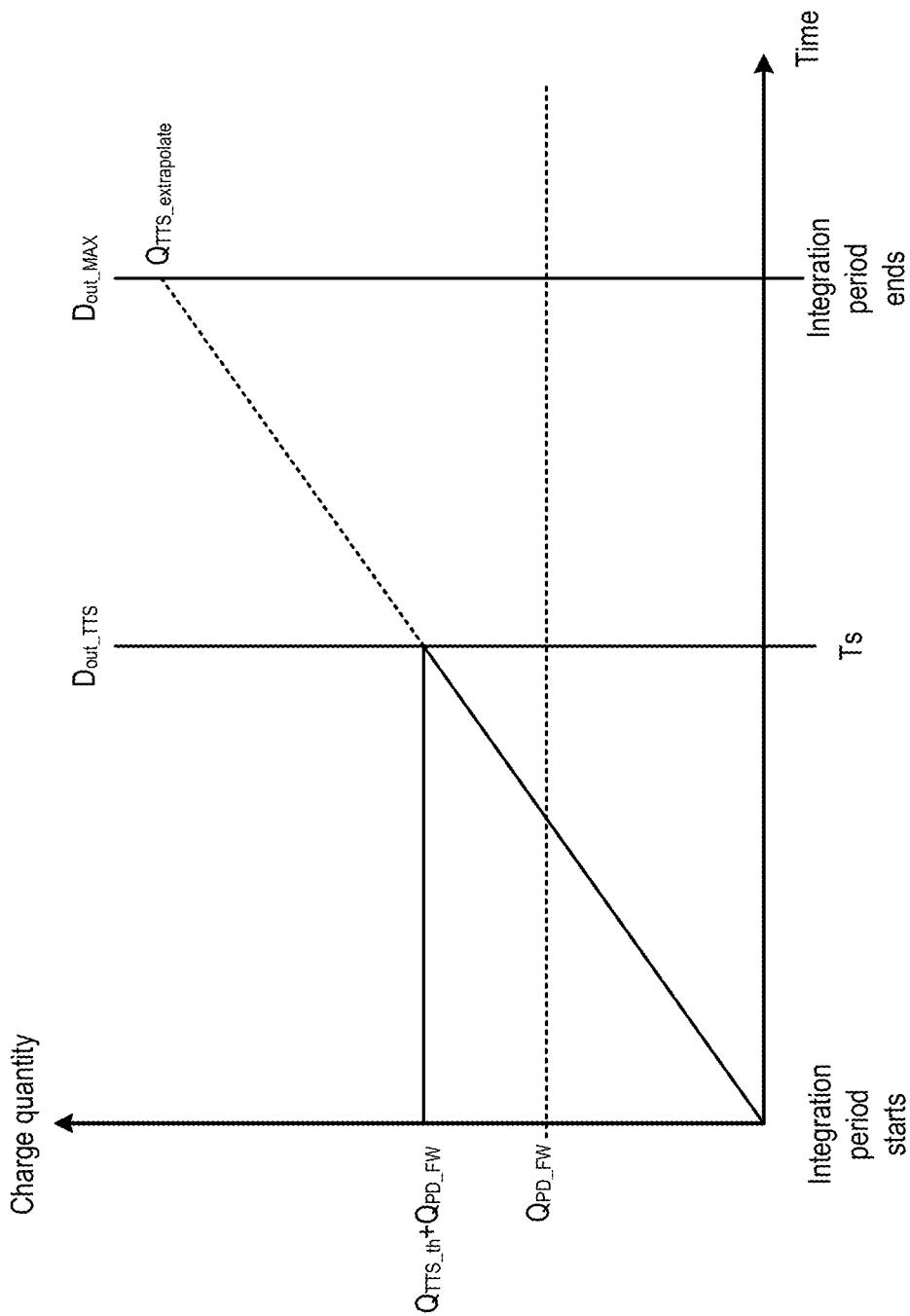

FIG. 14A, FIG. 14B, and FIG. 14C illustrate example relationships between charge and time in different measurement operations, which can serve as the basis of a conversion operation to convert a raw count value in FIG. 13A to a corresponding refined count value in FIG. 13B. FIG. 14A illustrates an example relationship for the PD ADC measurement operation. As shown in FIG. 14A, within the integration period, the photodiode PD can accumulate a quantity of residual charge $Q_{PD}$ before it saturates, when the quantity of accumulated residual charge equals to the photodiode full well capacity $Q_{PD\_FW}$. Assuming that at the start of the integration period the count value is at a value $D_{PD\_max}$ (which can correspond to $D_{max}$ in FIG. 13A and FIG. 13B), and the count value decreases with time to reach a value $D_{PD\_raw}$, the quantity of residual charge $Q_{PD}$ can be represented by a difference between the count values. A refined count value $D_{PD\_rec}$ representing $Q_{PD}$ can be as follows:

$$D_{PD\_rec}=(D_{PD\_max}-D_{PD\_raw}) \qquad \text{(Equation 9)}$$

FIG. 14B illustrates an example relationship between charge and time for the FD ADC measurement operation. As shown in FIG. 14B, within the integration period, the photodiode PD can accumulate a quantity of residual charge equals to the photodiode full well capacity $Q_{PD\_FW}$ (in the unit of e−) when it saturates. Beyond the point of saturation, overflow charge $Q_{ov}$ can accumulate at charge storage device 608a until the integration period ends if the overflow charge $Q_{ov}$ remains below the threshold $Q_{TTS\_th}$ (or the total charge $Q_{PD}$ below $Q_{TTS\_th}+Q_{PD\_FW}$) where TTS operation is performed to measure light intensity. Assuming that at the start of the integration period the count value is at a value $D_{FD\_max}$ (which can correspond to $D_{FDADC\_start}$ in FIG. 13A and FIG. 13B), and the count value decreases with time to reach a value $D_{FD\_raw}$, the quantity of total charge $Q_{PD}$ can be represented based on a difference between the count values. Moreover, in the FD ADC operation the capacity of charge storage device 608a, and the resulting charge-to-voltage conversion gain, is reduced by a gain factor of $R_{LCG\_HCG}$. To account for the reduced conversion gain so that the refined count value has the same relationship with incident light intensity as in the PD ADC operation, the difference between the count values can be scaled by gain factor $R_{LCG\_HCG}$. A refined count value $D_{FD\_rec}$ representing $Q_{PD}$ can be as follows:

$$D_{FD\_rec}=(D_{FD\_max}-D_{FD\_raw})*R_{LCG\_HCG} \qquad \text{(Equation 10)}$$

FIG. 14C illustrates an example relationship between charge and time for the TTS measurement operation. As shown in FIG. 15C, before the integration period ends, the overflow charge may reach the threshold $Q_{TTS\_th}$ at time Ts (with respect to start of integration period). $Q_{TTS\_th}$ can correspond to, for example, threshold 704 of FIG. 7. The total quantity of charge $Q_{PD}$ generated by the photodiode from when integration period starts to time Ts equals $Q_{TTS\_th}+Q_{PD\_FW}$. Assuming that the end of integration time the output of TTS measurement is $D_{TTS\_max}$, whereas the output of TTS measurement at Ts is $D_{TTS\_raw}$, the total charge $Q_{TTS\_extrapolate}$ that would have been accumulated at charge storage device 608a at the end of the integration period can be extrapolated from $Q_{PD}$ as follows:

$$Q_{TTS\_extrapolate} = \frac{D_{TTS\_max}}{D_{TTS\_raw}} *(Q_{TTS_{th}} + Q_{PD_{FW}}) \qquad \text{(Equation 11)}$$

The extrapolated charge $Q_{TTS\_extrapolate}$ allows mapping of the raw TTS output (a measurement of time) to a quantity of charge accumulated with the same integration period as the PD ADC and FD ADC operations, therefore $Q_{TTS\_extrapolate}$ has the same relationship with incident light intensity as $Q_{PD}$ in FD ADC and PD ADC operations. A refined output for TTS operation $D_{TTS\_rec}$ can be derived from a digital representation of a voltage developed at charge storage device 608a that accumulates $Q_{TTS\_extrapolate}$, as follows:

$$D_{TTS\_rec} = \frac{D_{TTS\_max}}{D_{TTS\_raw}} * \frac{Q_{TTS\_th} + Q_{PD\_FW}}{CF_{HCG\_PD}}$$ (Equation 12)

$$= \frac{D_{TTS\_max}}{D_{TTS\_raw}} * (DN_{TTS\_th} + DN_{PD\_FW})$$

$$= \frac{S}{D_{TTS\_raw}}$$

In Equation 12, the capacitance of charge storage device 608a is reduced, and the extrapolated charge can be converted based on a conversion factor $CF_{HCG\_PD}$ to convert the charge to the digital representation $D_{TTS\_rec}$, which can have the same relationship with light intensity as refined PD ADC output $D_{PD\_rec}$. The voltage is quantized to become $DN_{TTS\_th} + DN_{PD\_FW}$. The product $D_{TTS\_max}*(DN_{TTS\_th} + DN_{PD\_FW})$ can be represented as a conversion factor S. The S factor can be dependent on the TTS threshold and photodiode full well capacity.

To perform a conversion of a raw count value to a refined count value, a quantization operation (one of TTS, FD ADC, or PD ADC) that generates the raw count value can first be identified based on, for example, which range the raw count value is in. The raw count value can then be converted to a refined count value based on one of Equations 9, 10, or 12 based on the identified quantization operation. By converting the count values from TTS, PD ADC, and FD ADC operations to a refined value representing a quantity of charge (actual or extrapolated) accumulated in the same integration period, the refined values can have a linear and uniform relationship with respect to light intensities across various intensity ranges.

Figure 15A:
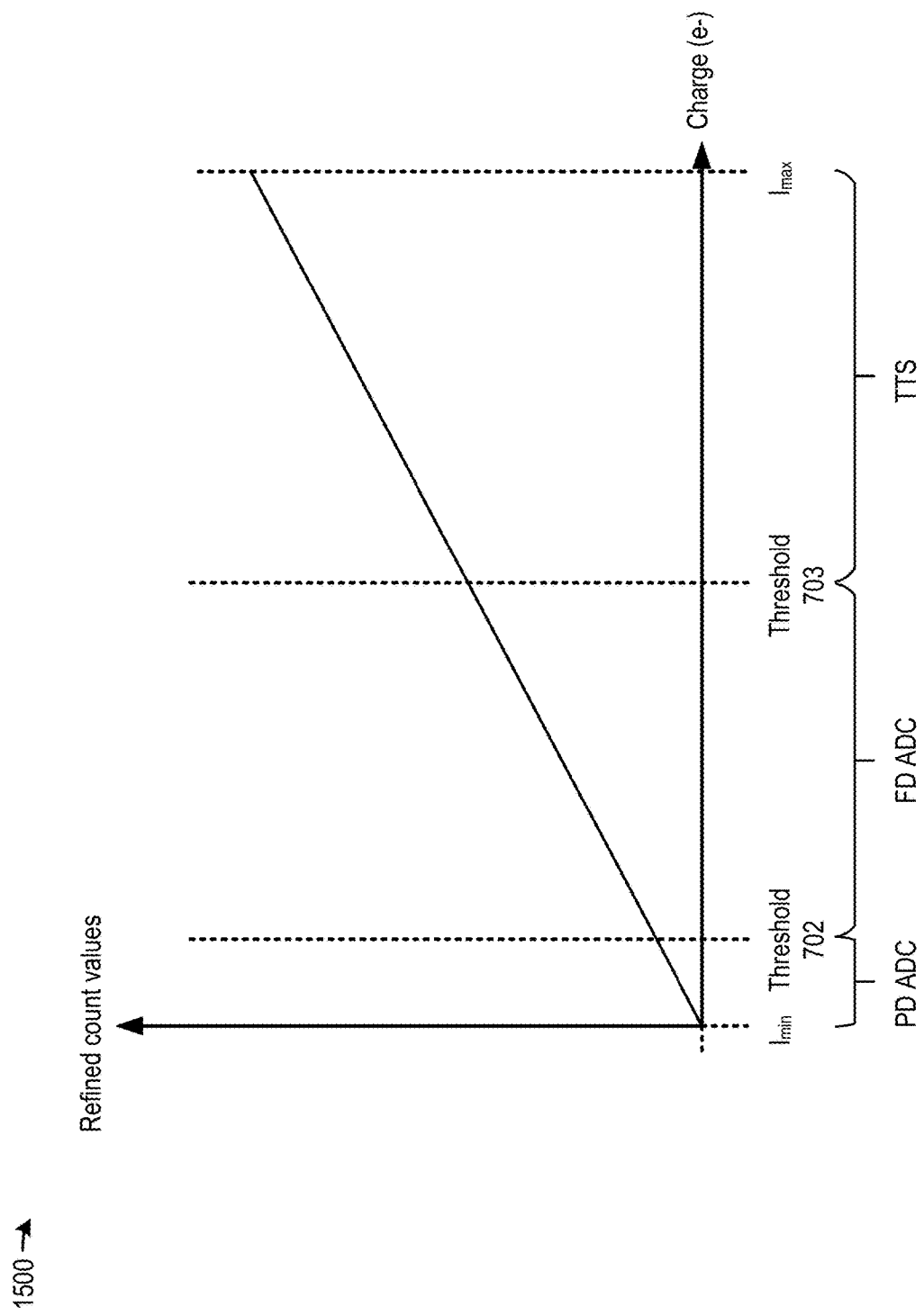
FIG. 15A and FIG. 15B illustrate examples of refined digital outputs converted from the raw digital outputs of a pixel cell.

FIG. 15A provides a graph 1500 which illustrates an ideal relationship between the refined count values and the incident light intensities. As shown in graph 1500, the refined count values, converted from raw count values for PD ADC, FD ADC, and TTS operations based on Equations 1, 2, and 4, have a linear and uniform relationship with incident light intensity (represented by e–) across intensity ranges for PD ADC (between $I_{min}$ and threshold 702), FD ADC (between threshold 702 and threshold 704), and TTS operations (between threshold 704 and $I_{max}$).

The uniformity and linearity of the relationship between the refined count values and light intensities can be limited by various factors. One factor that can limit the uniformity and linearity is the quantization resolution of ADC 610. Due to the limited quantization resolution, the linearity and uniformity of refined outputs from ADC 610 with respect to light intensity may differ from the relationship shown in FIG. 15A to within one or a few least significant bits (LSBs) of the ADC.

In addition, the PD ADC, FD ADC, and TTS operations can be susceptible to noise, which can affect the raw count values and degrades the uniformity and linearity of the relationship between the refined count values and light intensities can be limited by various factors. The noise may include, for example, random noise signals, such as dark charge, reset noise charge, etc., introduced to the charge storage device and/or to the photodiode during or after the integration period. The noise may also include fixed pattern noise (FPN) introduced by various system offsets within the pixel cell, such as offset of comparator 1102, offset in a voltage buffer 608b, etc. The noise can add noise charge to the charge accumulated during the integration period. The noise can also add an error component to the result of the A/D conversion. The noise charge and error component can add an offset component to the raw count outputs for each of PD ADC, FD ADC, and TTS operations, which remains in the refined outputs converted from the raw count outputs according to Equations 9, 10, and 12.

The offset component added to the raw output outputs may vary among the PD ADC, FD ADC, and TTS operations as the noise charge are subject to different quantization operations. For example, referring to FIG. 12A and FIG. 12B, the count values from TTS and FD ADC may include different quantities of dark charge. This can be because the count value in TTS is generated based on charge accumulated within the integration period, whereas the count value in FD ADC can include charge accumulated outside the integration period. Moreover, as the photodiodes typically receive much less dark current than the floating drain, the dark charge component in the PD ADC output is typically much lower than in the FD ADC output. In addition, the noise charge are subject to different quantization operations (e.g., different charge-to-gain conversion, measurement of time for a quantity of charge to reach a threshold versus measurement of the quantity, etc.), which can further amplify the differences in the offset components among the PD ADC, FD ADC, and TTS operations.

Figure 15B:
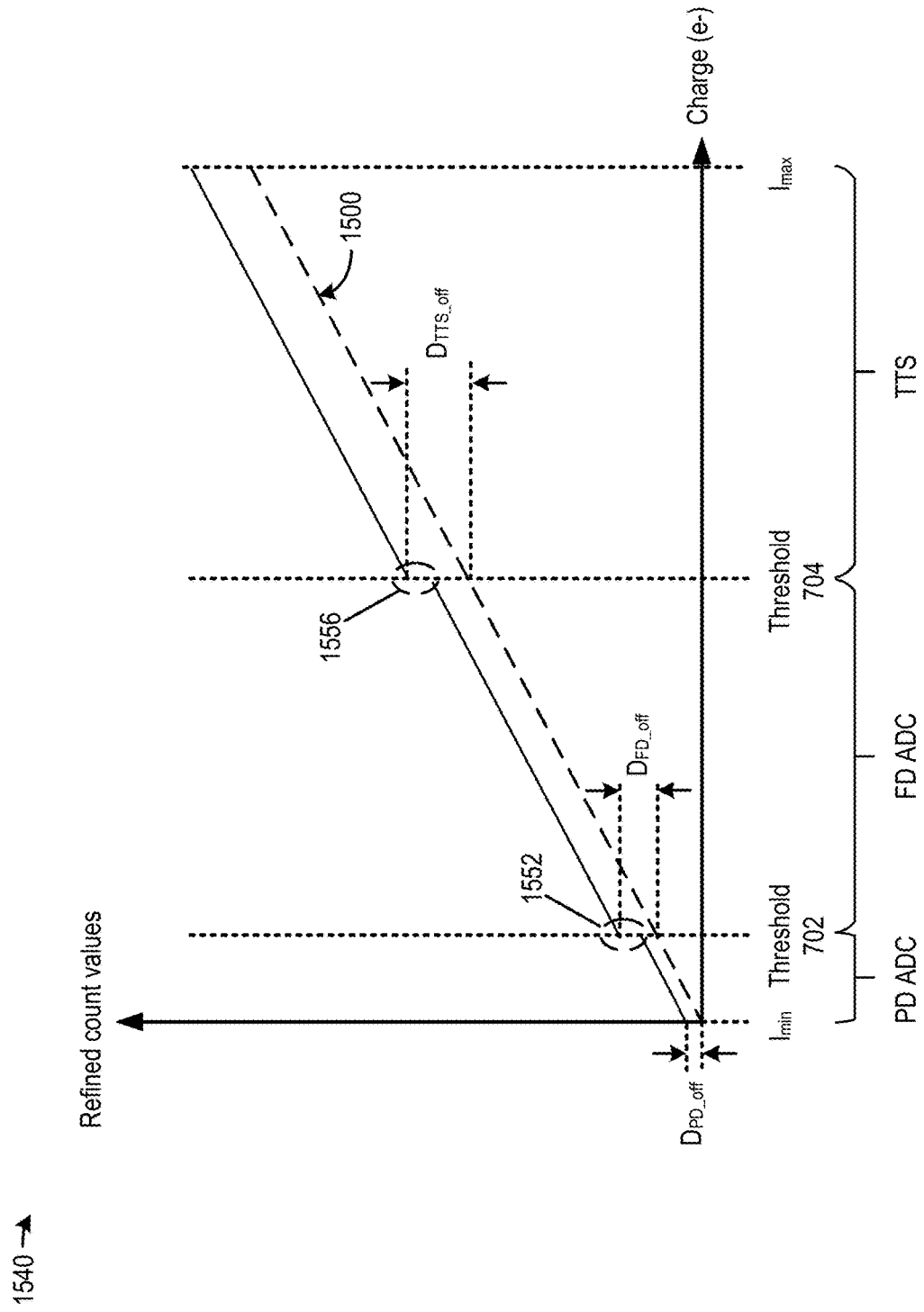

The variable offset component can lead to discontinuities in the A/D conversion relationships between the PD ADC and FD ADC operations, and between the FD ADC and TTS operations. FIG. 15B provides a graph 1540 which illustrates the refined count values having the variable offset components for different light intensities. In FIG. 15B, graph 1540 is superimposed with graph 1500 of FIG. 15A. As shown in FIG. 15A, within the intensity range of PD ADC, the refined count values may have a offset component $D_{PD\_off}$ with respect to the ideal relationship represented by graph 1500. Moreover, within the intensity range of FD ADC, the refined count values may have a offset component $D_{FD\_off}$ with respect to the ideal relationship represented by graph 1500. Further, within the intensity range of TTS, the refined count values may have a offset component $D_{TTS\_off}$ with respect to the ideal relationship represented by graph 1500. As the offset components $D_{PD\_off}$, $D_{FD\_off}$, and $D_{TTS\_off}$ have different values, graph 1540 includes discontinuities 1552 and 1556 at the boundaries between PD ADC and FD ADC operations (threshold 702) and between FD ADC and TTS operations (threshold 704). Because of the discontinuities, the refined count values may have different relationships with respect to light intensity for different intensity ranges of PD ADC, FD ADC, and TTS. As a result, the refined count values no longer have a linear and uniform relationship with respect to the light intensities.

To reduce or eliminate the discontinuities, an offset compensation parameter representing one of offset components $D_{PD\_off}$, $D_{FD\_off}$, and $D_{TTS\_off}$ can be removed from a refined count value depending on which intensity range the refined count value represents. For example, for PD ADC operation, a refined count value can be generated as follows:

$$D_{PD\_rec} = (D_{PD\_max} - D_{PD\_raw}) - D_{PD\_off}$$ (Equation 13)

For FD ADC operation, a refined count value can be generated as follows:

$$D_{FD\_rec} = (D_{FD\_max} - D_{FD\_raw}) * R_{LCG\_HCG} - D_{FD\_off}$$ (Equation 14)

And for TTS operation, a refined count value can be generated as follows:

$$D_{TTS\_rec} = \frac{S}{D_{TTS\_raw}} - D_{TTS\_off} \qquad \text{(Equation 15)}$$

The offset compensation parameters representing offset components $D_{PD\_off}$, $D_{FD\_off}$, and $D_{TTS\_off}$ can be part of a set of conversion parameters specific for each of PD ADC, FD ADC, and TTS operations. For example, the conversion parameters for PD ADC may include $D_{PD\_off}$. The conversion parameters for FD ADC may include $R_{LCG\_HCG}$ and $D_{FD\_off}$. Further, the conversion parameters for TTS may include S and $D_{TTS\_off}$. To perform a conversion operation on a raw count value, a quantization operation (one of TTS, FD ADC, or PD ADC) that generates the raw count value can first be identified based on which range the raw count value is in. A set of conversion parameters and a conversion operation (corresponding to one of Equations 13, 14, or 15) can be determined based on the identified quantization operation, and the raw count value can be converted to a refined count value using the identified conversion operation and the set of conversion parameters.

The conversion parameters can be obtained in various ways. For example, the conversion parameters can be computed based on device models and design parameters. Dark current and random noise (e.g., reset noise) can be estimated by device models, whereas fixed pattern noise such as comparator offset as well as gain factor $R_{LCG\_HCG}$ can be determined based on design parameters such as, for example, the designed gain of the comparator, the designed capacitances of $C_{FD}$ and $C_{EXT}$, etc. With such arrangements, however, there can be substantial mismatch between the conversion parameters and the actual offset component and gain factor in the image sensor. Specifically, the noise components, such as dark charge, may vary according to the operation temperature and the actual integration period duration. Moreover, device variations, such as the full well capacity of photodiode and capacitance of charge storage device 608a, can affect the S conversion factor (for converting TTS raw counts), the conversion gain factor $R_{LCG\_HCG}$, comparator offset, etc. All these can affect the linearity of the refined outputs.

In some examples, a calibration process can be performed using the image sensor to determine the conversion parameters based on raw outputs generated for pre-determined light intensities for different light intensities. As part of the calibration process, the image sensor can be controlled to perform a specific quantization operation (e.g., TTS, FD ADC, PD ADC, etc.) to measure a known light intensity to generate a raw output. Based on the selected quantization operation and the corresponding A/D conversion relationship, the raw output, and the known light intensity, conversion parameters for the light intensity range of the selected quantization operation can be determined. The calibration process can be supported by calibration module 1112.

Figure 16A:
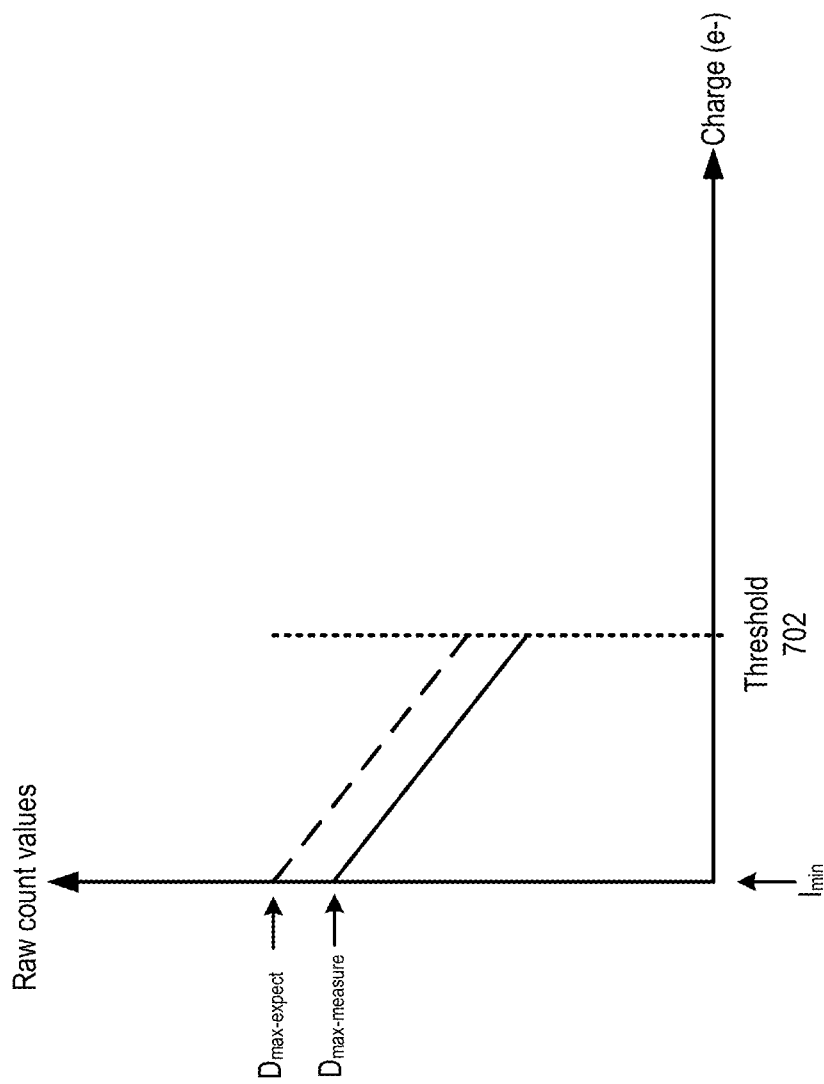
FIG. 16A, FIG. 16B, FIG. 16C, FIG. 16D, and FIG. 16E illustrate example calibration operations to obtain conversion parameters to convert raw digital outputs to refined digital outputs.

FIG. 16A, FIG. 16B, FIG. 16C, FIG. 16D, and FIG. 16E illustrate calibration operations to determine the conversion parameters for TTS, FD ADC, and PD ADC operations. FIG. 16A illustrates an operation to determine the offset component $D_{PD\_off}$ for PD ADC. As shown in FIG. 16A, an image sensor including multiple pixel cells 600 can be exposed to light of minimum detectable intensity for the image sensor ($I_{min}$) to obtain a raw output $D_{max\text{-}measure}$. For example, the image sensor can be operated in a dark environment without light, or in an environment having light of a minimum intensity according to the dynamic range of the image sensor. The raw output obtained from the image sensor can be compared against the expected minimum raw output $D_{max\text{-}expect}$ for the minimum detectable intensity to obtain a difference. The offset component $D_{PD\_off}$ for PD ADC can be determined based on the following equation:

$$D_{PD\_off} = D_{max\text{-}expect} - D_{max\text{-}measure} \qquad \text{(Equation 16)}$$

Referring back to FIG. 13A, $D_{max\text{-}expect}$ can be the initial count value at counter 808 at the beginning of the integration period (e.g., $D_{PD\_max}$). The difference between $D_{max\text{-}measure}$ and $D_{max\text{-}expect}$ can correspond to a quantity of dark charge accumulated by the photodiodes of pixel cells 600 within the integration period and read out and quantized by ADC 610. The offset component $D_{PD\_off}$ can be determined as a pixel-level $D_{PD\_off}$ offset component for each pixel cell 600 of the image sensor, or as a global $D_{PD\_off}$ offset component that applies to all pixel cells 600 of the image sensor. The global $D_{PD\_off}$ offset component can be determined based on, for example, averaging the differences between $D_{max\text{-}measure}$ and $D_{max\text{-}expect}$ obtained from all or a subset of pixel cells 600 of the image sensor.

Figure 16B:
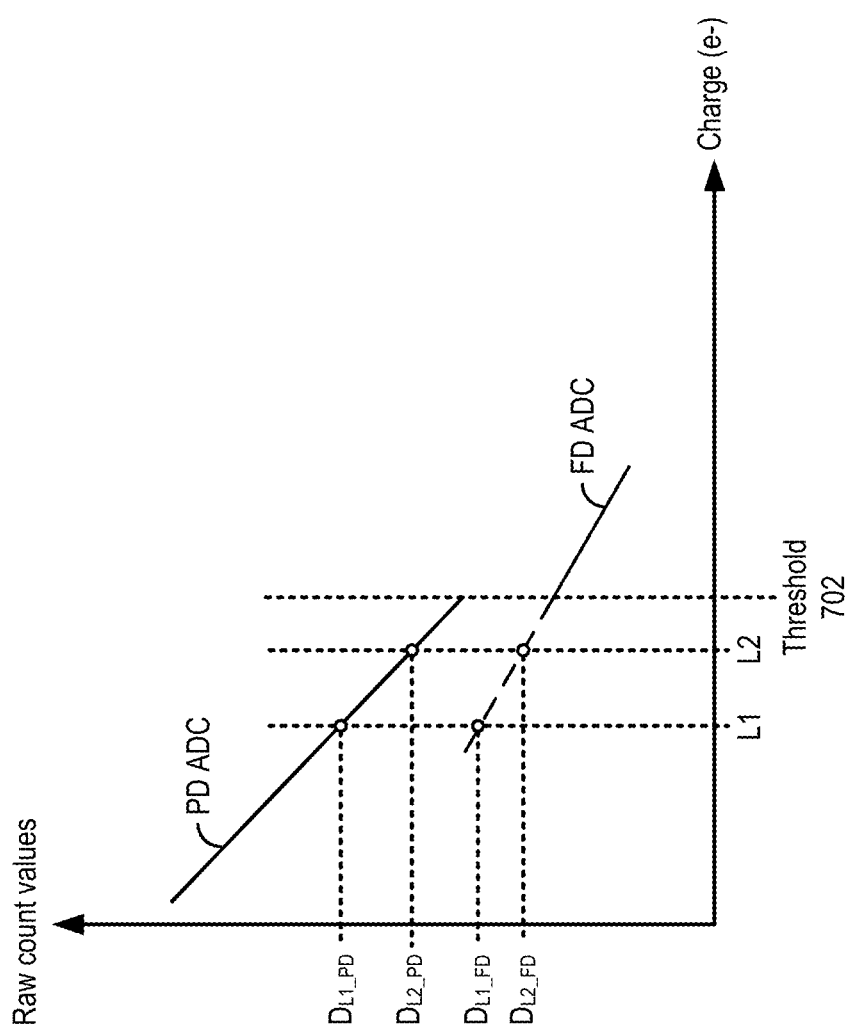

FIG. 16B illustrates an example calibration operation to determine the offset component $D_{FD\_off}$ and conversion gain factor $R_{LCG\_HCG}$. As shown in FIG. 16B, image sensor can be operated to measure two light intensities, L1 and L2. The light intensities L1 and L2 can be chosen so that they are within the low intensity range and below threshold 702. Each pixel cell 600 of the image sensor can be controlled to perform both PD ADC and FD ADC operations to measure both light intensities L1 and L2. From PD ADC, two raw count values representing measurements of the light intensities L1 and L2 in PD ADC, $D_{L1\_PD}$ and $D_{L2\_PD}$, can be obtained. Moreover, from FD ADC, two raw count values representing measurements of the light intensities L1 and L2 in FD ADC, $D_{L1\_FD}$ and $D_{L2\_FD}$, can be obtained. The conversion gain factor $R_{LCG\_HCG}$ can be determined based on a ratio between the differences of raw count values in FD ADC and differences of raw count values in PD ADC according to the following equation:

$$R_{LCG\_HCG} = \frac{D_{L2\_PD} - D_{L1\_PD}}{D_{L2\_FD} - D_{L1\_FD}} \qquad \text{(Equation 17)}$$

In addition, an offset component $D_{FD\_off}$ can be determined based on a difference between the refined count value from PD ADC and from FD ADC when measuring the same light intensity. For example, an offset component $D_{FD\_off\_L1}$ when measuring light intensity L1 in FD ADC can be determined based on the following equation:

$$D_{FD\_off\_L1} = (D_{FD\_max} - D_{L1\_FD}) * R_{LCG\_HCG} - ((D_{PD\_max} - D_{L1\_PD}) - D_{PD\_off}) \qquad \text{(Equation 18)}$$

In Equation 18, $(D_{FD\_max} - D_{L1\_FD}) * R_{LCG\_HCG}$ represents the refined count value is $D_{FD\_rec}$ from FD ADC for light intensity L1 based on Equation 10 described above, whereas $(D_{DP\_max} - D_{L1\_PD}) - D_{PD\_off}$ represents the refined count value $D_{PD\_rec}$ from PD ADC for the same light intensity L1 with offset component $D_{PD\_off}$ compensated. $D_{PD\_off}$ can be determined based on the calibration operation of PD ADC as described in FIG. 16A.

In addition, an offset component $D_{FD\_off\_L2}$ when measuring light intensity L2 in FD ADC can be determined based on the following equation:

$$D_{FD\_off\_L2} = (D_{FD\_max} - D_{L2\_FD}) * R_{LCG\_HCG} - ((D_{PD\_max} - D_{L2\_PD}) - D_{PD\_off}) \quad \text{(Equation 19)}$$

An average offset component $D_{FD\_off}$ can be determined based on an average of offset components $D_{FD\_off\_L1}$ and $D_{FD\_off\_L2}$, as follows:

$$D_{FD\_off} = \frac{D_{FD\_off\_L1} + D_{FD\_off\_L2}}{2} \quad \text{(Equation 20)}$$

In some examples, conversion gain factor $R_{LCG\_HCG}$ and offset component $D_{FD\_off}$ can be determined as a pixel-level parameter for each pixel cell 600 of the image sensor, or as a global parameter that applies to all pixel cells 600 of the image sensor. The global parameters $R_{LCG\_HCG}$ and $D_{FD\_off}$ can be determined based on, for example, averaging $R_{LCG\_HCG}$ and $D_{FD\_off}$ obtained from the light intensity measurements at each pixel cell 600.

Figure 16C:
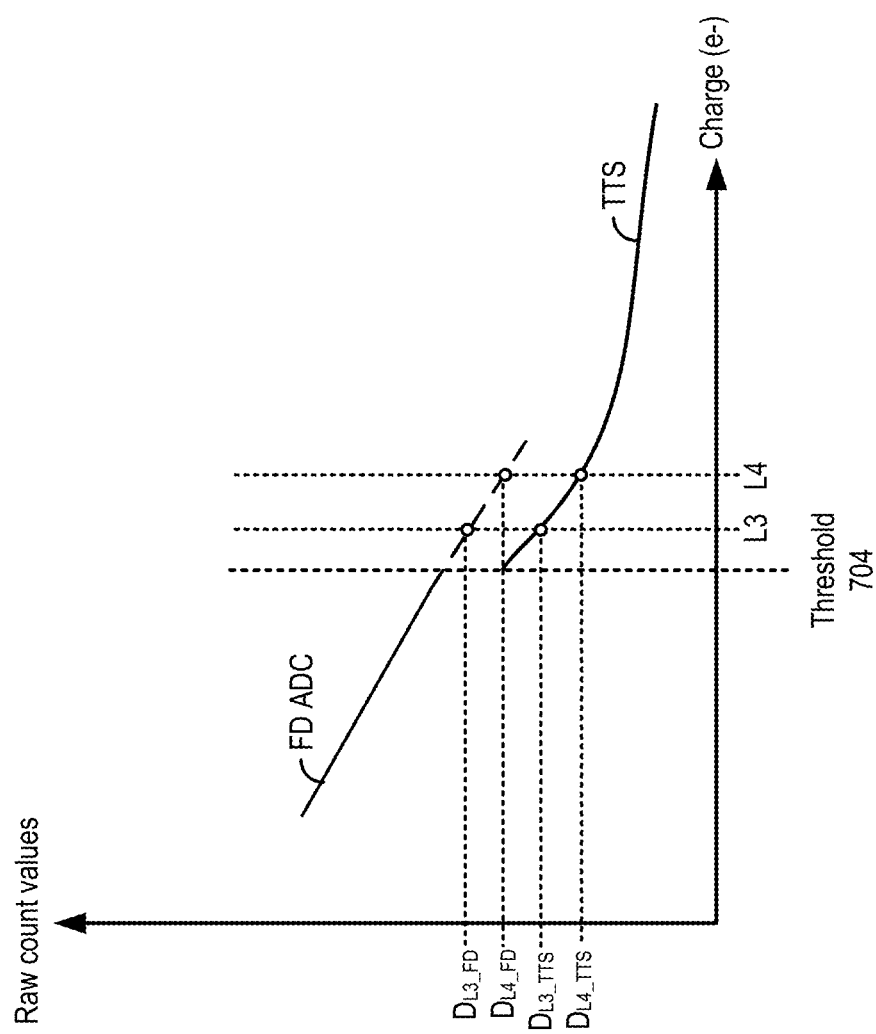

FIG. 16C illustrates another calibration operation to determine to determine the conversion factor S and offset component $D_{TTS\_off}$. As shown in FIG. 16C, image sensor can be operated to measure two light intensities, L3 and L4. The light intensities L3 and L4 can be chosen so that they are within the high intensity range and above threshold 704. Each pixel cell 600 of the image sensor can be controlled to perform both TTS and FD ADC operations to measure both light intensities L3 and L4. From TTS, two raw count values representing measurements of the light intensities L3 and L4 in TTS, $D_{L3\_TTS}$ and $D_{L4\_TTS}$, can be obtained. Moreover, from FD ADC, two raw count values representing measurements of the light intensities L3 and L4 in FD ADC, $D_{L3\_FD}$ and $D_{L4\_FD}$, can be obtained. The conversion factor S can be determined from the TTS and FD ADC raw count values based on the following Equation:

$$S = \frac{(D_{L3\_FD} - D_{L4\_FD}) * R_{LCG\_HCG}}{\frac{1}{D_{L3\_TSS}} - \frac{1}{D_{L4\_TSS}}} \quad \text{(Equation 21)}$$

Equation 21 can be derived from the inverse of Equation 12 to represent a ratio between a difference of reciprocals of TTS raw count values between intensities L3 and L4, which represents a difference in the extrapolated quantities of charge generated by the photodiode for the two intensities and stored in charge storage device 608a having reduced capacity, and a difference of the FD ADC raw count values between intensities L3 and L4. The difference between the FD ADC raw count values is scaled by the conversion gain ratio $R_{LCG\_HCG}$ to account for the increased capacitance of charge storage device 608a in the FD ADC mode. The conversion factor S can represent a scale factor to convert counts in TTS ADC back to PD ADC scale.

In addition, an offset component $D_{TTS\_off}$ can be determined based on a difference between the refined count value from TTS and from FD ADC when measuring the same light intensity. For example, an offset component $D_{TTS\_off\_L3}$ when measuring light intensity L3 in TTS can be determined based on the following equation:

$$D_{TTS\_off\_L3} = \frac{S}{C_{TTS\_L3}} - [(D_{FD\_max} - D_{L3\_FD}) * R_{LCG\_HCG} - D_{FD\_off}] \quad \text{(Equation 22)}$$

In Equation 22, $$\frac{S}{C_{TTS\_L3}}$$

represents the refined count value $D_{TTS\_rec}$ from TTS for light intensity L3 based on Equation 12 described above, whereas $(D_{FD\_max} - D_{L3\_FD}) * R_{LCG\_HCG} - D_{FD\_off}$ represents the refined count value $D_{FD\_rec}$ for light intensity L3 from FD ADC with offset component $D_{FD\_off}$ compensated. $D_{FD\_off}$ can be determined based on the calibration operation of FD ADC as described in FIG. 16B.

In addition, an offset component $D_{TTS\_off\_L3}$ when measuring light intensity L4 in TTS can be determined based on the following equation:

$$D_{TTS\_off\_L4} = \frac{S}{C_{TTS\_L4}} - [(D_{FD\_max} - D_{L4\_FD}) * R_{LCG\_HCG} - D_{FD\_off}] \quad \text{(Equation 23)}$$

An average offset component $D_{TTS\_off}$ can be determined based on an average of offset components $D_{TTS\_off\_L3}$ and $D_{TTS\_off\_L4}$, as follows:

$$D_{TTS\_off} = \frac{D_{TTS\_off\_L3} + D_{TTS\_off\_L4}}{2} \quad \text{(Equation 24)}$$

Figure 16D:
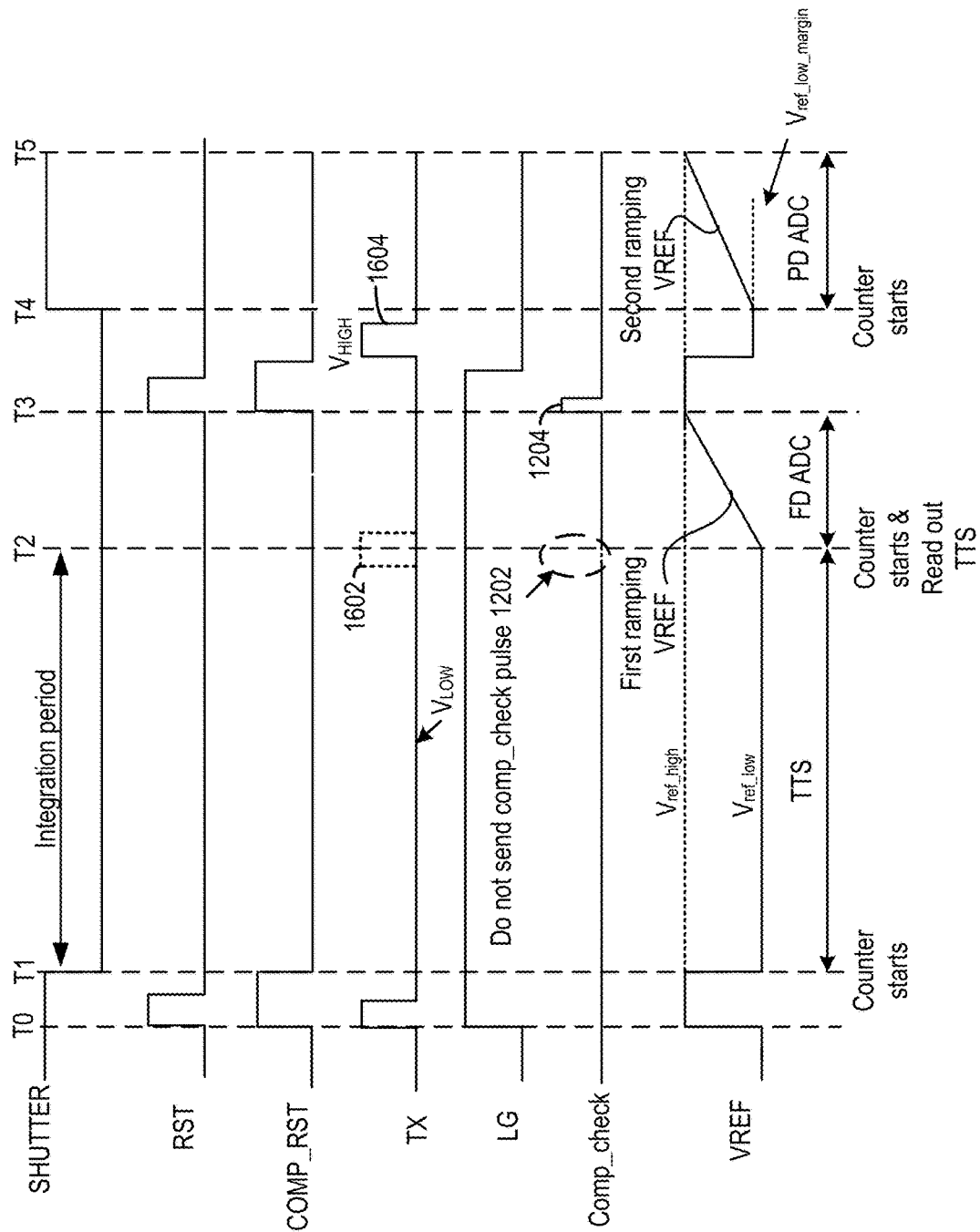
Figure 16E:
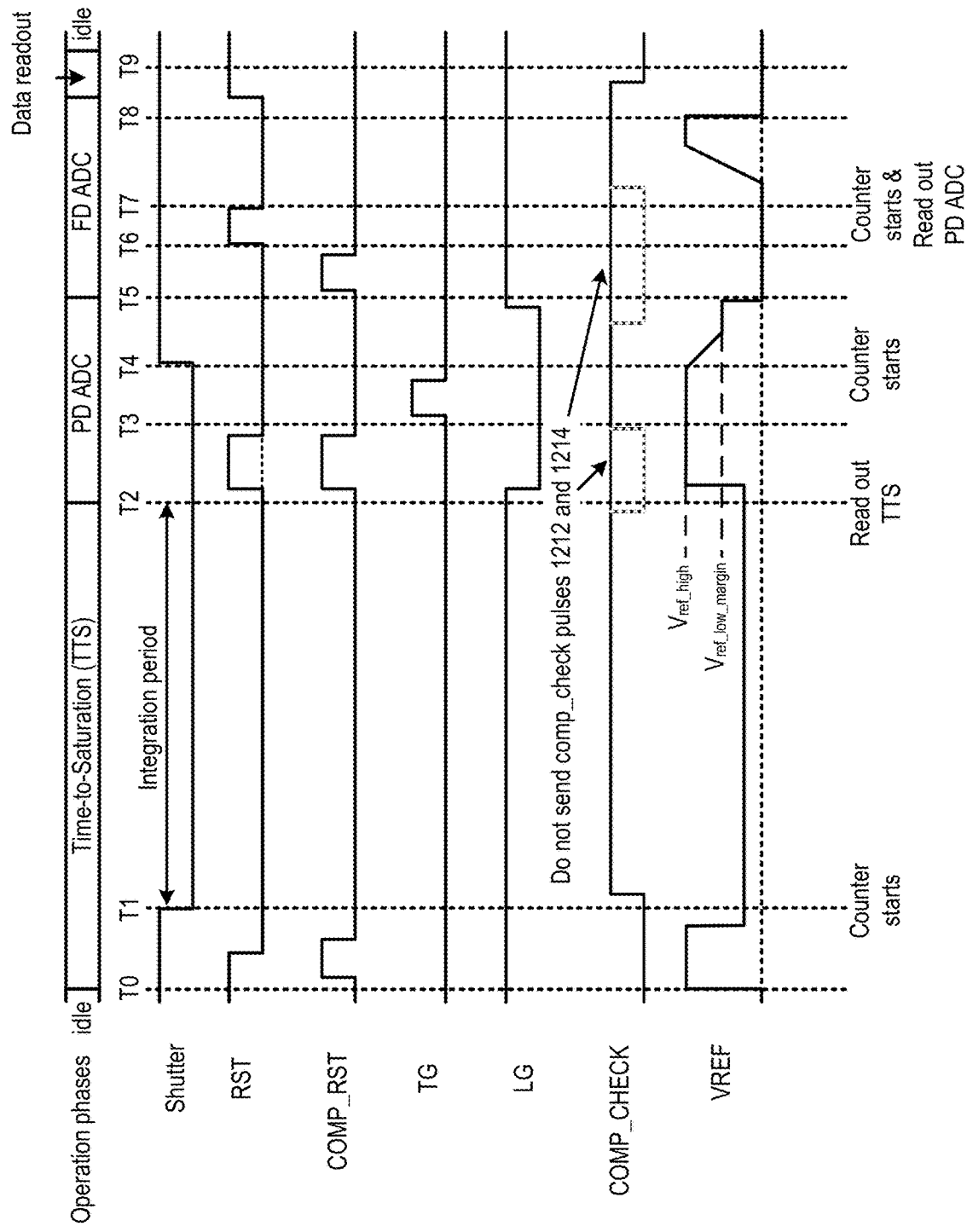

The calibration operations of FIG. 16B and FIG. 16C, where same light intensity is measured by both PD ADC and FD ADC operations, can be performed by controller 1110 based on control signals modified from the example control signal sequences of FIG. 12A and FIG. 12B. FIG. 16D illustrates an example control signal sequence modified from FIG. 12A, whereas FIG. 16E illustrates an example control signal sequence modified from FIG. 12B, to support the calibration operations of FIG. 16B and FIG. 16C. The control signal sequences of FIG. 16D and FIG. 16E can be provided by calibration module 1112 of controller 1110. Calibration module 1112 can also obtain the raw digital outputs from the different quantization operations (TTS, FD ADC, PD ADC, etc.) and compute the conversion parameters (e.g., offset compensation parameters $D_{TTS\_off}$, $D_{FD\_off}$, and $D_{PD\_off}$, conversion gain ratio $R_{LCG\_HCG}$, conversion factor S, etc.) based on the equations described above.

In the example of FIG. 16D, to perform FD ADC for intensities L1 and L2 which are below threshold 702, the TG gate can be asserted around time T2 (represented by pulse 1602) to transfer the residual charge from the photodiode PD to charge storage device 608a (with capacitance increased) to perform the FD ADC measurement operations. TG pulse 1604 between times T3 and T4 can be skipped for the FD ADC operation. FD ADC raw count values $D_{L1\_FD}$ and $D_{L2\_FD}$ can be obtained from two different image frames generated by the image sensor in two different integration periods. The raw count values $D_{L1\_FD}$ and $D_{L2\_FD}$ can include noise components contributed by, for example, dark charge accumulated by floating drain $C_{FD}$ between times T1 and T3. After FD ADC raw count values $D_{L1\_FD}$ and $D_{L2\_FD}$ are generated, the image sensor can be operated based on the control signal sequence of FIG. 12A, with TG pulse 1604 retained to transfer the residual charge right before PD ADC but after FD ADC operation, while TG pulse 1602 is skipped, to generate PD ADC raw count values $D_{L1\_PD}$ and $D_{L2\_PD}$. The raw count values $D_{L1\_PD}$ and $D_{L2\_PD}$ can include noise components contributed by, for example, dark charge accumulated by the photodiode PD between times T1 and T4.

In addition, to ensure that FD ADC and TTS can be both performed for intensities L3 and L4, which are above threshold 704, threshold 704 can be selected such that even when the quantity of overflow charge exceeds threshold 704, charge storage device 608a is not yet saturated and can continue to accumulate charge. Intensities L3 and L4 can be chosen such that while they are in the high intensity range 710 to trigger TTS, they are close enough to threshold 704 such that charge storage device 608a are not saturated, and the quantity of overflow charge accumulated in charge storage device 608a accurately reflects intensities L3 and L4. With such arrangements, the image sensor can generate raw count values that can represent intensities L3 and L4 from both TTS and FD ADC operations. TTS and FD ADC can be performed from the same integration period in which the image sensor is exposed to light of intensity L3 to generate $D_{L3\_FD}$ and $D_{L3\_TTS}$, followed by another integration period in which the image sensor is exposed to light of intensity L4 to generate $D_{L4\_FD}$ and $D_{L4\_TTS}$.

In addition, as FD ADC is operated on a light intensity that is outside the intensity range of FD ADC, to ensure that the count value from FD ADC can be stored into memory 810 after the TTS operation for measurements of intensities L3 and L4, controller 1110 can skip transmitting comp_check pulse 1202 after TTS to avoid output logics circuit 1108 from locking memory 810. The raw count value from TTS (e.g., $D_{L3\_TTS}$, $D_{L4\_TTS}$) can be read out at time T2 prior to FD ADC operation storing its raw count values (e.g., $D_{L3\_FD}$, $D_{L4\_FD}$).

In the example of FIG. 16E, the same TX bias can be used for measurement of intensities L1 and L2 in both PD ADC and FD ADC operations. Specifically, the residual charge accumulated in photodiode PD for intensities L1 and L2 (in two different integration periods) can be transferred to charge storage device 608a with reduced capacity (with LG de-asserted) to generate, respectively, $D_{L1\_PD}$ and $D_{L2\_PD}$. Following the PD ADC operation, the capacity of charge storage device 608a can be increased (with LG asserted), and FD ADC operation can be performed to generate, respectively, $D_{L1\_FD}$ and $D_{L2\_FD}$. The raw count values $D_{L1\_FD}$ and $D_{L2\_FD}$ can include noise components contributed by, for example, dark charge accumulated by floating drain $C_{FD}$ between times T1 and T2 and between T3 and T6 (if reset between times T2 and T3), or between times T1 and T6 (if not reset), whereas the raw count values $D_{L1\_PD}$ and $D_{L2\_PD}$ can include noise components contributed by, for example, dark charge accumulated by the photodiode PD between times T1 and T4. FD ADC and TTS operations can also be performed to measure light intensities L3 and L4 as long as charge storage device 608a does not saturate at threshold 704 as described above.

In addition, in FIG. 16E, controller 1110 can skip sending of comp_check pulses 1212 and 1214, to prevent memory 810 being locked after TTS or PD ADC. Such arrangements can ensure that FD ADC can store a count value into memory 810 after TTS (for measurements of intensities L3 and L4) and after PD ADC (for measurements of intensities L1 and L2). The TTS and PD ADC raw count values can be read out from memory 810 prior to FD ADC (e.g., at times T2 and T7).

Figure 17:
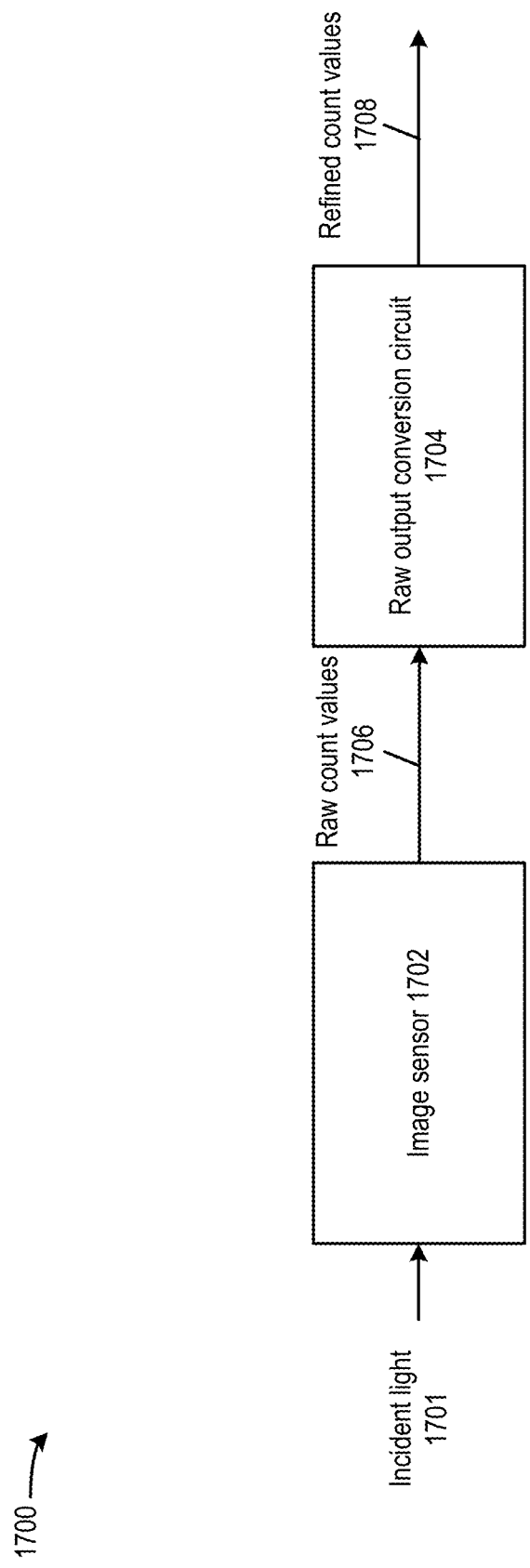
FIG. 17 illustrates an example system to generate digital outputs based on incident light intensity.

FIG. 17 illustrates an example system 1700 that can provide image sensor output that has an uniform relationship with respect to incident light intensity. As shown in FIG. 17, system 1700 includes an image sensor 1702 including pixel cell 600, and a raw output conversion circuit 1704. Each pixel cell of image sensor 1702 can receive incident light 1701 and generate a raw count value 1706 to represent an intensity of the incident light received by the pixel cell. Raw output conversion circuit 1704 can convert raw count values 1706 to refined count values 1708 all of which can have a linear and uniform linear relationship with the intensities of incident light 1701. Specifically, raw output conversion circuit 1704 can store conversion parameters including, for example, offset compensation parameters $D_{TTS\_off}$, $D_{FD\_off}$, and $D_{PD\_off}$, conversion gain ratio $R_{LCG\_HCG}$, conversion factor S, etc. Raw output conversion circuit 1704 can determine the range of a raw count value 1706 and identify the quantization operation (e.g., TTS, FD ADC, PD ADC, etc.) that generates the raw count value. Based on identifying the quantization operation, raw output conversion circuit 1704 can identify the conversion parameter(s) and conversion operation (e.g., one of Equations 13, 14, or 15) and generate a refined count value 1708 from the raw count value 1706 based on the identified conversion parameter(s) and conversion operation.

Raw output conversion circuit 1704 can be implemented in different forms. In some examples, raw output conversion circuit can include a hardware processor (e.g., general purpose central processing unit, digital signal processor, etc.) to execute software instructions to perform the post-processing operations. In some examples, raw output conversion circuit 1704 can include an application specific integrated circuit (ASIC), a Field Programmable Gate Array (FPGA), etc., which can include logic circuits to perform the post-processing. In some examples, raw output conversion circuit 1704 can be part of pixel cell 600. Raw output conversion circuit 1704 can be part of the same chip as image sensor 1702, or can be of a different chip from image sensor 1702.

FIG. 18 illustrates a flowchart of a method 1800 of measuring a physical stimulus, such as light. Method 1800 can be performed by, for example, system 1700 of FIG. 17 comprising image sensor 1702 and raw output conversion circuit 1704. In step 1802, system 1700 can generate, by an analog-to-digital (A/D) converter (e.g., ADC 610), raw digital outputs based on performing at least one of: (1) a first quantization operation to quantize a physical stimulus within a first intensity range based on a first A/D conversion relationship, or (2) a second quantization operation to quantize the physical stimulus within a second intensity range based on a second A/D conversion relationship.

In some examples, the physical stimulus can include light and measured by image sensor 1702, which includes at least a pixel cell 600 including a photodiode and a capacitor. The first quantization operation can include PD ADC and the first A/D conversion relationship can be as described in FIG. 13A (e.g., between $I_{min}$ and threshold 702), whereas the second quantization operation can include FD ADC and the second A/D conversion relationship can be as described in FIG. 13A (e.g., between thresholds 702 and 704). The first and second A/D conversion relationships can have a substantially linear relationship between the light intensity and raw digital output, but with different slopes due to the capacitance of the capacitor being reduced to accumulate the residual charge from the photodiode for quantization in PD ADC to improve charge-to-voltage conversion ratio, whereas the capacitance of the capacitor is increased to accumulate the overflow charge from the photodiode for quantization in FD ADC. In some examples, the ADC can perform a third quantization operation based on a third A/D conversion relationship, such as TTS, to measure a time for the overflow charge in the capacitor to reach a threshold. The third A/D conversion relationship can be as described in FIG. 13A (between threshold 704 and $I_{max}$), where the time is inversely proportional to the light intensity.

In step 1804, system 1700 can generate, by raw output conversion circuit 1704, a refined digital output based on a raw digital output obtained from the A/D converter and at least one predetermined conversion parameter, wherein the at least one conversion parameter compensates for a discontinuity between the first A/D conversion relationship and the second A/D conversion relationship. The at least one predetermined conversion parameter can include, for example, offset compensation parameters $D_{TTS\_off}$, $D_{FD\_off}$, and $D_{PD\_off}$, conversion gain ratio $R_{LCG\_HCG}$, conversion factor S, etc. Raw output conversion circuit 1704 can determine the range of a raw count value 1706 and identify the quantization operation (e.g., TTS, FD ADC, PD ADC, etc.) that generates the raw count value. Based on identifying the quantization operation, raw output conversion circuit 1704 can identify the conversion parameter(s) and conversion operation (e.g., one of Equations 13, 14, or 15) and generate a refined count value from the raw count value based on the identified conversion parameter(s) and conversion operation. The offset compensation parameters can reduce a discontinuity between the A/D conversion relationships, such as discontinuities 1552 and 1556.

Figure 19:
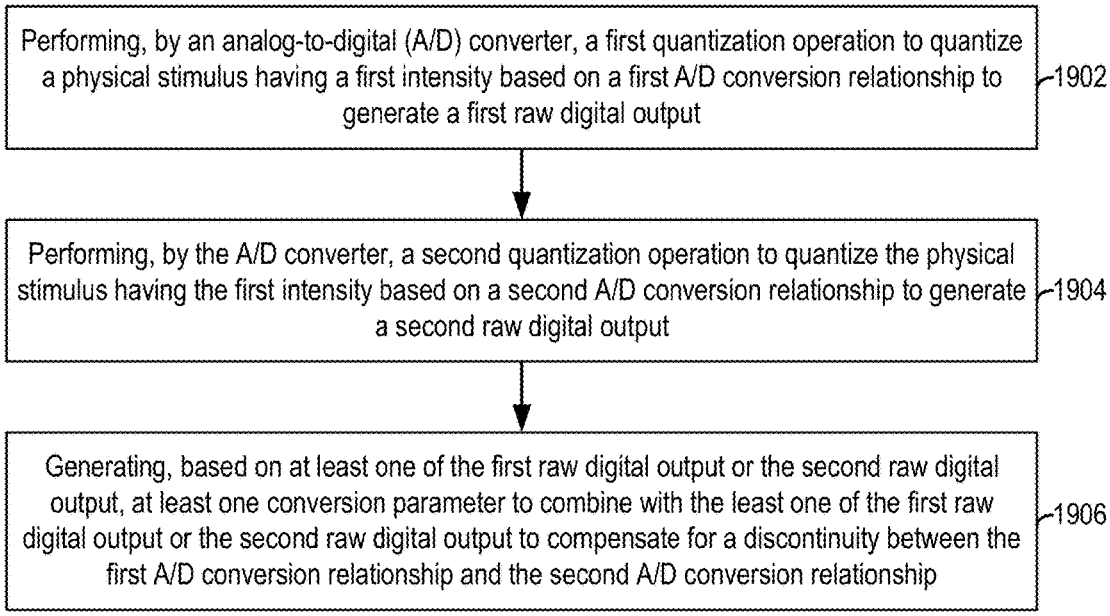
FIG. 19 illustrates a flowchart of an example calibration process for obtaining conversion parameters to convert raw digital outputs of a pixel cell to refined digital outputs.

FIG. 19 illustrates a flowchart of a method 1900 of generating conversion parameters, such as offset compensation parameters $D_{TTS\_off}$, $D_{FD\_off}$, and $D_{PD\_off}$, conversion gain ratio $R_{LCG\_HCG}$, conversion factor S, etc. Method 1900 can be performed by, for example, image sensor 1702 includes controller 1110 and calibration module 1112.

Method 1900 starts with step 1902, in which calibration module 1112 can control an A/D converter (e.g., ADC 610) to perform a first quantization operation to quantize a physical stimulus having a first intensity based on a first A/D conversion relationship to generate a first raw digital output. The physical stimulus can include light. The first quantization operation can be a PD ADC operation. In some examples, the first intensity can be, for example, a minimum measurable intensity (Imin) as described in FIG. 16A. In some examples, the first intensity can be an intensity within a low intensity range below threshold 702 (e.g., L1, L2 as described in FIG. 16B, etc.

In step 1904, calibration module 1112 can control ADC 610 to perform a second quantization operation to quantize the physical stimulus having the first intensity based on a second A/D conversion relationship to generate a second raw digital output. The second quantization operation can be a FD ADC operation. Calibration module 1112 can skip transmission of comp_check pulses to ensure that the FD ADC raw digital output is stored in memory 810 even though PD ADC also stores raw digital output. In the control signal sequence example of FIG. 16D, calibration module 1112 can also control the transfer gate TG to transfer the residual charge to charge storage device 608a before FD ADC, to ensure that the residual charge is quantized by the FD ADC operation.

In step 1906, calibration module 1112 (or other computation circuits) can generate, based on at least one of the first raw digital output or the second raw digital output, at least one conversion parameter to combine with the least one of the first raw digital output or the second raw digital output to compensate for a discontinuity between the first A/D conversion relationship and the second A/D conversion relationship. For example, $D_{PD\_off}$ can be determined based on the first raw digital output, whereas $D_{FD\_off}$ can be determined based on both the first raw digital output and the second raw digital output. Additional raw digital outputs from PD ADC and FD ADC can be obtained for a second light intensity to determine $R_{LCG\_HCG}$. In addition, calibration module 1112 can operate image sensor 1702 to measure other light intensities within the high intensity range using both TTS and FD ADC operations, as described in FIG. 16C, to obtain $D_{TTS\_off}$ and conversion factor S.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
   a photodiode configured to generate charge in response to incident light within an integration period and accumulate at least a part of the charge as residual charge until the photodiode saturates;
   a charge storage device configured to accumulate additional charge as overflow charge until the charge storage device saturates;
   an analog-to-digital (A/D) converter configured to generate raw digital outputs based on performing at least one of:
      (1) a first quantization operation to quantize the residual charge to generate a first raw digital output based on a first A/D conversion relationship between raw digital outputs and a first intensity range of light received by the photodiode, or
      (2) a second quantization operation to quantize at least one of the residual charge or the overflow charge to generate a second raw digital output based on a second A/D conversion relationship between raw digital outputs and a second intensity range of light received by the photodiode; and
   a raw output conversion circuit configured to:
      generate a first refined digital output to represent an intensity of the incident light from the first raw digital output based on one or more first conversion parameters associated with the first intensity range, and
      generate a second refined digital output to represent the intensity of the incident light from the second raw digital output based on one or more second conversion parameters associated with the second intensity range;
   wherein at least one of the one or more first conversion parameters and at least one of the one or more second conversion parameters comprises an offset compensation parameter that compensates for a discontinuity between the first A/D conversion relationship and the second A/D conversion relationship.

2. The apparatus of claim 1, wherein the offset compensation parameter is a first offset compensation parameter;
   wherein the first offset compensation parameter includes a component representing a quantity of dark charge accumulated at the photodiode within the integration period; and
   wherein the first offset compensation parameter is determined based on a calibration process that measures the quantity of the dark charge present at a raw digital output of the A/D converter when the photodiode is exposed to an intensity of light lower than or equal to a minimum intensity of incident light to be measured by the apparatus.

3. The apparatus of claim 2, wherein the one or more second conversion parameters comprise a second offset compensation parameter; and
   wherein the second offset compensation parameter includes a component related to the first offset compensation parameter and is determined based on the calibration process in which the apparatus generates the first raw digital output from the first quantization operation and the second raw digital output from the second quantization operation to represent a first intensity of the incident light; and
   wherein the second offset compensation parameter is based on a difference between the first raw digital output and the second raw digital output.

4. The apparatus of claim 3, wherein the charge storage device has a configurable capacitance;
   wherein the first quantization operation comprises configuring the charge storage device to have a first capacitance and transferring the residual charge to the charge storage device having the first capacitance to develop a first voltage, and quantizing the first voltage;
   wherein the second quantization operation comprises configuring the charge storage device to have a second capacitance and transferring at least one of the residual charge or the overflow charge to the charge storage device having the second capacitance to develop a second voltage, and quantizing the second voltage;
   wherein the one or more second conversion parameters comprise a ratio between the first capacitance and the second capacitance; and
   wherein the ratio is determined based on the first raw digital output, the second raw digital output, a third raw digital output from the first quantization operation to represent a second intensity of incident light, and a fourth raw digital output from the second quantization operation to represent the second intensity of incident light.

5. The apparatus of claim 4, wherein the second offset compensation parameter comprises a component related to the ratio.

6. The apparatus of claim 4, wherein the A/D converter is configured to perform a third quantization operation to measure a saturation time for a quantity of the overflow charge accumulated at the charge storage device to reach a threshold, and to generate a third raw digital output based on the saturation time; and
   wherein the raw output conversion circuit is configured to generate a third refined digital output from the third raw digital output based on one or more third conversion parameters associated with a third intensity range.

7. The apparatus of claim 6, wherein the one or more third conversion parameters comprise a third offset compensation parameter;
   wherein the third offset compensation parameter is determined based on the calibration process in which the apparatus generates a fourth raw digital output from the second quantization operation and the third raw digital output from the third quantization operation to represent a third intensity of incident light; and
   wherein the third offset compensation parameter is based on a difference between the third raw digital output and the fourth raw digital output.

8. The apparatus of claim 7, wherein the one or more third conversion parameters comprise a scaling factor that converts the saturation time to an extrapolated quantity of the overflow charge and is determined based on the third raw digital output, the fourth raw digital output, a fifth raw digital output from the second quantization operation to represent a fourth intensity of incident light, and a sixth raw digital output from the third quantization operation to present the fourth intensity of incident light.

9. The apparatus of claim 8, wherein the scaling factor includes a component related to the ratio.

10. The apparatus of claim 1, wherein the A/D converter and the raw output conversion circuit are on different integrated circuit chips.

11. The apparatus of claim 1, wherein the offset compensation parameter is based on a quantity of dark charge accumulated at the photodiode within an integration period.

12. The apparatus of claim 1, further comprising a capacitor;
wherein the photodiode is configured to:
accumulate a first part of the charge as residual charge until the photodiode becomes saturated; and
transfer a second part of the charge to the capacitor as overflow charge after the photodiode become saturated;
wherein the first quantization operation is performed to measure a quantity of the residual charge; and
wherein the second quantization operation is performed to measure at least one of: a quantity of the overflow charge transferred to the capacitor, or a time it takes for a quantity of the overflow charge to exceed a saturation threshold.

13. A method comprising:
generating, using a photodiode, charge in response to incident light;
accumulating, using a charge storage device if the photodiode saturates, additional charge as overflow charge until the charge storage device saturates;
performing, by an analog-to-digital (A/D) converter, a first quantization operation to quantize a residual charge accumulated by the photodiode, as a part of the charge, in response to the incident light within an integration period to generate a first raw digital output based on a first A/D conversion relationship between raw digital outputs and a first intensity range of light received by the photodiode;
performing, by the A/D converter, a second quantization operation to quantize a quantity of at least one of an overflow charge or the residual charge to generate a second raw digital output based on a second A/D conversion relationship between raw digital outputs and a second intensity range of light received by the photodiode;
generating, based on an intensity range of the incident light, one or more first conversion parameters associated with a first intensity range or one or more second conversion parameters associated with a second intensity range;
generating, based on at least one of the first raw digital output or the second raw digital output and the generated one or more first or second conversion parameters, a refined digital output to represent an intensity of the incident light, and
wherein at least one of the one or more first conversion parameters and at least one of the one or more second conversion parameters comprises an offset compensation parameter that compensates for a discontinuity between the first A/D conversion relationship and the second A/D conversion relationship.

14. The method of claim 13,
wherein the one or more first offset compensation parameters is generated based on the first raw digital output representing a minimum intensity of light to be quantized by the first quantization operation and not based on the second raw digital output.

15. The method of claim 13,
wherein the one or more second offset compensation parameters is generated based on a difference between the first raw digital output and the second raw digital output.

16. The method of claim 15, wherein the charge storage device is a capacitor having a configurable capacitance;
wherein the first quantization operation comprises configuring the capacitor to have a first capacitance and transferring the residual charge to the capacitor having the first capacitance to develop a first voltage, and quantizing the first voltage;
wherein the second quantization operation comprises configuring the capacitor to have a second capacitance and transferring at least one of the residual charge or the overflow charge to the capacitor having the second capacitance to develop a second voltage, and quantizing the second voltage;
wherein the at least one conversion parameter comprises a ratio between the first capacitance and the second capacitance; and
wherein the method further comprises:
performing, by the A/D converter, the first quantization operation to quantize light of a second intensity to generate a third raw digital output;
performing, by the A/D converter, the second quantization operation to quantize light of the second intensity to generate a fourth raw digital output; and
generating the ratio based on the first raw digital output, the second raw digital output, the third raw digital output, and the fourth raw digital output.

17. The method of claim 13, wherein generating the one or more first or second conversion parameters comprises generating one or more a third offset compensation parameters;
wherein the method further comprises:
performing, by the A/D converter, a third quantization operation to quantize light of a third intensity to generate a third raw digital output, the third quantization operation comprising measuring a saturation time for the quantity of the overflow charge accumulated at the charge storage device to reach a threshold, and generating a third raw digital output based on the saturation time;
performing, by the A/D converter, the second quantization operation to quantize light of the third intensity to generate a fourth raw digital output; and
determining the one or more third offset compensation parameter based on a difference between the third raw digital output and the fourth raw digital output.

18. The method of claim 17, wherein the one or more first or second conversion parameters comprises a scaling factor that converts the saturation time to an extrapolated quantity of the overflow charge; and
wherein the method further comprises:
performing, by the A/D converter, the third quantization operation to quantize light of fourth intensity to generate a fifth raw digital output;
performing, by the A/D converter, the second quantization operation to quantize light of the fourth intensity to generate a sixth raw digital output; and
determining the scaling factor based on the third raw digital output, the fourth raw digital output, the fifth raw digital output, and the sixth raw digital output.

19. A method comprising:
generating, using a photodiode, charge in response to incident light, the photodiode configured to generate charge in response to incident light within an integration period and accumulate at least a part of the charge as residual charge until the photodiode saturates;
accumulating, using a charge storage device if the photodiode saturates, additional charge as overflow charge until the charge storage device saturates;
generating, by an analog-to-digital (A/D) converter, raw digital outputs, the A/D converter configured to generate the raw digital outputs based on performing at least one of:
(1) a first quantization operation to quantize the residual charge to generate a first raw digital output based on a first A/D conversion relationship between raw digital outputs and a first intensity range of light received by the photodiode, or
(2) a second quantization operation to quantize at least one of the overflow charge or the residual charge to generate a second raw digital output based on a second A/D conversion relationship between raw digital outputs and a second intensity range of light received by the photodiode; and
generating, by a raw output conversion circuit, a refined digital output to represent an intensity of the incident light, the raw output conversion circuit configured to:
generate a first refined digital output to represent an intensity of the incident light from the first raw digital output based on one or more first conversion parameters associated with the first intensity range, and
generate a second refined digital output to represent the intensity of the incident light from the second raw digital output based on one or more second conversion parameters associated with the second intensity range; and
wherein at least one of the one or more first conversion parameters and at least one of the one or more second conversion parameters comprises an offset compensation parameter that compensates for a discontinuity between the first A/D conversion relationship and the second A/D conversion relationship.

* * * * *